United States Patent
Chae et al.

(10) Patent No.: US 9,229,257 B2
(45) Date of Patent: Jan. 5, 2016

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Kyung Tae Chae, Hwaseong-si (KR); Sung Hwan Won, Seoul (KR); Yeun Tae Kim, Suwon-si (KR); Won Tae Kim, Seosan-si (KR); Seon Uk Lee, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 213 days.

(21) Appl. No.: 13/933,534

(22) Filed: Jul. 2, 2013

(65) Prior Publication Data

US 2014/0152948 A1 Jun. 5, 2014

(30) Foreign Application Priority Data

Aug. 22, 2012 (KR) ........................ 10-2012-0091796

(51) Int. Cl.
*G02F 1/1333* (2006.01)
(52) U.S. Cl.
CPC .... *G02F 1/133345* (2013.01); *G02F 1/133377* (2013.01)
(58) Field of Classification Search
CPC ................... G02F 1/133377; G02F 1/133305; G02F 1/136; G02F 1/136209; G02F 1/1341; G02F 1/134309; G02F 1/134336; G02F 1/133345; G02F 1/133711
USPC ............ 349/143, 110, 138, 139, 158, 43, 189
See application file for complete search history.

(56) References Cited

U.S. PATENT DOCUMENTS

| | | | |
|---|---|---|---|
| 6,038,006 A * | 3/2000 | Sasaki et al. ................. | 349/106 |
| 6,141,072 A | 10/2000 | Drabik et al. | |
| 7,123,319 B2 | 10/2006 | Broer et al. | |
| 7,879,390 B2 | 2/2011 | Salleo et al. | |
| 2004/0233379 A1* | 11/2004 | Kinoshita et al. ............ | 349/158 |
| 2008/0315755 A1 | 12/2008 | Han | |
| 2010/0053507 A1* | 3/2010 | Song et al. ..................... | 349/84 |

FOREIGN PATENT DOCUMENTS

| | | |
|---|---|---|
| JP | 05-188359 A | 7/1993 |
| JP | 10239699 | 2/1997 |
| JP | 2002-244124 A | 8/2002 |
| JP | 2006-317896 A | 11/2006 |
| JP | 2010-219094 A | 9/2010 |
| KR | 1020020004277 A | 7/2000 |
| KR | 1020010005935 A | 1/2001 |
| KR | 1020020009202 A | 2/2002 |
| KR | 1020030063656 A | 7/2003 |
| KR | 1020040026959 A | 4/2004 |
| KR | 1020060100595 A | 4/2008 |
| KR | 1020100024730 A | 8/2008 |
| KR | 1020100003916 A | 1/2010 |
| KR | 1020110132819 A | 12/2011 |
| KR | 1020120026880 A | 3/2012 |

* cited by examiner

*Primary Examiner* — Thoi Duong
(74) *Attorney, Agent, or Firm* — Cantor Colburn LLP

(57) ABSTRACT

A liquid crystal display includes: an insulation substrate; a microcavity layer disposed on the insulation substrate and having a reversed taper side wall; a pixel electrode disposed in the microcavity layer on the insulation substrate; a liquid crystal layer disposed in the microcavity layer; and a common electrode which covers the liquid crystal layer.

34 Claims, 85 Drawing Sheets

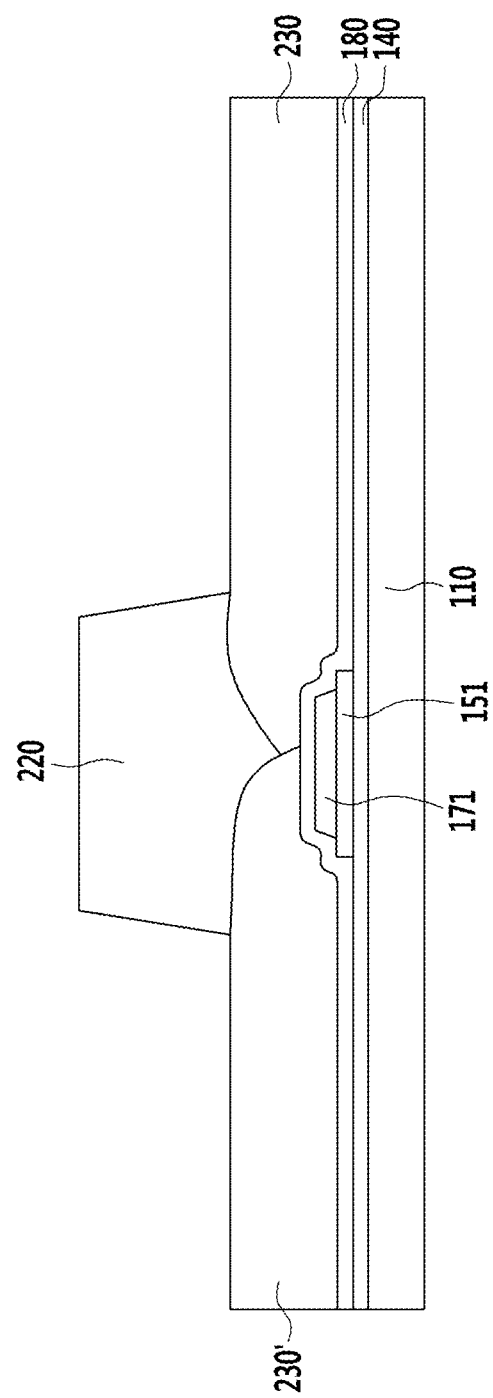

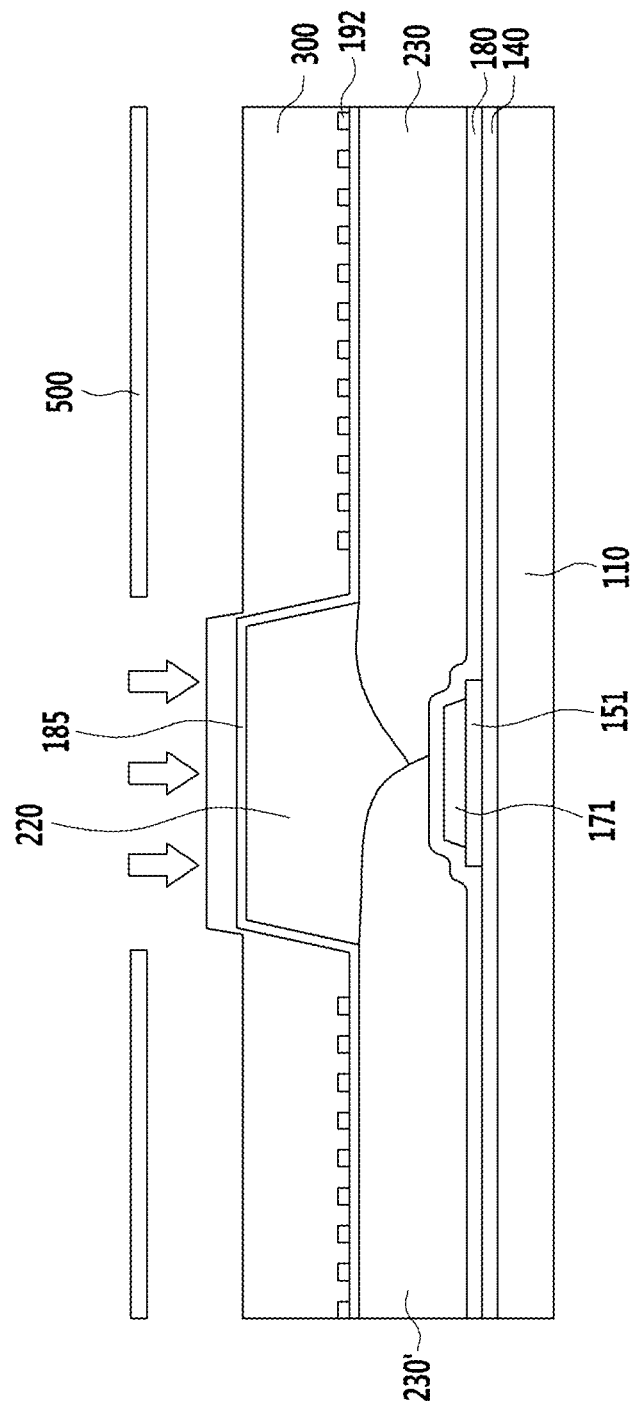

Disclination

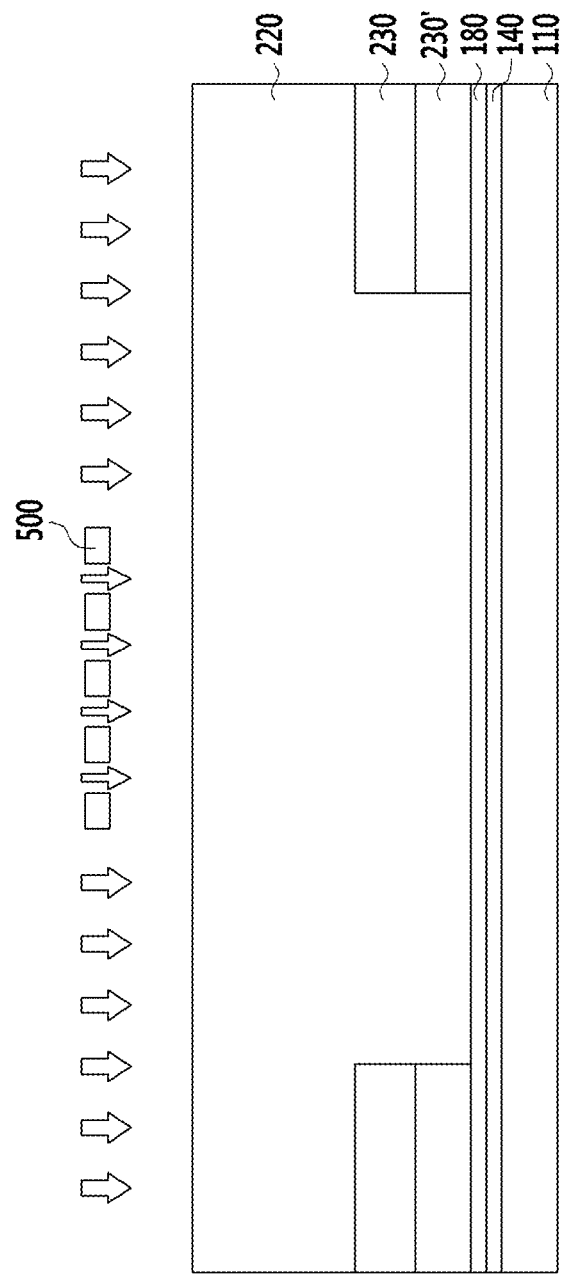

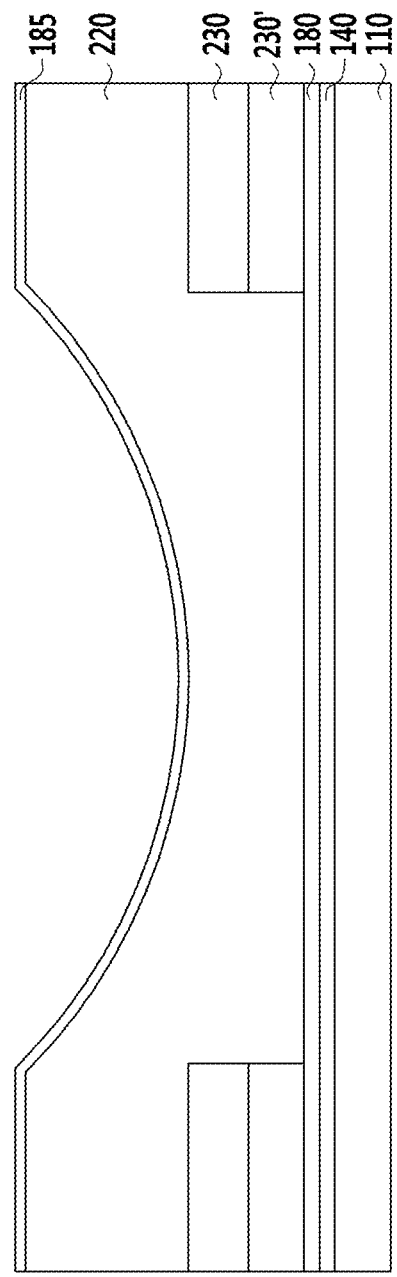

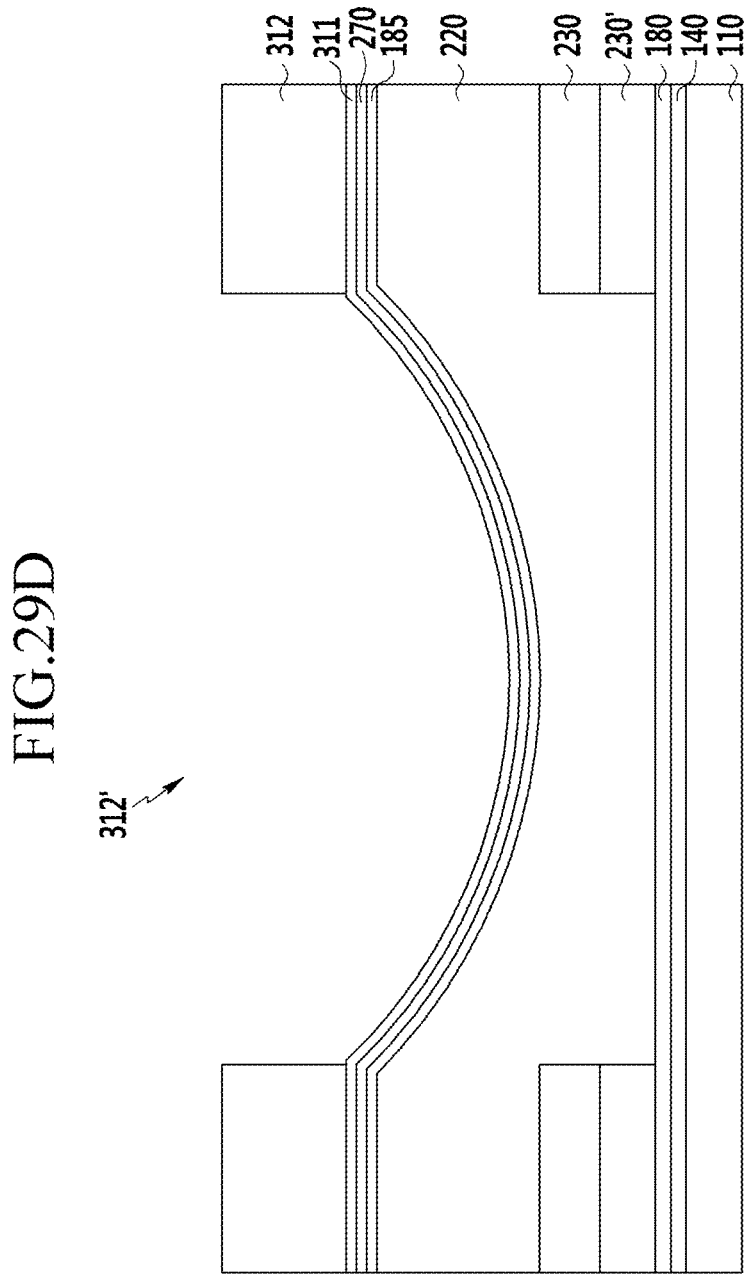

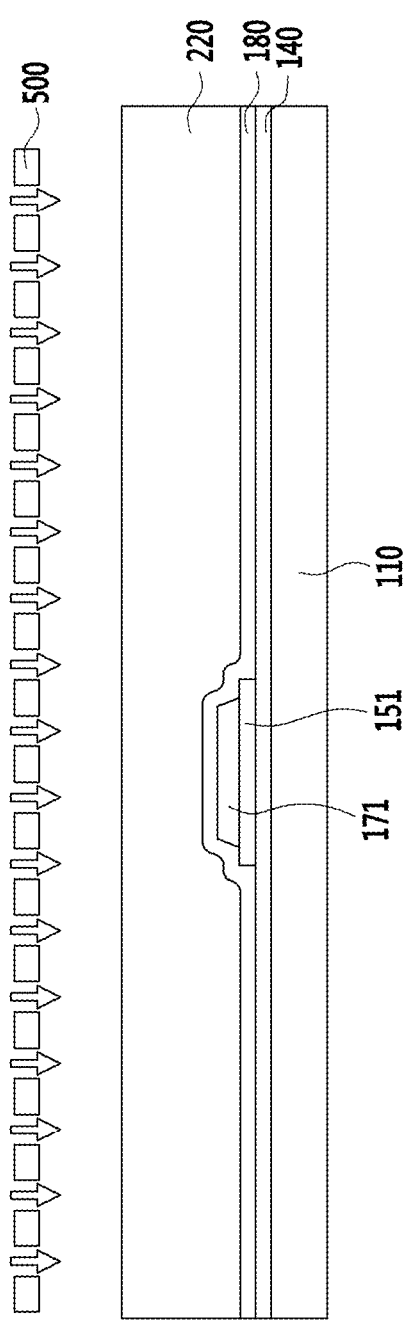

LIQUID CRYSTAL DISPLAY AND MANUFACTURING METHOD THEREOF

This application claims priority to Korean Patent Application No. 10-2012-0091796, filed on Aug. 22, 2012, and all the benefits accruing therefrom under 35 U.S.C. §119, the content of which in its entirety is herein incorporated by reference.

BACKGROUND (a) Field

Exemplary embodiments of the invention relate to a liquid crystal display and a manufacturing method thereof, and more particularly, to a liquid crystal display including a liquid crystal in a microcavity, and a manufacturing method thereof.

(b) Description of the Related Art

A liquid crystal display, which is one of the most widely types of flat panel displays currently in use, typically includes two sheets of panels with field generating electrodes, such as a pixel electrode, a common electrode and the like, and a liquid crystal layer interposed therebetween.

The liquid crystal display generates an electric field in the liquid crystal layer by applying voltages to the field generating electrodes, and determines the direction of liquid crystal molecules of the liquid crystal layer by the generated electric field, thus controlling polarization of incident light to display images.

A liquid crystal display having an embedded microcavity ("EM") structure is a display device manufactured by forming a sacrificial layer with a photoresist, coating a support member thereon, removing the sacrificial layer by an ashing process, and filing a liquid crystal in an empty space formed by removing the sacrificial layer. However, an electric field applied to the liquid crystal layer may be distorted due a side wall of the EM structure such that liquid crystal molecules may be misaligned.

Also, the common electrode may have a curved structure according to the sacrificial layer such that the underlying pixel electrode may be short-circuited or the electric field may be distorted.

An opening process of etching one side of the EM structure is typically performed to remove the sacrificial layer, and thus a common electrode has a structure connected only in one direction by the process. As a result, when the common voltage is applied in one direction, crosstalk occurs due to the common voltage which is changed at a portion (center portion) distant from the applied portion.

SUMMARY

Exemplary embodiments of the invention provide a liquid crystal display and a manufacturing method thereof to control an arrangement of liquid crystal molecules in a predetermined direction, to maintain a structure of a common electrode not to be short-circuited along with a pixel electrode, and to effectively prevent a distortion of an electric field, or to substantially uniformly provide a common voltage without cross-talk.

An exemplary embodiment of a liquid crystal display according to the invention includes: an insulation substrate; a microcavity layer disposed on the insulation substrate and having a reversed taper side wall; a pixel electrode disposed in the microcavity layer on the insulation substrate; a liquid crystal layer disposed in the microcavity layer; and a common electrode which covers the liquid crystal layer.

In an exemplary embodiment, the liquid crystal display may further include a light blocking member disposed on the insulation substrate and having a tapered side wall corresponding to the reversed taper side wall of the microcavity layer.

In an exemplary embodiment, a height of the light blocking member may correspond to a height of the microcavity layer.

In an exemplary embodiment, the common electrode may have a substantially planar structure.

In an exemplary embodiment, the liquid crystal display may further include a second passivation layer disposed between the light blocking member and the common electrode, and a height of the second passivation layer disposed on the light blocking member may be substantially the same as the height of the microcavity layer.

In an exemplary embodiment, the common electrode may be disposed substantially parallel to the insulation substrate corresponding to the height of the second passivation layer on the light blocking member.

In an exemplary embodiment, the common electrode may have a curved structure near the light blocking member.

In an exemplary embodiment, the common electrode may have a curved upper structure upside near the light blocking member.

In an exemplary embodiment, the liquid crystal display may further include a roof layer which covers the common electrode.

In an exemplary embodiment, a liquid crystal injection hole may be defined in the roof layer.

In an exemplary embodiment, the liquid crystal injection hole may be positioned at a thin film transistor formation region.

In an exemplary embodiment, the common electrode may expose the liquid crystal injection hole.

In an exemplary embodiment, the common electrode may have a structure extending in one direction, and may include a common electrode connection which connects portions of the common electrode in a direction substantially perpendicular to the one direction.

In an exemplary embodiment, the common electrode connection may be disposed on the light blocking member and may be supported by the light blocking member.

In an exemplary embodiment, the common electrode connection may be supported by the roof layer.

In an exemplary embodiment, the pixel electrode may include a stem and a plurality of minute branches extending from the stem.

Another alternative exemplary embodiment of a liquid crystal display according to the invention includes: an insulation substrate; a microcavity layer disposed on the insulation substrate; a pixel electrode disposed in the microcavity layer on the insulation substrate; a liquid crystal layer disposed in the microcavity layer; a light blocking member disposed at a side of the microcavity layer; and a common electrode which covers the liquid crystal layer and the light blocking member, where a height of the light blocking member is substantially equal to or greater than a height of the microcavity layer.

In an exemplary embodiment, the microcavity layer may have a reversed taper side wall.

In an exemplary embodiment, the light blocking member has a taper side wall corresponding to the reversed taper side wall of the microcavity layer on the insulation substrate.

In an exemplary embodiment, the microcavity layer may have a tapered side wall.

In an exemplary embodiment, the light blocking member has a reversed tapered side wall corresponding to the tapered side wall of the microcavity layer on the insulation substrate.

In exemplary embodiments, as described above, an embedded microcavity ("EM") structure has the reversed tapered side wall, and distortion of an electric field applied to the liquid crystal layer is thereby substantially reduced and a portion where the liquid crystal molecules are misaligned may not be generated such that the liquid crystal molecules may be arranged substantially uniformly in a same direction. In exemplary embodiments, the common electrode has a substantially planar structure substantially parallel to the insulation substrate such that the common electrode may not be short-circuited with the pixel electrode and the electric field may not be distorted. In exemplary embodiments, the common voltage is applied in the different direction (the direction perpendicular thereto) from the extending direction of the common electrode, thereby providing a liquid crystal display having a uniform common voltage. In such embodiments, when the liquid crystal molecules are misaligned, the upper width of the light blocking member is widened such that misaligned portion is not be recognized by a user.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
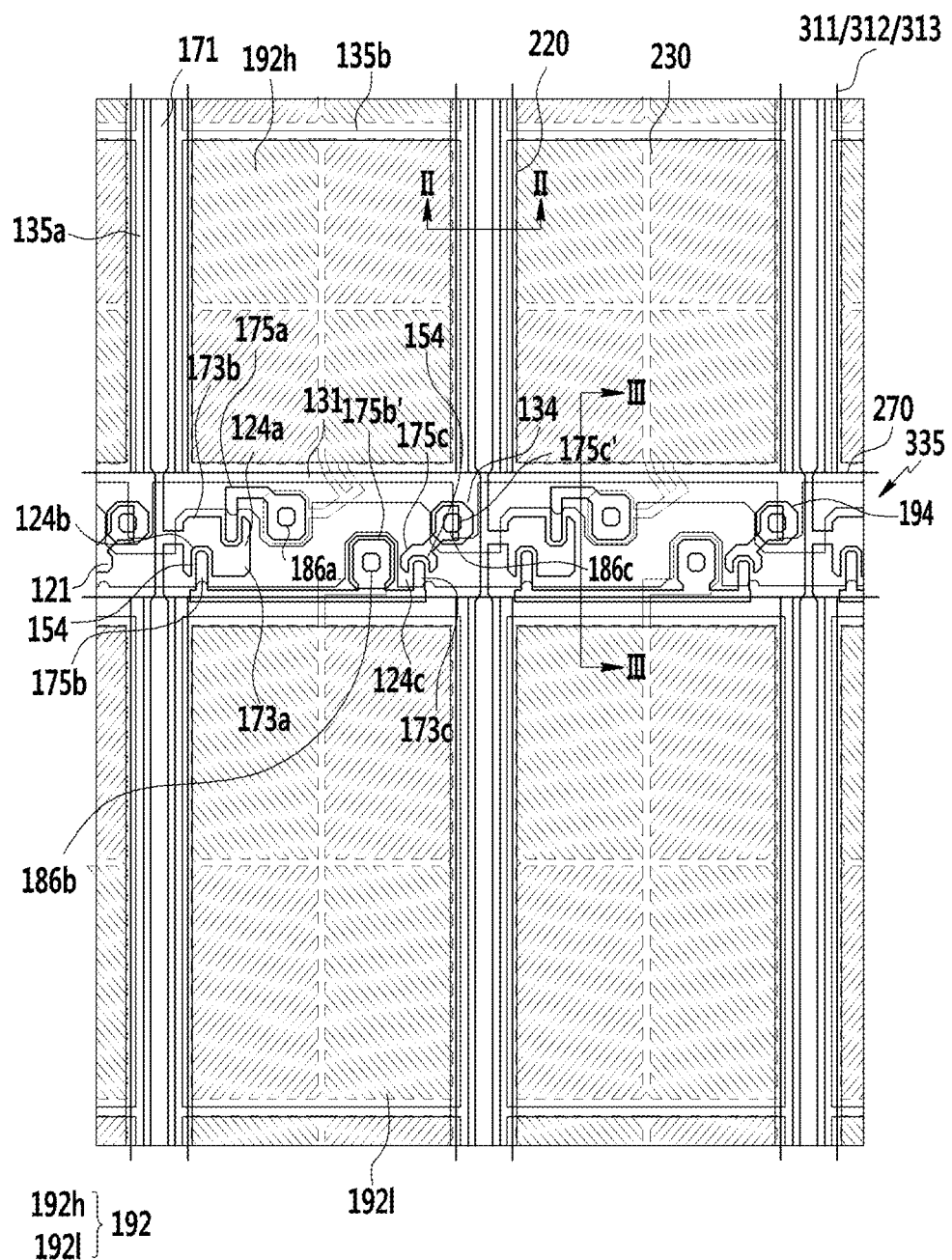
FIG. 1 is a top plan view of an exemplary embodiment of a liquid crystal display according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments according to the invention will be described with reference to the accompanying drawings.

Now, an exemplary embodiment of a liquid crystal display according to the invention will be described with reference to FIG. 1 to FIG. 3.

Figure 2:
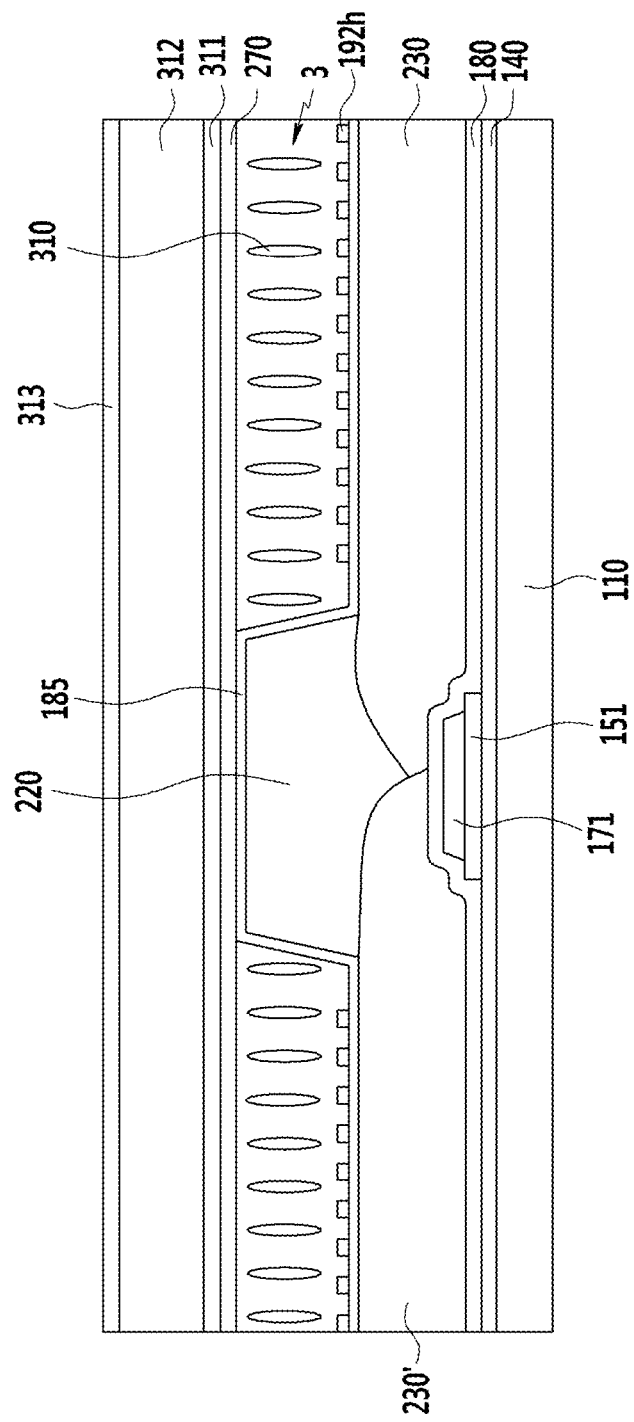
FIG. 2 is a cross-sectional view taken along line II-II of FIG. 1.
Figure 3:
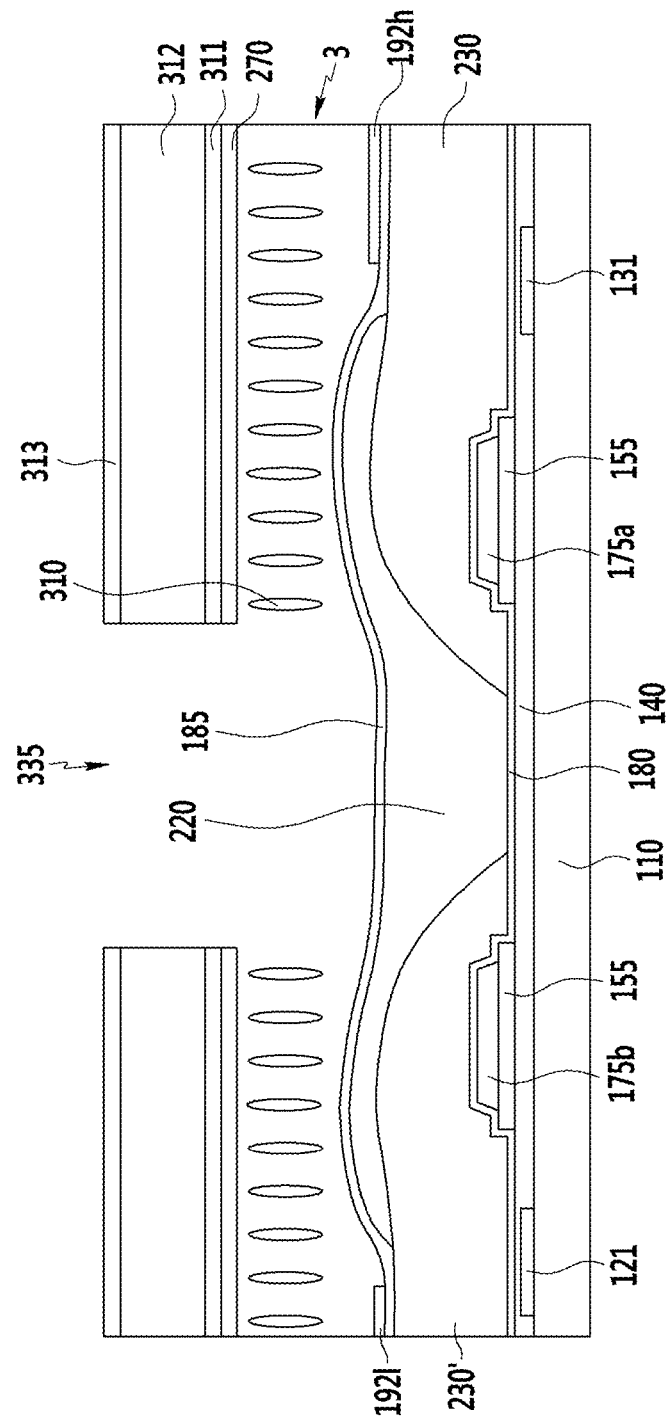
FIG. 3 is a cross-sectional view taken along line III-III of FIG. 1.

FIG. 1 is a top plan view of an exemplary embodiment of a liquid crystal display according to the invention, FIG. 2 is a cross-sectional view taken along line II-II of FIG. 1, and FIG. 3 is a cross-sectional view taken along line III-III of FIG. 1.

In an exemplary embodiment, the liquid crystal display includes an insulation substrate 110 including transparent glass or plastic, for example. A gate line 121 and a storage voltage line 131 are disposed, e.g., formed, on the insulation substrate 110. The gate line 121 includes a first gate electrode 124a, a second gate electrode 124b and a third gate electrode 124c. The storage voltage line 131 includes storage electrodes 135a and 135b and a protrusion 134 protruding toward the gate line 121. The storage electrodes 135a and 135b have a structure surrounding a first subpixel electrode 192h and a second subpixel electrode 192l of a previous pixel. A horizontal portion 135b of the storage electrode of FIG. 1 may be a wire connected with the horizontal portion 135b of the previous pixel. In an exemplary embodiment, a horizontal portion 135b of the storage electrode and the horizontal portion 135b of the previous pixel are not separated from each other, e.g., integrally formed as a single unitary and indivisible unit.

A gate insulating layer 140 is disposed on the gate line 121 and the storage voltage line 131. A semiconductor 151 positioned below a data line 171, a semiconductor 155 positioned below source/drain electrodes and a semiconductor 154 positioned at a channel portion of a thin film transistor are disposed on the gate insulating layer 140.

A plurality of ohmic contacts (not shown) may be disposed on each of the semiconductors 151, 154 and 155 and between the data line 171 and source/drain electrodes.

Data conductors 171, 173a, 173b, 173c, 175a, 175b and 175c, which include a plurality of data lines 171 including a first source electrode 173a and a second source electrode 173b, a first drain electrode 175a, a second drain electrode 175b, a third source electrode 173c and a third drain electrode 175c, are disposed on the semiconductors 151, 154 and 155, and the gate insulating layer 140.

The first gate electrode 124a, the first source electrode 173a and the first drain electrode 175a collectively define a first thin film transistor together with the semiconductor 154, and a channel of the thin film transistor is disposed at the semiconductor portion 154 between the first source electrode 173a and the first drain electrode 175a. Similarly, the second gate electrode 124b, the second source electrode 173b and the second drain electrode 175b collectively define a second thin film transistor together with the semiconductor 154, and a channel of the thin film transistor is disposed at the semiconductor portion 154 between the second source electrode 173b and the second drain electrode 175b. The third gate electrode 124c, the third source electrode 173c and the third drain electrode 175c collectively define a third thin film transistor together with the semiconductor 154, and a channel of the thin film transistor is disposed at the semiconductor portion 154 between the third source electrode 173c and the third drain electrode 175c.

In an exemplary embodiment, the data line 171 may have a structure in which a width is reduced in a forming region of the thin film transistor in the vicinity of an extension 175c' of the third drain electrode 175c such that an interval with the adjacent wiring is substantially maintained, and signal interference is thereby reduced, but not being limited thereto.

A first passivation layer 180 is disposed on the data conductors 171, 173a, 173b, 173c, 175a, 175b and 175c and an exposed portion of the semiconductor 154. The first passivation layer 180 may include an inorganic insulator such as silicon nitride (SiNx) and silicon oxide (SiOx), for example, or an organic insulator.

A color filter 230 is disposed on the passivation layer 180. Color filters 230 of the same color are disposed in the pixels adjacent in a vertical direction (a data line direction). In an exemplary embodiment, color filters 230 and 230' of different colors are disposed in pixels adjacent in a horizontal direction (a gate line direction), and two color filters 230 and, 230' may overlap on the data line 171. In an exemplary embodiment, the color filters 230 and 230' may display one of primary colors such as three primary colors of red, green and blue, but not being limited thereto. In an alternative exemplary embodiment, the color filters 230 and 230' may display one of cyan, magenta, yellow and white colors.

A light blocking member (black matrix; 220) is disposed on the color filter 230 and 230'. The light blocking member 220 is disposed corresponding to a region (hereafter referred to as "a transistor formation region") where the gate line 121, the thin film transistor and the data line 171 are disposed, and has a lattice structure having openings corresponding to a region where an image is displayed. The color filter 230 is disposed corresponding to the opening of the light blocking member 220. In an exemplary embodiment, the light blocking member 220 may include a material, through which light is not transmitted. In an exemplary embodiment, the light blocking member 220 has a height corresponding to the height of a microcavity layer in which the liquid crystal layer 3 is provided, e.g., injected. In exemplary embodiments, the height of the microcavity layer may be varied such that the height of the light blocking member 220 may be varied. In one exemplary embodiment, for example, the light blocking member 220 may have a height in a range of about 2.0 micrometers (μm) to about 3.6 μm.

In an exemplary embodiment, the light blocking member 220 includes a taper structure, thereby having a tapered side wall. In exemplary embodiments, an angle of the tapered side wall may be varied.

A second passivation layer 185 is disposed on the color filter 230 and the light blocking member 220 to cover the color filter 230 and the light blocking member 220. The second passivation layer 185 may include an inorganic insulator such as silicon nitride (SiNx) and silicon oxide (SiOx), for example, or an organic insulator. In an alternative exemplary embodiment, a step may occur due to a thickness difference between the color filter 230 and the light blocking member 220, and the second passivation layer 185 including an organic insulator may substantially reduce or effectively remove the step.

A first contact hole 186a and a second contact hole 186b, which expose the first drain electrode 175a and extensions 175b' of the second drain electrode 175b, respectively, are defined, e.g., formed, in the color filter 230, the light blocking member 220 and the passivation layers 180 and 185. In an exemplary embodiment, a third contact hole 186c which exposes the protrusion 134 of the storage voltage line 131 and the extension 175c' of the third drain electrode 175c is defined or formed in the color filter 230, the light blocking member 220 and the passivation layers 180 and 185.

In an exemplary embodiment, when forming the contact holes 186a, 186b and 186c in the light blocking member 220 and the color filter 230, the etching of the contact holes may not be efficiently preformed based on the material of the light blocking member 220 and the color filter 230 compared with the passivation layers 180 and 185. In an exemplary embodiment, when etching the light blocking member 220 or the color filter 230, the light blocking member 220 or the color filter 230 may be previously removed at the position where the contact holes 186a, 186b and 186c are formed.

In an exemplary embodiment, the contact holes 186a, 186b and 186c may be formed by changing a position of the light blocking member 220 and etching only the color filter 230 and the passivation layers 180 and 185.

A pixel electrode 192 including a first subpixel electrode 192h and a second subpixel electrode 192l is disposed on the second passivation layer 185. The pixel electrode 192 may include a transparent conductive material such as indium tin oxide ("ITO") or indium zinc oxide ("IZO"), for example.

The first subpixel electrode 192h and the second subpixel electrode 192l are adjacent to each other in a column direction, have an entirely quadrangular shape, and include a cross stem including a transverse stem and a longitudinal stem crossing the transverse stem. In an exemplary embodiment, the first subpixel electrode 192h and the second subpixel electrode 192l are divided into four subregions by the transverse stem and the longitudinal stem, and each subregion includes a plurality of minute branches.

The minute branches of the first subpixel electrode 192h and the second subpixel electrode 192l form angles in a range of about 40 degrees to 45 degrees with the gate line 121 or the transverse stem. In an exemplary embodiment, the minute branches of two adjacent subregions may be substantially perpendicular to each other. In an exemplary embodiment, a width of the minute branch may become gradually increase or intervals between the minute branches may be different from each other.

The first subpixel electrode 192h and the second subpixel electrode 192l are physically and electrically connected to the first drain electrode 175a and the second drain electrode 175b through the contact holes 186a and 186b, and receive data voltages from the first drain electrode 175a and the second drain electrode 175b.

In an exemplary embodiment, a connecting member 194 electrically connects the extension 175c' of the third drain electrode 175c and the protrusion 134 of the storage voltage line 131 through the third contact hole 186c. In such an embodiment, some of the data voltage applied to the second drain electrode 175b is divided through the third source electrode 173c and thus the magnitude of a voltage applied to the second subpixel electrode 192l may be less than the magnitude of a voltage applied to the first subpixel electrode 192h.

In an exemplary embodiment, an area of the second subpixel electrode 192l may be about twice an area of the first subpixel electrode 192h.

In an exemplary embodiment, an opening for collecting gas discharged from the color filter 230 and an overcoat that covers the corresponding opening with the same material as the pixel electrode 192l and 192h thereon may be disposed on the second passivation layer 185. In an exemplary embodiment, the opening and the overcoat have structures for blocking the gas discharged from the color filter 230 from being transferred to another element. In an alternative exemplary embodiment, the opening and the overcoat may be omitted.

Figure 12A:
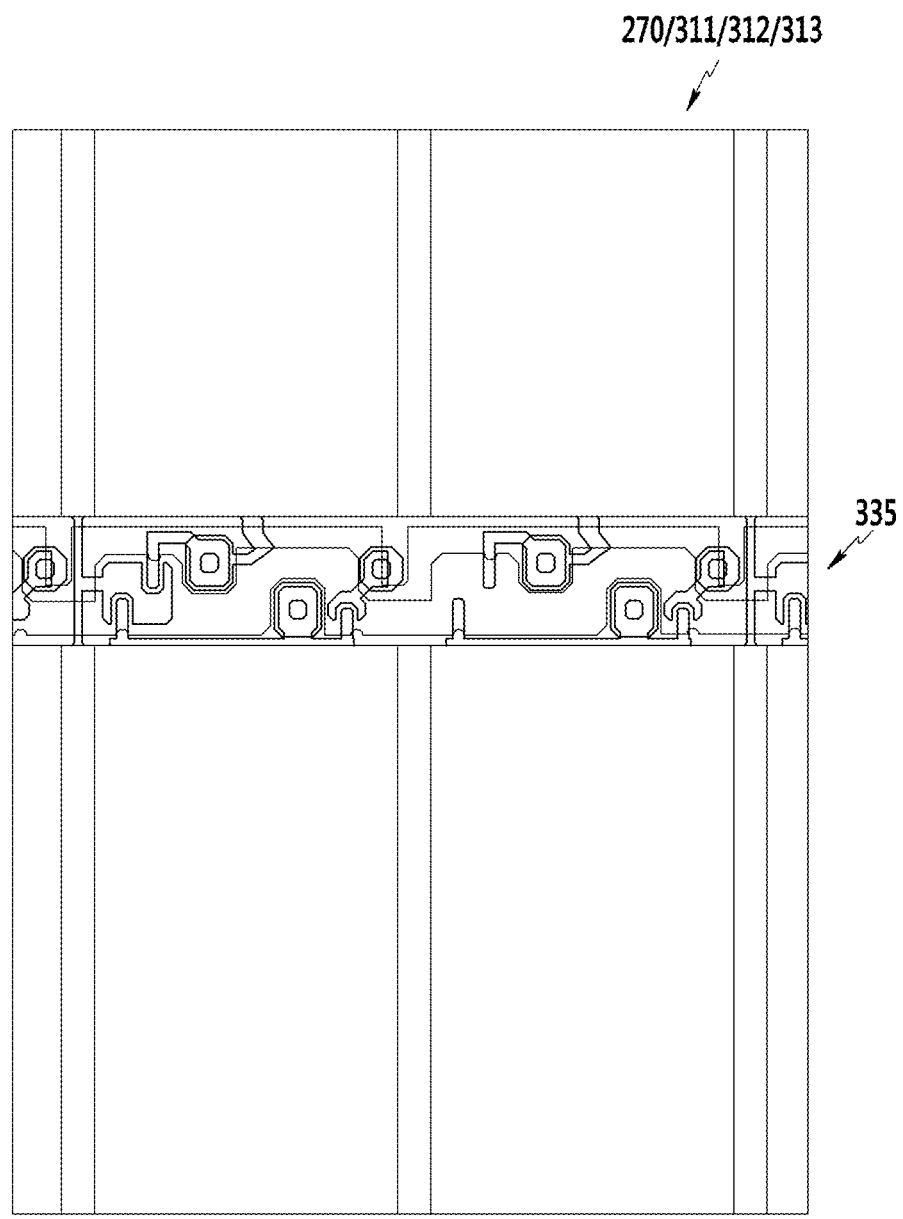
Figure 12B:
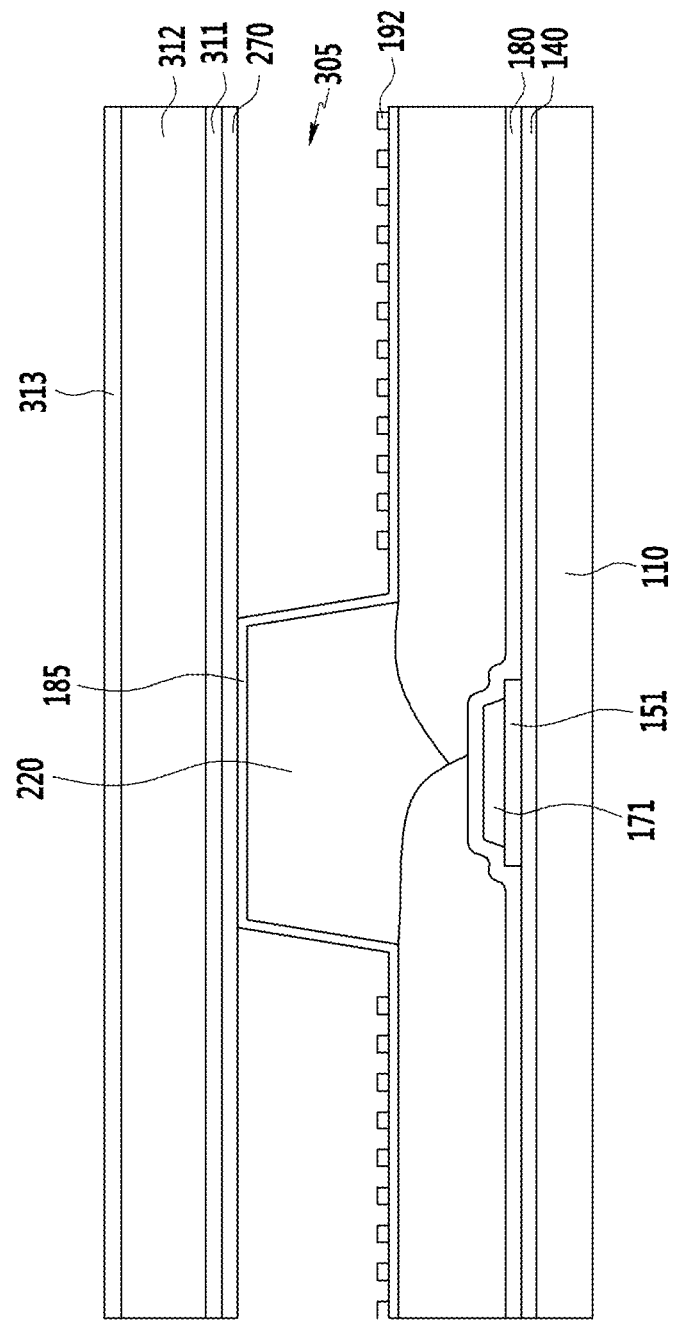

A common electrode 270 is disposed on the second passivation layer 185 and the pixel electrode 192, and a liquid crystal layer 3 is injected into a microcavity layer (305; referring to FIG. 12B). The common electrode 270 has a planar structure disposed substantially parallel to the insulation substrate at a position corresponding to a top surface of the second passivation layer 185 positioned on the light blocking member 220. In such an embodiment, the common electrode 270 is spaced apart or separated from the pixel electrode 192 by a predetermined distance such that a short circuit is not generated, and the common electrode 270 is not bent along the side of the microcavity layer 305 such that the electric field is not distorted. The common electrode 270 may be horizontally maintained on the microcavity layer by the support of a roof layer 312 that will be described later. When the common electrode 270 is horizontally maintained, a lower surface of the common electrode is maintained substantially parallel to the insulation substrate 110. In such an embodiment, the common electrode 270 exposes the portion of the liquid crystal injection hole 335, thereby extending along the direction of the gate line (left and right directions).

The common electrode 270 may include a transparent conductive material such as ITO or IZO, for example, and generates an electric field together with the pixel electrode 192 to control an alignment direction of liquid crystal molecules 310.

A lower insulating layer 311 is disposed on the common electrode 270. A liquid crystal injection hole 335 may be defined in the lower insulating layer 311 at one side to inject the liquid crystal into the microcavity layer 305. The lower insulating layer 311 may include the inorganic insulating material such as silicon nitride (SiNx), for example. The liquid crystal injection hole 335 may be used when a sacrificial layer for forming the microcavity 305 is removed, which will be described later in greater detail.

In an exemplary embodiment, the microcavity layer 305 in which the liquid crystal layer 3 is injected has the side wall corresponding to the tapered side wall of the light blocking member 220 such that the side wall of the microcavity layer 305 is reversely tapered.

In an exemplary embodiment, an alignment layer (not shown) may be disposed below the common electrode 270 and above the pixel electrode 192 to arrange the liquid crystal molecules 310 injected into the microcavity 305. The alignment layer may include at least one of materials such as polyamic acid, polysiloxane or polyimide, for example.

The liquid crystal layer 3 is disposed in the microcavity 305 (e.g., in the alignment layer in the microcavity 305). The liquid crystal molecules 310 are initially aligned by the alignment layer, and the alignment direction is changed according to the electric field generated therein. The height of the liquid crystal layer 3 corresponds to the height of the microcavity layer 305, and the height of the microcavity layer 305 corresponds to the height of the light blocking member 220. In an exemplary embodiment, the height of the microcavity layer 305 is substantially the same as the height of the second passivation layer 185 positioned on the light blocking member 220. In an exemplary embodiment, the thickness of the liquid crystal layer 3 in a vertical direction may be in a range of about 2.0 μm to about 3.6 μm. In an exemplary embodiment, where the thickness of the liquid crystal layer 3 is increased, the thickness of the light blocking member 220 is also increased.

In an exemplary embodiment, the liquid crystal layer 3 may be injected into the microcavity 305 using a capillary force, and the alignment layer may be provided by the capillary force.

The roof layer 312 is disposed on the lower insulating layer 311. The roof layer 312 may have a supporting function to define the microcavity layer between the pixel electrode 192 and the common electrode 270. In an exemplary embodiment, the roof layer 312 has the function of supporting the microcavity layer 305 by the predetermined thickness on the common electrode 270, and may have the liquid crystal injection hole 335 at one side such that the liquid crystal is injected into the microcavity layer 305.

An upper insulating layer 313 is disposed on the roof layer 312. The upper insulating layer 313 may include the inorganic insulating material such as silicon nitride (SiNx). The roof layer 312 and the upper insulating layer 313 may be patterned along with the lower insulating layer 311 to form the liquid crystal injection hole 335.

In an alternative exemplary embodiment, the lower insulating layer 311 and the upper insulating layer 313 may be omitted.

A polarizer (not shown) is disposed below and above the insulating layer 313 of the insulation substrate 110. The polarizer includes a polarization element for generating polarization and a tri-acetyl-cellulose ("TAC") layer for ensuring durability, and directions of transmissive axes in the upper polarizer and the lower polarizer may be substantially perpendicular or substantially parallel to each.

An exemplary embodiment of a manufacturing method of a liquid crystal of FIG. 1 to FIG. 3 will be described with reference to FIG. 4 to FIG. 12.

FIG. 4 to FIG. 12 are views showing an exemplary embodiment of a manufacturing method of the liquid crystal display of FIG. 1.

Figure 4:
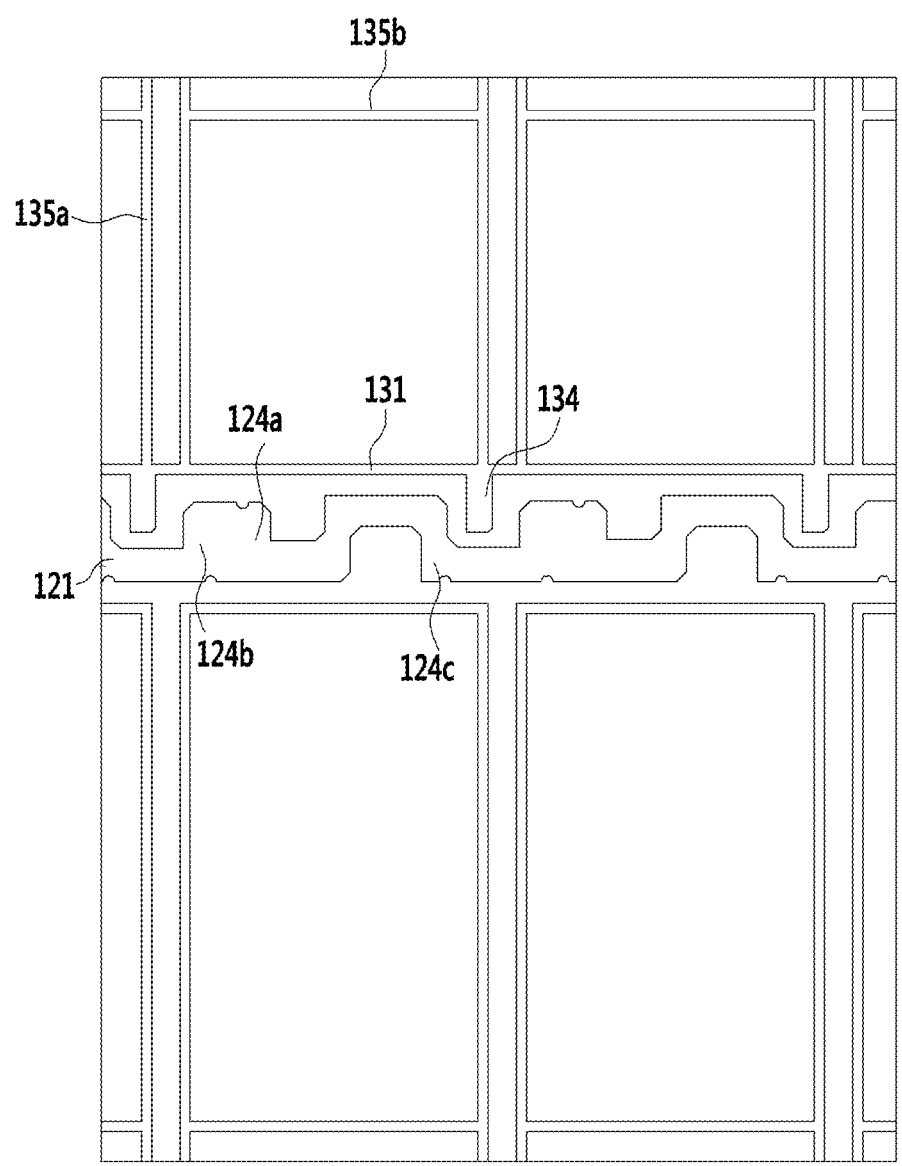
FIG. 4 to FIG. 12B are views showing an exemplary embodiment of a manufacturing method of the liquid crystal display of FIG. 1.

Firstly, FIG. 4 is a top plan view showing an exemplary embodiment of a manufacturing method of the liquid crystal display, in which a gate line 121 and a storage voltage line 131 provided on an insulation substrate.

Referring to FIG. 4, a gate line 121 and a storage voltage line 131 are provided on the insulation substrate including transparent glass, plastic, or the like. The gate line 121 and the storage voltage line 131 are provided together using a same material and a same mask. In an exemplary embodiment, the gate line 121 includes a first gate electrode 124a, a second gate electrode 124b, and a third gate electrode 124c, and the storage voltage line 131 includes storage electrodes 135a and 135b and a protrusion 134 protruding toward the gate line 121. The storage electrodes 135a and 135b have a structure surrounding a first subpixel electrode 192h and a second subpixel electrode 192l of a previous pixel. Since the gate voltage is applied to the gate line 121 and the storage voltage is applied to the storage voltage line 131, the gate line 121 and the storage voltage line 131 are separately provided. The storage voltage may have a predetermined voltage level or a swing voltage level.

A gate insulating layer 140 is provided on the gate line 121 and the storage voltage line 131.

Figure 5:
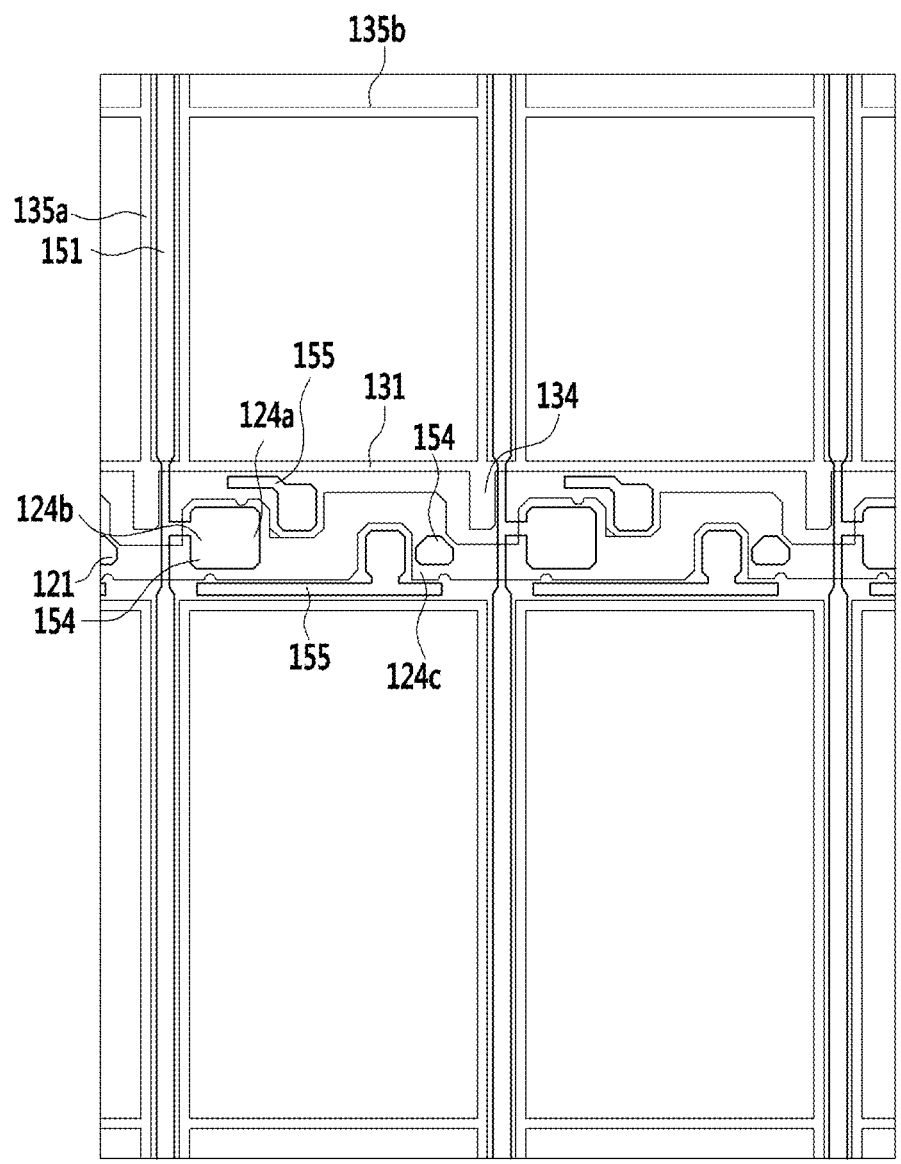
Figure 6:
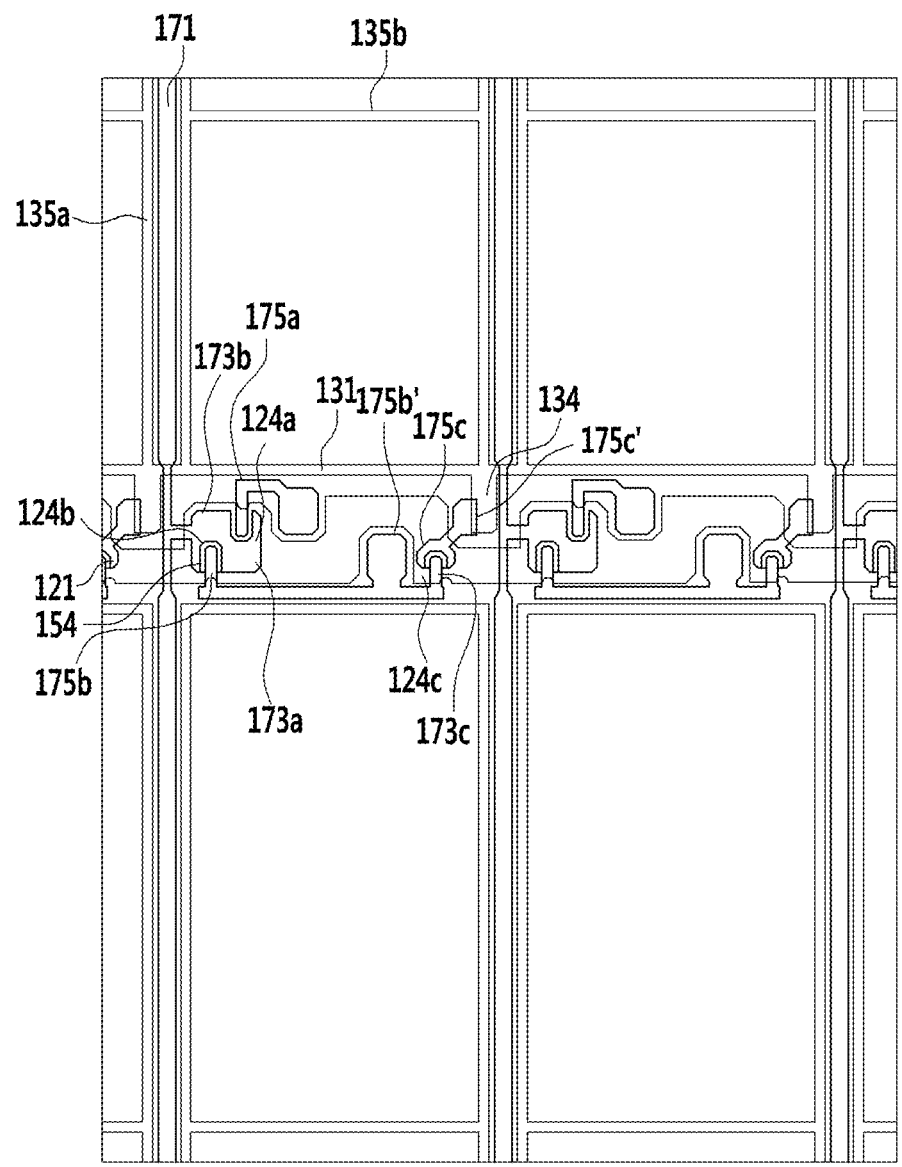

Thereafter, as shown in FIG. 5 and FIG. 6, semiconductors 151, 154 and 155, a data line 171 and source/drain electrodes 173a, 173b, 173c, 175a, 175b and 175c are provided on the gate insulating layer 140.

FIG. 5 is a top plan view showing an exemplary embodiment of a manufacturing method of the liquid crystal display, in which the semiconductors 151, 154, and 155 are provided, and FIG. 6 is a top plan view showing an exemplary embodiment of a manufacturing method of the liquid crystal display, in which the source/drain electrodes 173a, 173b, 173c, 175a, 175b, 175c, 175b' and 175c' are provided. In an exemplary embodiment, the semiconductors 151, 154 and 155, the data line 171, and the source/drain electrodes 173a, 173b, 173c, 175a, 175b, 175c, 175b' and 175c' are provided together by the following process.

In such an embodiment, a material for forming the semiconductors and materials for forming the source/drain electrodes are sequentially laminated. Thereafter, two patterns are provided together by one process of exposing, developing and etching through a single mask (e.g., slit mask or transflective mask). In such an embodiment, the slit or transflective region of the mask is disposed at a position corresponding to the portion to be etched such that the semiconductor 154 positioned at the channel portion of the thin film transistor is not etched.

In an exemplary embodiment, a plurality of ohmic contacts may be provided on each of the semiconductors 151, 154 and 155 and between the data line 171 and the source/drain electrodes.

A first passivation layer 180 is provided on substantially an entire region of the data conductors 171, 173a, 173b, 173c, 175a, 175b and 175c and an exposed portion of the semiconductor 154. The first passivation layer 180 may include an inorganic insulator such as silicon nitride (SiNx) and silicon oxide (SiOx), for example, or an organic insulator.

Figure 7A:
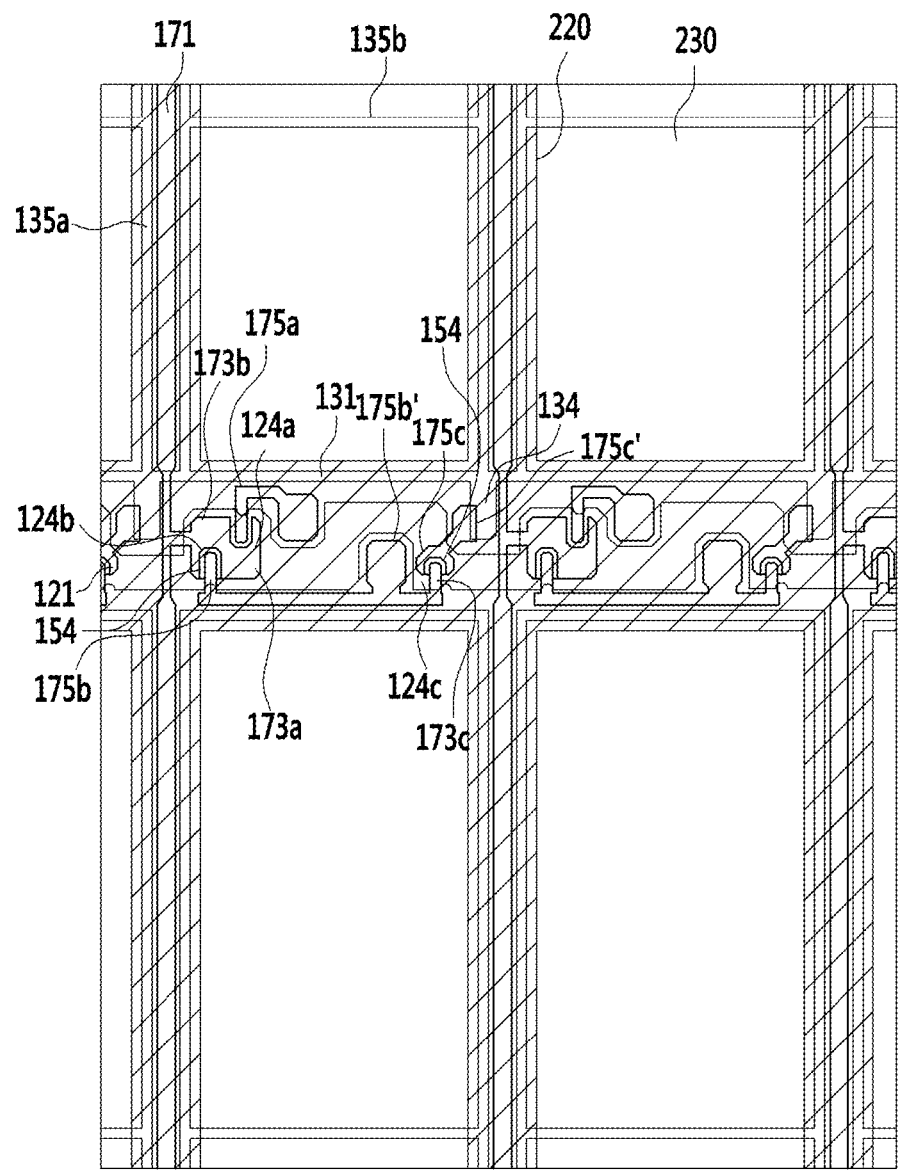
Figure 7B:
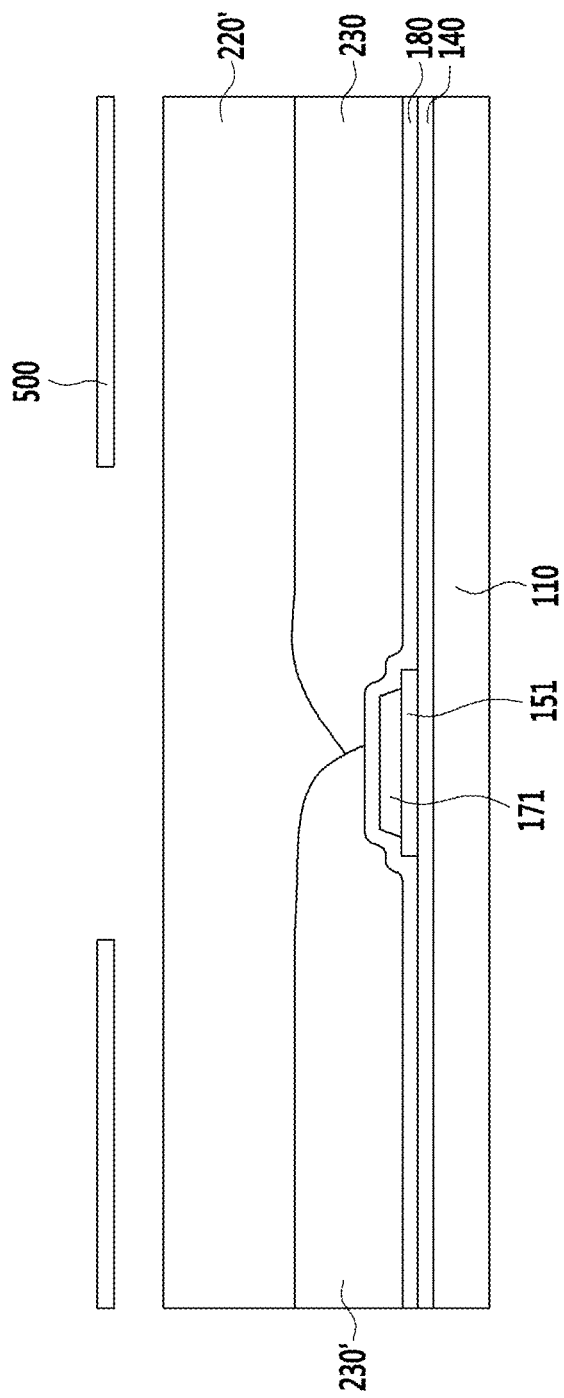

Thereafter, as shown in FIG. 7A to 7C, color filters 230 and a light blocking member (black matrix) 220 are provided on the passivation layer 180. Here, FIG. 7A is a top plan view showing an exemplary embodiment of a manufacturing method of the liquid crystal display corresponding to FIG. 1, FIG. 7B and FIG. 7C are cross-sectional views showing an exemplary embodiment of a manufacturing method of the liquid crystal display corresponding to FIGS. 2 and 3, where FIG. 7B shows an exposure process using a mask 500, and FIG. 7C is a cross-sectional view showing the light blocking member 220 after an exposure and an etching.

When providing the color filter 230 and the light blocking member 220, the color filter 230 is firstly provided. The color filter 230 of one color is provided in the vertical direction (the data line direction), and the color filters 230 and 230' of different colors are provided in the pixels adjacent in the horizontal direction (the gate line direction). In such an embodiment, the exposure, the developing and the etching process are performed for the color filter 230 for each of the color filters 230 and 230' of different colors. In an exemplary embodiment of the liquid crystal display including three primary colors, the color filter 230 is provided by performing the exposure, developing and etching processes three times. In such an embodiment, the color filter 230' that is firstly provided is positioned downward and the color filter 230 that is later provided is positioned upward on the data line 171, thereby overlapping each other on the data line 171.

When etching the color filter 230, the color filter 230 may be previously removed at the position where the contact holes 186a, 186b and 186c are provided.

The light blocking member 220 including the material, through which light is not transmitted, is provided on the color filter 230. A shown in a light blocking member 220 (slashed portion of FIG. 7A), the light blocking member 220 is provided to have the lattice structure including the opening corresponding to the region for displaying the image. The color filter 230 is provided in the opening.

As shown in FIG. 7A, the light blocking member 220 has a portion provided in the horizontal direction along the transistor formation region where the gate line 121, the storage voltage line 131 and the thin film transistor are provided, and a portion provided in the vertical direction along a region where the data line 171 is provided.

Figure 19:
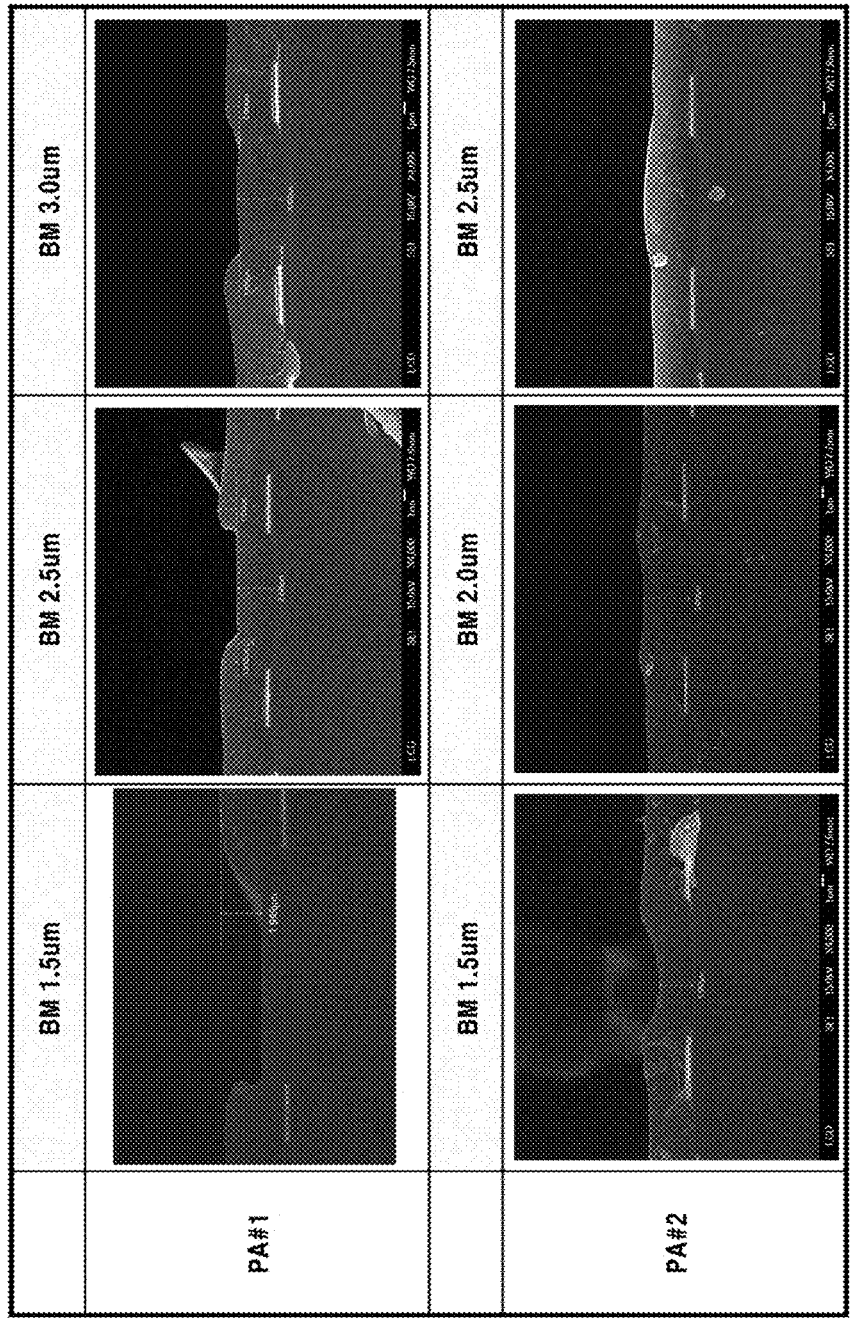
FIG. 19 is a view picturing a cross-sectional of an exemplary embodiment of a light blocking member according to the invention.

The light blocking member 220 is provided with the predetermined height or thickness to define the microcavity layer 305 to inject the liquid crystal layer 3. The light blocking member 220 may include the organic material for the spacer and the black color pigment for blocking the light, and FIG. 19 show the light blocking member 220 provided with various heights or thicknesses. In an exemplary embodiment, the light blocking member 220 may have a thickness in a range of about 2.0 µm to about 3.6 µm.

In an exemplary embodiment, the side wall of the light blocking member 220 is tapered. In an exemplary embodiment, for forming the tapered side wall, the mask may include a transflective pattern or a slit pattern to control the exposure amount. In an alternative exemplary embodiment, the tapered side wall may be naturally provided in the etching process without the transflective pattern or the slit pattern of the mask.

Figure 8A:
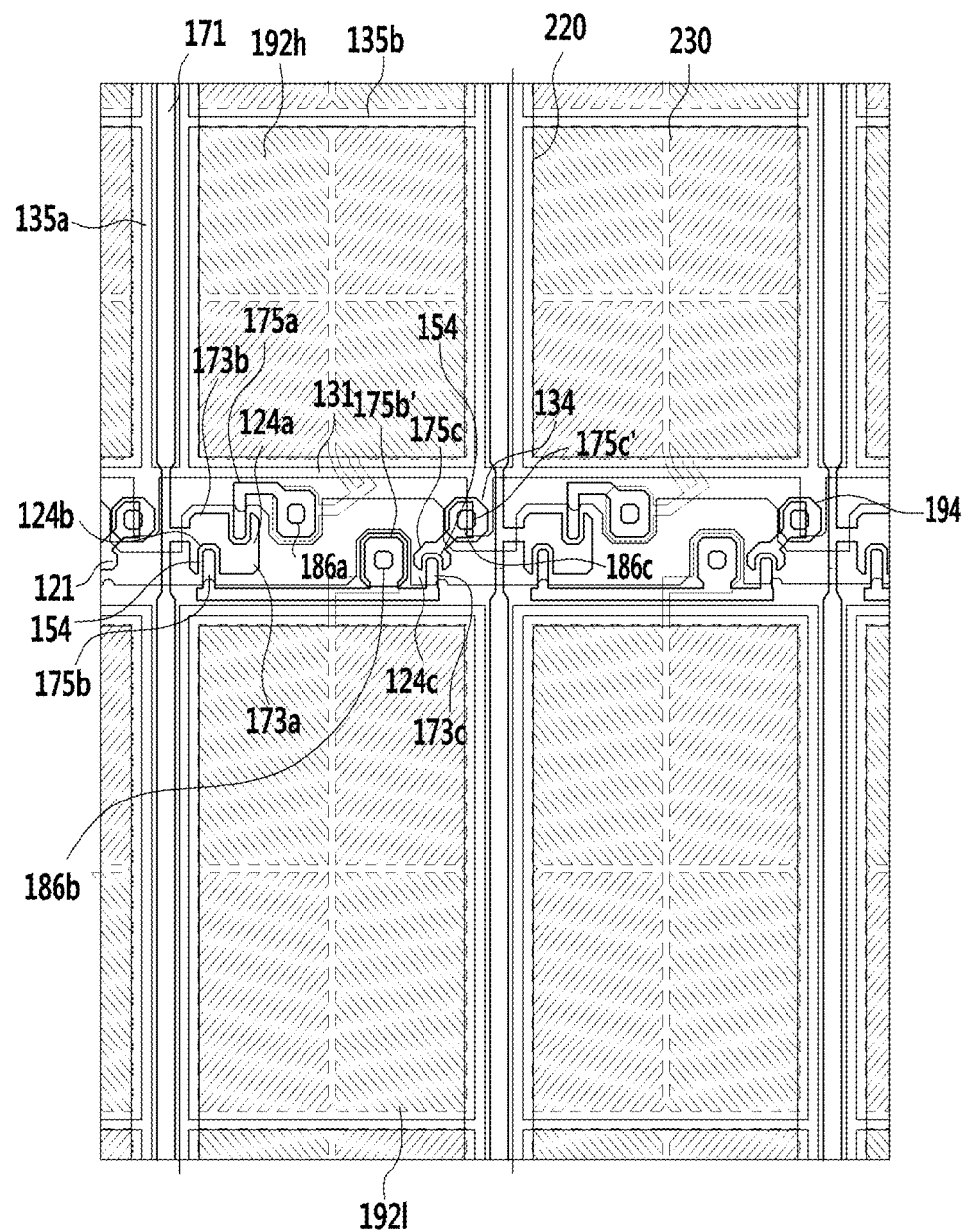
Figure 8B:
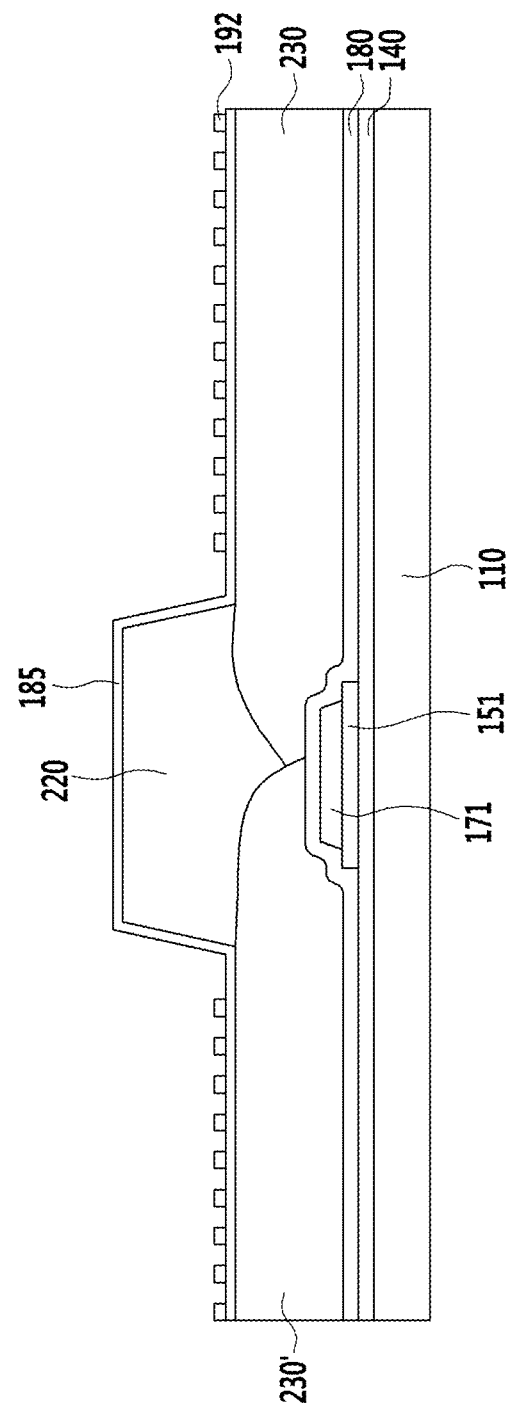

Referring to FIG. 8A and FIG. 8B, a second passivation layer 185 is provided on substantially an entire region of the color filter 230 and the light blocking member 220. The second passivation layer 185 may include an inorganic insulator such as silicon nitride (SiNx) and silicon oxide (SiOx), for example, or an organic insulator.

Next, a first contact hole 186a and a second contact hole 186b, which expose the first drain electrode 175a and extensions 175b' of the second drain electrode 175b, respectively, are provided in the color filter 230, the light blocking member 220 and the passivation layers 180 and 185. A third contact hole 186c which exposes the protrusion 134 of the storage voltage line 131 and the extension 175c' of the third drain electrode 175c is provided in the color filter 230, the light blocking member 220 and the passivation layers 180 and 185.

Thereafter, a pixel electrode 192 including a first subpixel electrode 192h and a second subpixel electrode 192l is provided on the second passivation layer 185. In an exemplary embodiment, the pixel electrode 192 may include a transparent conductive material such as ITO or IZO, for example. In such an embodiment, the first subpixel electrode 192h and the second subpixel electrode 192l are physically and electrically connected to the first drain electrode 175a and the second drain electrode 175b through the contact holes 186a and 186b. In such an embodiment, a connecting member 194 which electrically connects the extension 175c' of the third drain electrode 175c and the protrusion 134 of the storage voltage line 131 through the third contact hole 186c is also provided. In an exemplary embodiment, part of the data voltage applied to the second drain electrode 175b is divided through the third source electrode 173c, and thus the magnitude of the voltage applied to the second subpixel electrode 192l may be less than the magnitude of the voltage applied to the first subpixel electrode 192h.

FIG. 8B is the cross-section of a portion of FIG. 8A corresponding to FIG. 2.

Figure 9A:
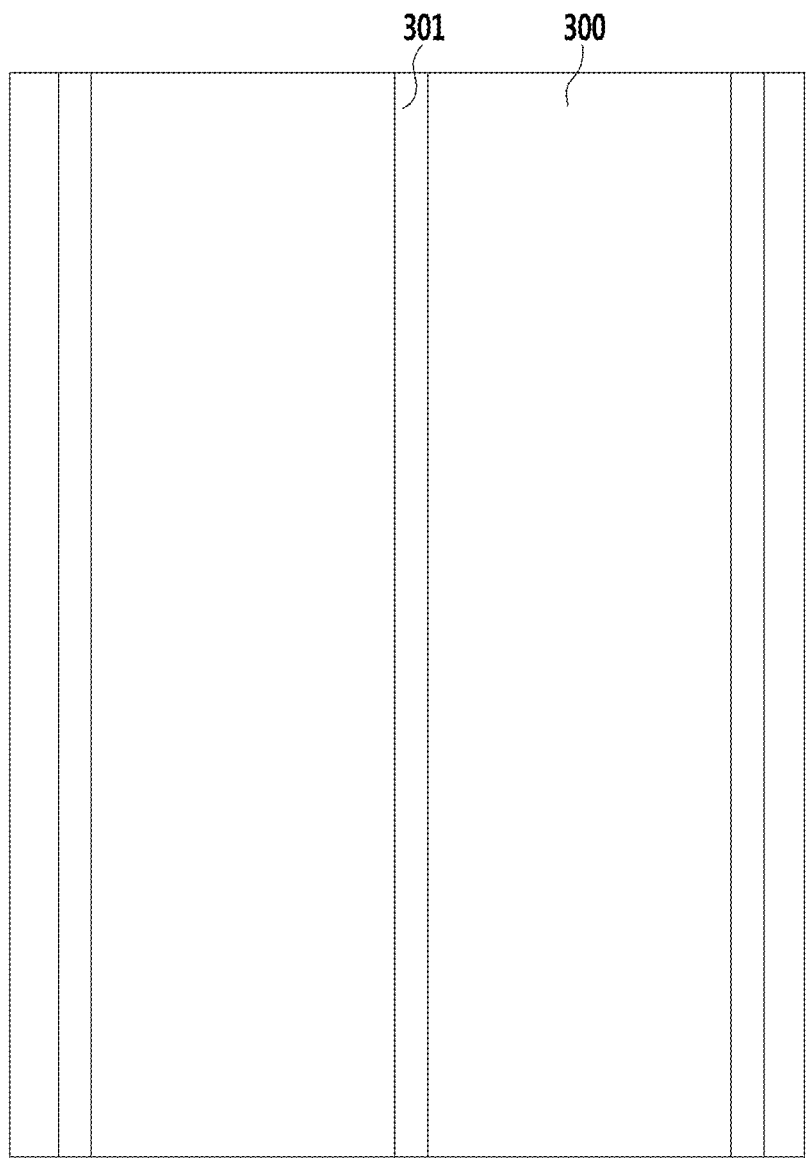

Next, as shown in FIG. 9A and FIG. 9B, a sacrificial layer 300 having an opening 301 is provided. The sacrificial layer 300 may include an organic material such as a photoresist ("PR"), and PR is deposited and exposed, then developed and etched using a mask 500 to complete the sacrificial layer 300. The sacrificial layer 300 is provided with reference to the region where the light blocking member 220 is not provided such that the side wall of the light blocking member 220 and the side wall of the sacrificial layer 300 correspond to each other. In such an embodiment, the side wall of the sacrificial layer 300 is reversely tapered by corresponding to the tapered side wall of the light blocking member 220. The sacrificial layer 300 has the opening 310 which is positioned between a main body corresponding to a structure of a microcavity and an adjacent main body at a position to form the microcavity. A width of the opening 301 may be about 2.5 µm. In such an embodiment, the height of the sacrificial layer 300 may be substantially the same as the height of the second passivation layer 185 at the upper surface of the light blocking member 220. In FIG. 9B, the PR for the sacrificial layer 300 maintained on the upper surface of the light blocking member 220, which is exposed by the mask, is not maintained on the light blocking member 220 after the etching. In an alternative exemplary embodiment, the PR on the upper surface of the light blocking member 220 may be maintained without being etched.

Figure 10A:
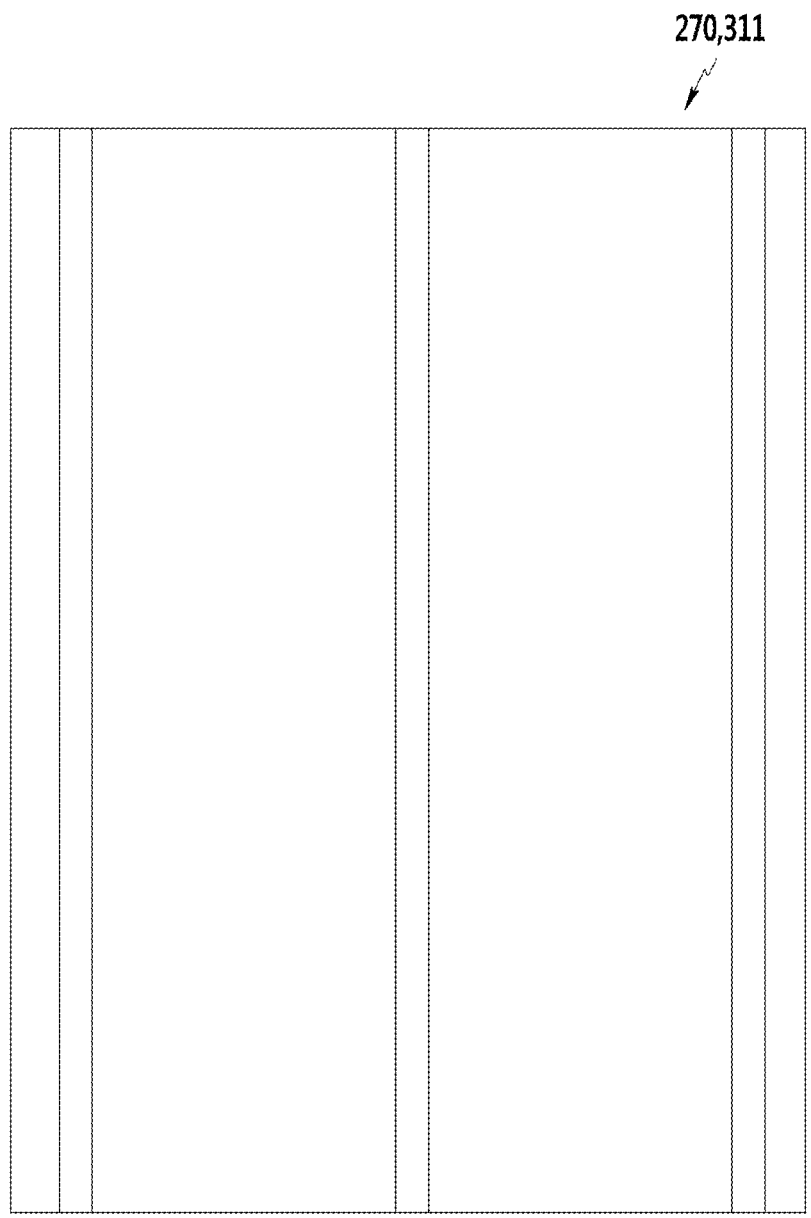
Figure 10B:
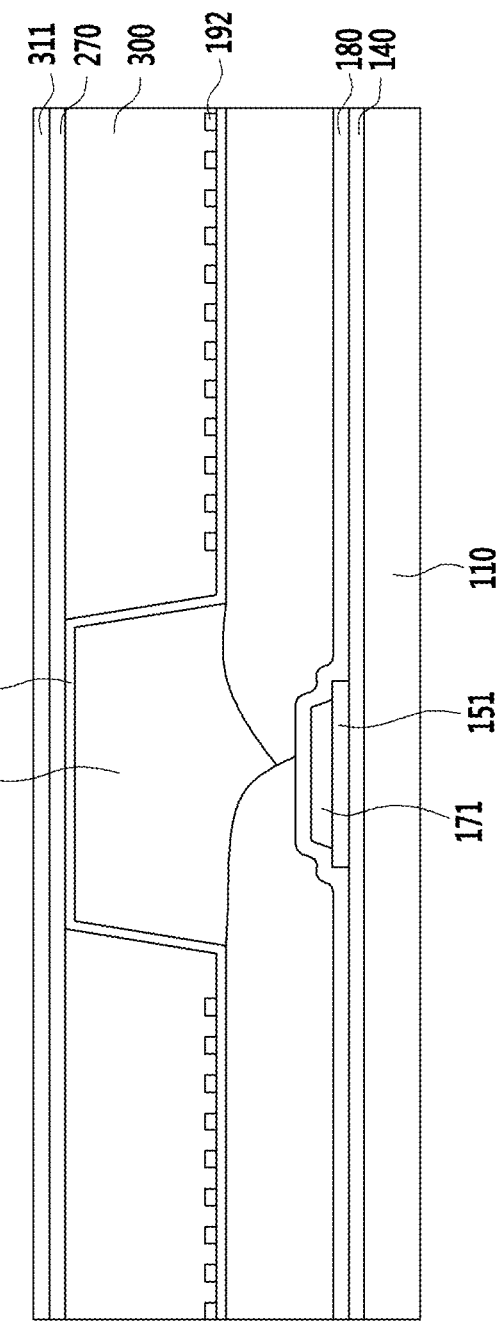

Next, as shown in FIG. 10A and FIG. 10B, a common electrode 270 and a lower insulating layer 311 are sequentially provided. In such an embodiment, a transparent conductive material such as ITO or IZO, for example, for forming the common electrode 270 is laminated over substantially the region of the display panel, and then material including an inorganic insulating material such as silicon nitride (SiNx), for example, for forming the lower insulating layer 311 is laminated over substantially an entire region of the display panel. As a result, the lower insulating layer 311 is provided to cover the common electrode 270.

Figure 11A:
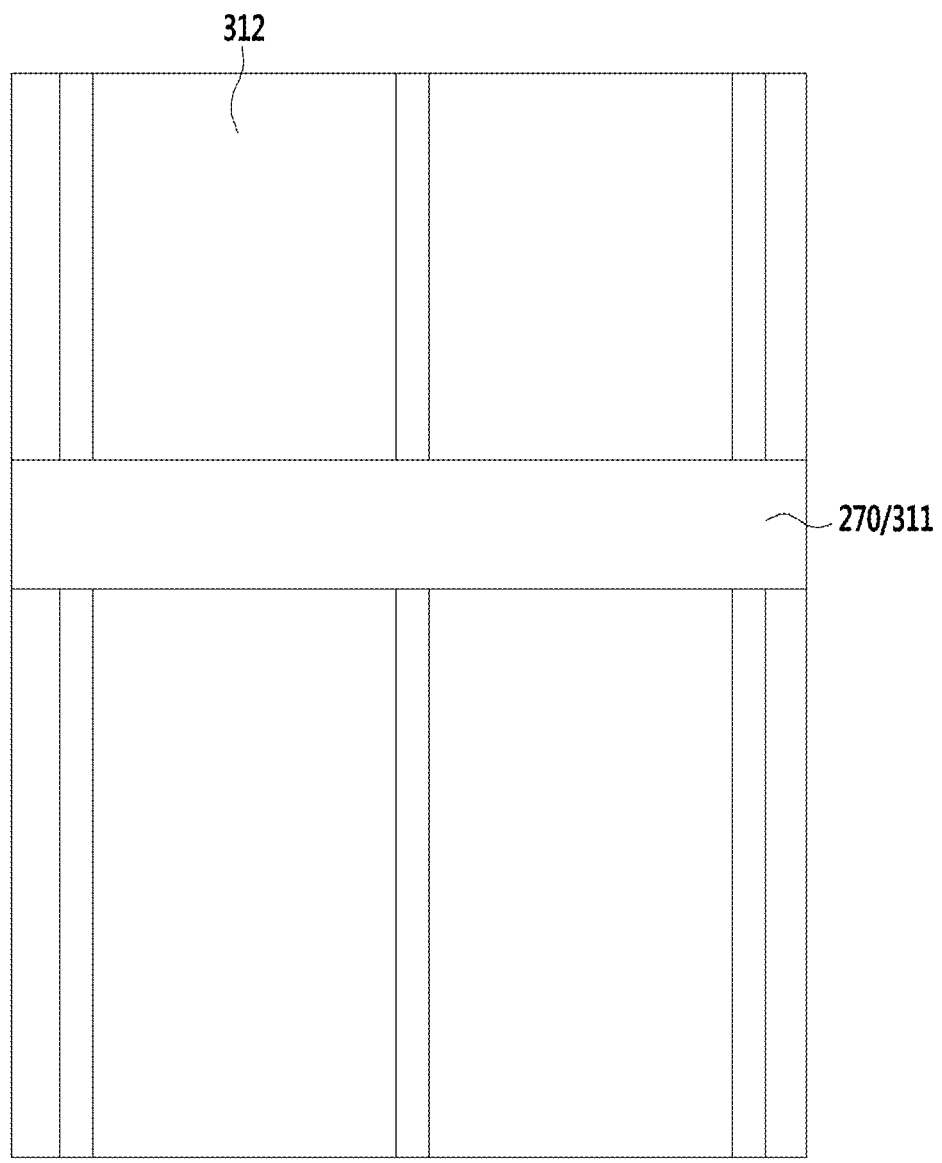

Next, as shown in FIG. 11A, a roof layer 312 is provided. The roof layer 312 may include an organic material, and the roof layer 312 exposes a region (hereinafter referred to as "a liquid crystal injection hole open region") that is etched in the process of forming the liquid crystal injection hole 335. In FIG. 11A, the liquid crystal injection hole open region corresponds to the thin film transistor formation region, and has a structure extending along the gate line. As shown in FIG. 11A, a portion of the common electrode 270 and the lower insulating layer 311 in the corresponding region is exposed by the roof layer 312. In an exemplary embodiment, the upper surface of the lower insulating layer 311 is exposed at the liquid crystal injection hole open region, which is covered by the common electrode 270.

In such an embodiment, a material for the roof layer 312 including the organic material is deposited in substantially the entire region of the panel, and exposed and developed using a mask, and then the roof layer 312 is provided by removing the material for the roof layer of the region corresponding to the liquid crystal injection hole open region. In such an embodiment, the common electrode 270 and the support layer 311 which are provided below the roof layer 312 are not etched and thereby exposed. In the liquid crystal injection hole open region, only the sacrificial layer 300, the common electrode 270 and the lower insulating layer 311 are provided, and in the remaining region, the sacrificial layer 300 or the opening 301, the common electrode 270, the lower insulating layer 311 and the roof layer 312 are deposited.

Next, as shown in FIG. 11B, FIG. 11C, FIG. 12A and FIG. 12B, a material for an upper insulating layer 313 including an inorganic insulating material such as silicon nitride (SiNx), for example, is deposited (referring to FIG. 11A and FIG. 11B), and is etched for the liquid crystal injection hole open region (referring to FIG. 12A and FIG. 12B) to form an upper insulating layer 313 and a liquid crystal injection hole 335.

Figure 11B:
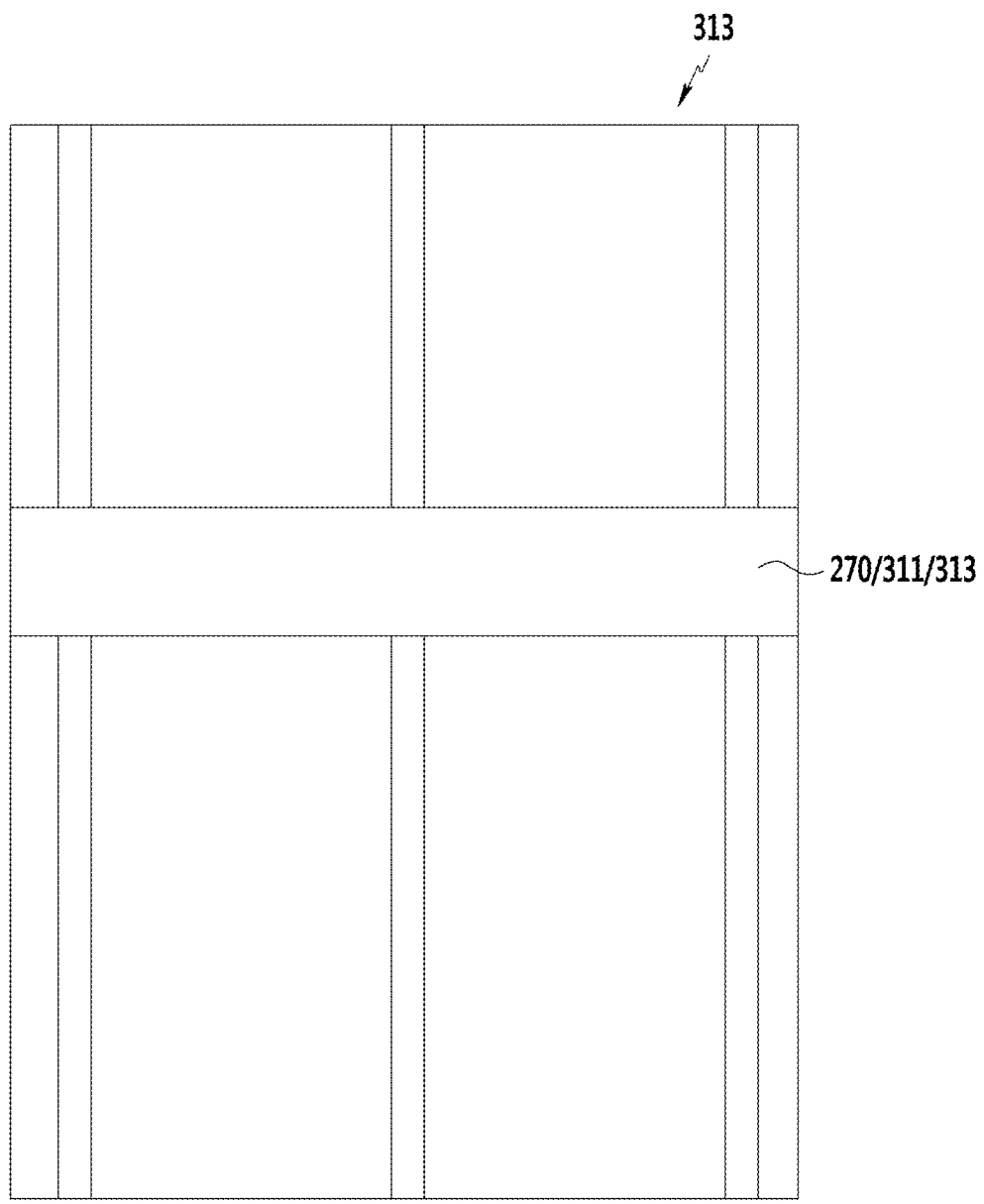
Figure 11C:
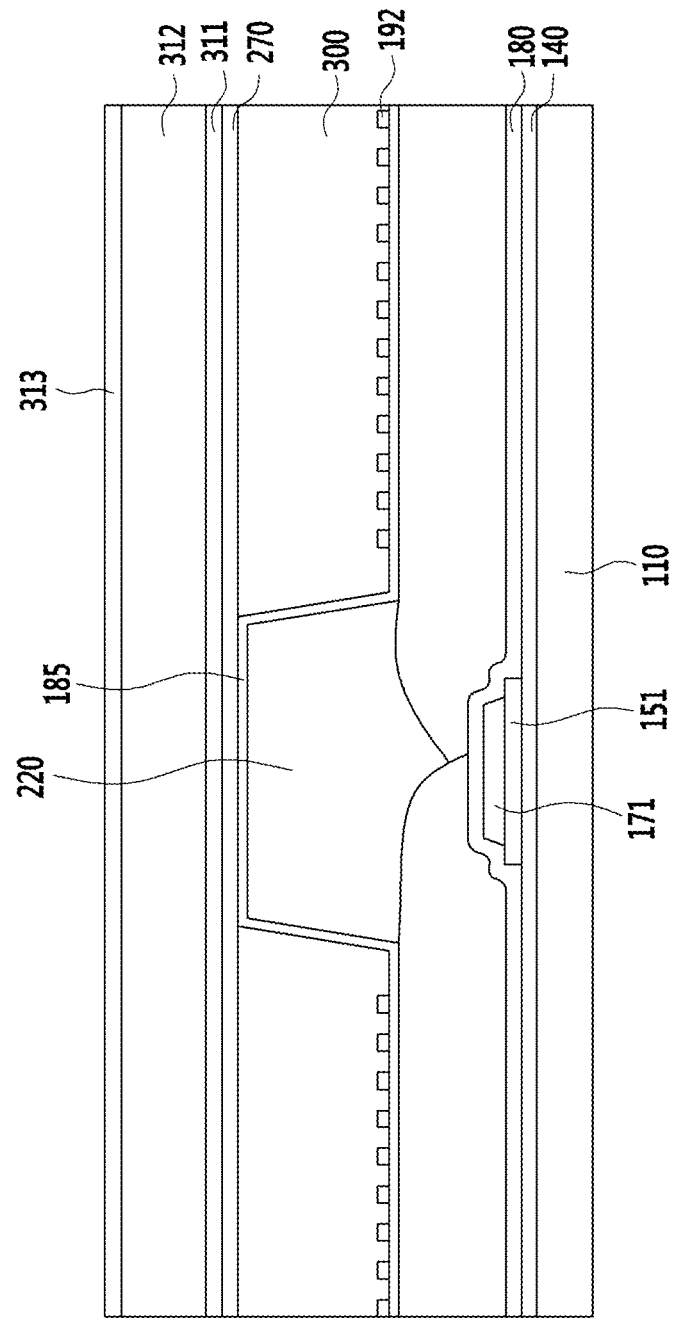

In such an embodiment, as in FIG. 11B and FIG. 11C, the material for the upper insulating layer 313 including the inorganic insulating material such as silicon nitride (SiNx) is deposited on substantially the entire region of the display panel. As a result, as shown in FIG. 11B and FIG. 11C, the material for the upper insulating layer 313 is disposed on the roof layer 312 and is also disposed in the liquid crystal injection hole open region, which is exposed by the roof layer 312 such that the material for the upper insulating layer 313 is provided on the lower insulating layer 311 of the liquid crystal injection hole open region. In FIG. 11B, 270/311/313 means that the common electrode 270, the lower insulating layer 311 and the material for the upper insulating layer 313 are sequentially deposited in the liquid crystal injection hole open region. In an exemplary embodiment, the liquid crystal injection hole open region is not removed such that the structure of the common electrode 270, the lower insulating layer 311, the roof layer 312 and the material for the upper insulating layer 313 are sequentially deposited as shown in FIG. 11C.

Next, as shown in FIG. 12A and FIG. 12B, a process of etching the liquid crystal injection hole open region is performed. To etch the liquid crystal injection hole open region, the PR is provided on substantially the entire region, and the PR corresponding to the liquid crystal injection hole open region is removed to form a photoresist pattern, and the liquid crystal injection hole open region is etched according to the photoresist pattern. In such an embodiment, the material for the upper insulating layer 313, the lower insulating layer 311, the common electrode 270 and the sacrificial layer 300 are etched, and the underlying layer is not etched. According to an exemplary embodiment, the sacrificial layer 300 may be partially etched or may not be etched. In an exemplary embodiment, the process of etching the liquid crystal injection hole open region may be a dry etch process. In an alternative exemplary embodiment, where an etchant capable of etching several layers together exists, a wet etch process may be applied.

Next, as shown in FIG. 12B, the sacrificial layer 300 is removed through the liquid crystal injection hole open region to form a microcavity layer 305. In an exemplary embodiment, the sacrificial layer 300 is provided by the PR, and a process of removing the photoresist pattern provided on the upper insulating layer 313 is thereby performed together. In such an embodiment, the photoresist pattern provided on the upper insulating layer 313 together with the sacrificial layer 300 is immersed in an etchant (for example, a photoresist stripper) for removing the photoresist pattern to be wet-etched. In such a process, the process of removing the PR provided on the upper insulating layer 313 and the process of removing the sacrificial layer 300 may be performed together, such that a manufacturing process is substantially simplified. In an alternative exemplary embodiment, where the sacrificial layer 300 is provided by a material other than the PR, the two processes may be separately performed. In such an embodiment, the sacrificial layer 300 may be dry-etched.

Thereafter, as shown in FIG. 2 and FIG. 3, an alignment layer (not shown) or a liquid crystal material is injected in the provided microcavity 305 using the capillary force to form the liquid crystal layer 3.

Although not shown, a process of sealing the microcavity layer 305 may further be performed to effectively prevent the liquid crystal layer 3 from flowing out of the microcavity layer 305.

In an exemplary embodiment, as described above, process time is shortened by removing the PR for forming the liquid crystal injection hole open region and the sacrificial layer 300 together. In such an embodiment, the process time is shortened in a subsequent liquid crystal injection hole opening by removing the roof layer 312 in the liquid crystal injection hole open region when providing the roof layer 312. In such an embodiment, a mask used when the roof layer 312 of the liquid crystal injection hole open region is removed in FIG. 11 and a mask used when the PR is provided to etch the liquid crystal injection hole open region in FIGS. 12A and 12B may be the same as each other. In an alternative exemplary embodiment, the roof layer 312 corresponding to the liquid crystal injection hole open region may not be removed when the roof layer 312 is provided, and as shown in FIGS. 12A and 12B, when the liquid crystal injection hole open region is etched, the roof layer 312 corresponding to the liquid crystal injection hole open region may also be provided together.

In an alternative exemplary embodiment, the lower insulating layer 311 and the upper insulating layer 313 may be omitted.

In an exemplary embodiment, a process of attaching a polarizer (not shown) below the insulation substrate 110 and above the upper insulating layer 313 may be further provided. The polarizer includes a polarization element for generating polarization and a TAC layer for ensuring durability, and directions of transmissive axes in the upper polarizer and the lower polarizer may be substantially perpendicular or substantially parallel to each other.

In an exemplary embodiment, as described above, the side wall of the sacrificial layer 300 has the reversed taper structure corresponding to the tapered side wall of the light blocking member 220. As a result, the side wall of the microcavity layer 305 has the reversed taper structure such that misalignment of the liquid crystal molecule 310 is effectively prevented, which will hereinafter be described with reference to FIG. 13 to FIG. 18.

Figure 13:
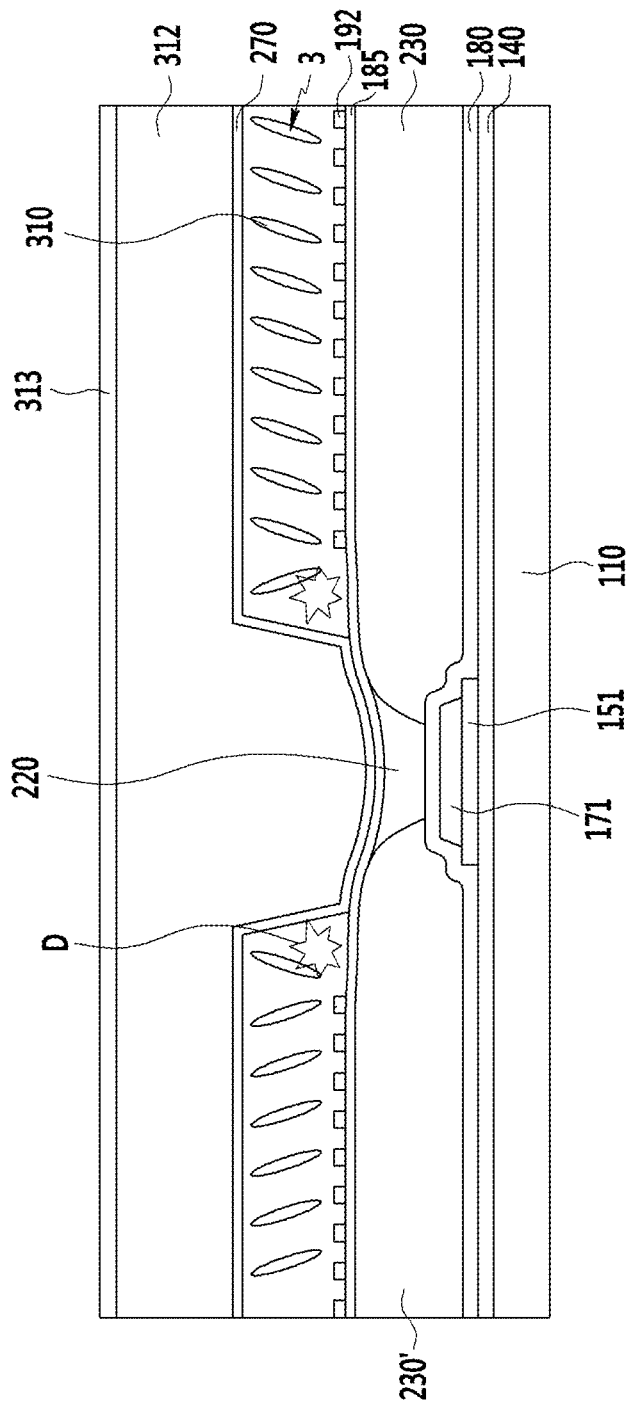
FIG. 13 is a view showing a misalign state of liquid crystal molecules in a comparative embodiment of a liquid crystal display.

FIG. 13 is a view showing a misalignment state of liquid crystal molecules in a comparative embodiment of a liquid crystal display.

As shown FIG. 13, in the comparative embodiment of the liquid crystal display, the side wall of the microcavity layer including the liquid crystal layer has the taper structure. In an exemplary embodiment, the side wall of the microcavity layer 305 has the reversed taper structure. In the comparative embodiment, the light blocking member is s, the roof layer having the supporting function is disposed thereon, the side wall of the roof layer having the supporting function is disposed with the reversed taper structure, and the side wall of the microcavity layer has the taper structure.

The liquid crystal layer arranged at the side wall portion of the microcavity layer of FIG. 13 has the arrangement direction that is mismatched to the arrangement direction of the liquid crystal molecule of other portion by the inclination of the side wall.

Figure 14:
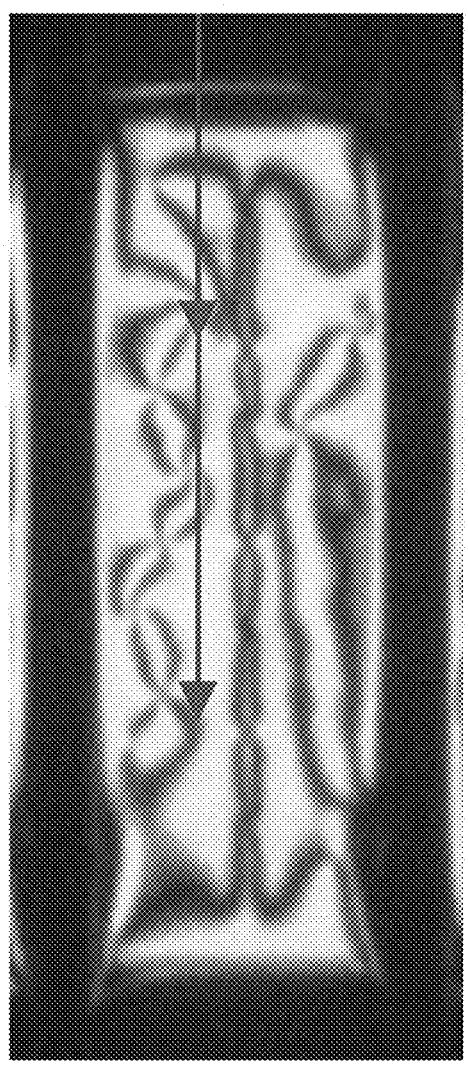
FIG. 14 and FIG. 15 are views showing texture and light leakage generated according to a liquid crystal collision in a comparative embodiment a liquid crystal display.
Figure 15:
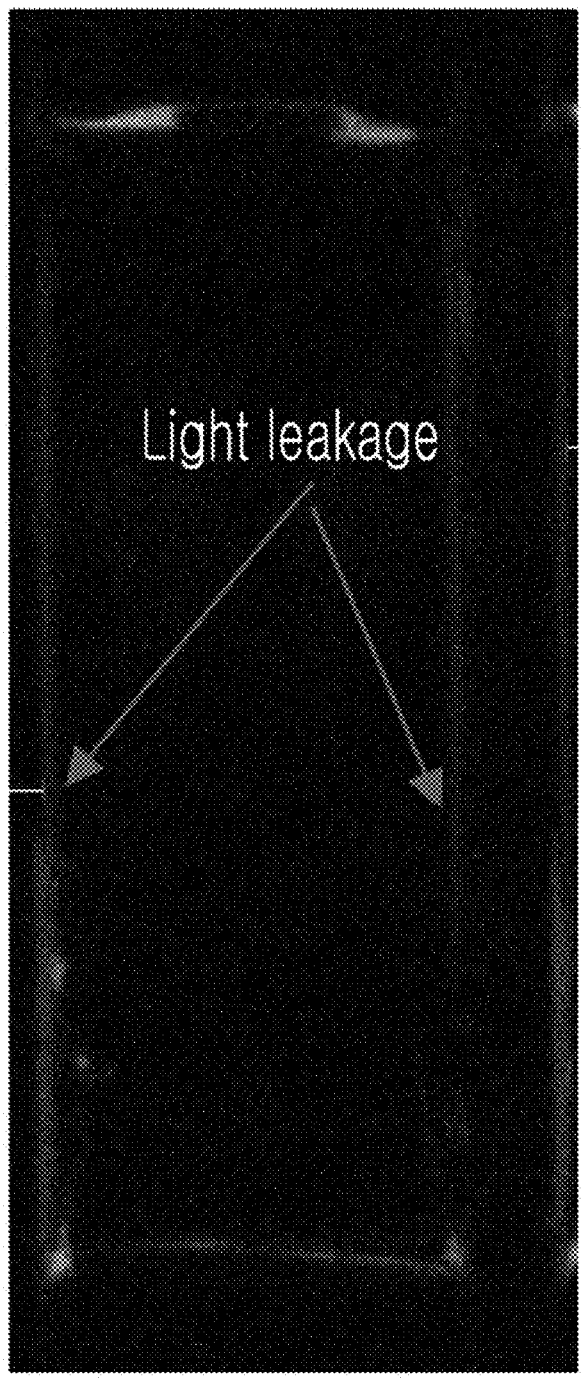

Accordingly, the mismatch of the arrangement direction of the liquid crystal molecules generates texture, and light leakage due to a declination as shown in FIG. 14 and FIG. 15.

FIG. 14 and FIG. 15 are views showing texture and light leakage generated according to a liquid crystal collision in a comparative embodiment of a liquid crystal display.

Figure 16:
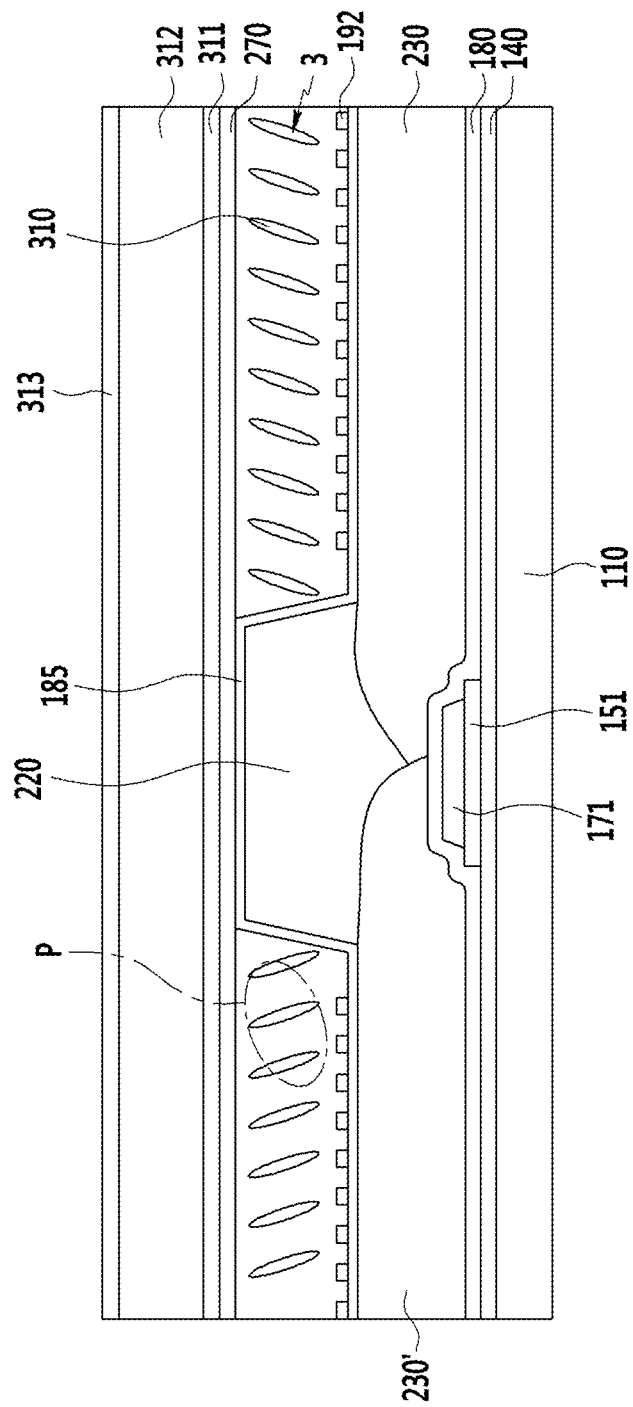
FIG. 16 is a view showing an arrangement state of liquid crystal molecules in an exemplary embodiment of a liquid crystal display according to the invention.

In an exemplary embodiment, the side wall of the reversed taper structure of the microcavity layer 305 is provided as shown in FIG. 16.

FIG. 16 is a view showing an arrangement state of a liquid crystal molecule in an exemplary embodiment of a liquid crystal display according to the invention.

Referring to FIG. 16, the side wall of the microcavity layer 305 has the reversed taper structure such that the liquid crystal molecule near the side edge of the microcavity layer has the same arrangement direction such that the misalignment of the liquid crystal molecule arrangement is not generated (referring to a region P of FIG. 16).

Referring back to FIG. 13, the common electrode 270 in a comparative exemplary embodiment of the liquid crystal display is positioned under the roof layer, and is moved downward between a supporting portion supporting the roof layer 312 and the light blocking member 220 on the light blocking member 220. In the comparative embodiment, due to the structure of the common electrode 270, the common electrode 270 may be shorted with the underlying pixel electrode 192, and the distortion of the electric field may be generated at the portion where the common electrode 270 is bent or is moved downward toward the light blocking member 220.

In an exemplary embodiment of the invention, the common electrode 270 is horizontally formed, e.g., formed to maintain the planar shape thereof at a predetermined level from the insulation substrate 110, on the light blocking member 220 such that the short circuit with the underlying pixel electrode is effectively prevented and the electric field is not distorted.

Figure 18:
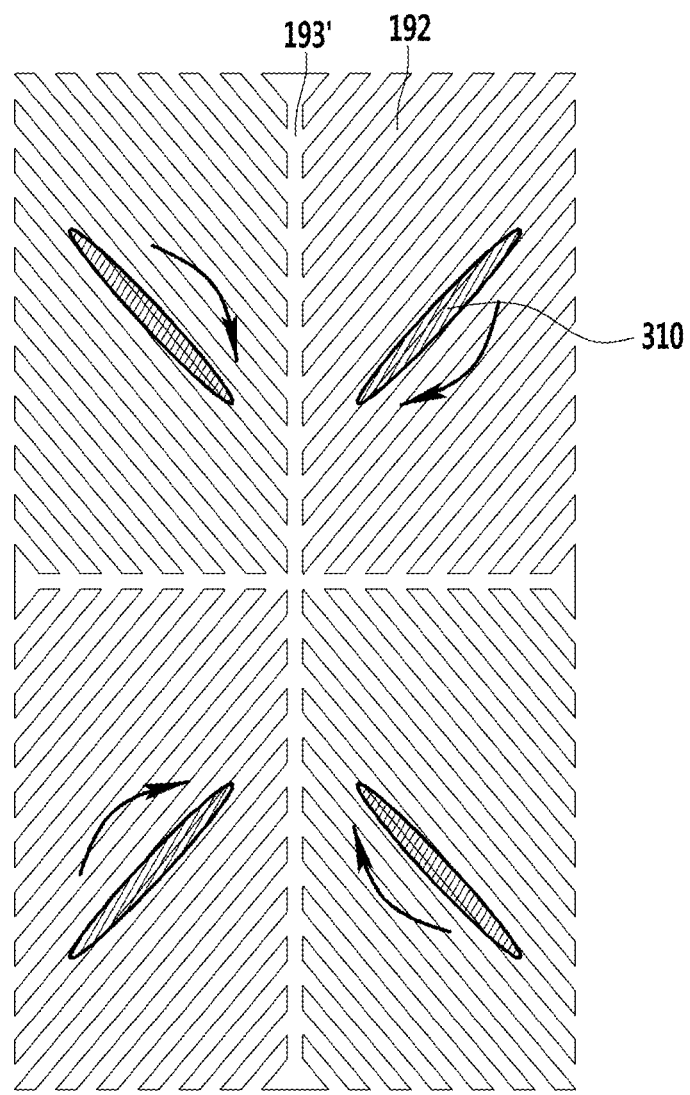

In an exemplary embodiment of the invention, the display device may include a pixel electrode structure shown in FIG. 18.

Figure 17:
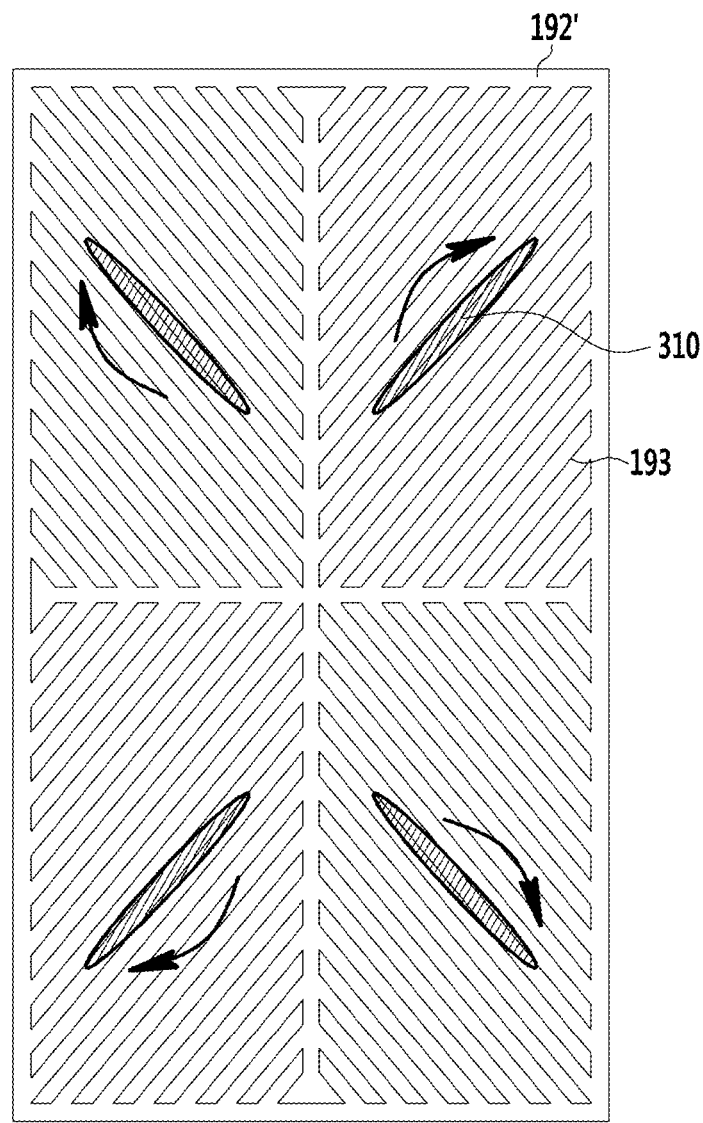
FIG. 17 and FIG. 18 are views showing rotation directions of liquid crystal molecules according to a structure of a pixel electrode.

FIG. 17 and FIG. 18 are views showing a rotation direction of liquid crystal molecules according to a structure of a pixel electrode.

In the comparative embodiment, the liquid crystal molecules may be slanted toward the outside at the side wall portion of the microcavity layer as shown in FIG. 13, and a pixel electrode having the structure, in which all liquid crystal molecules are similarly slanted, may be used, as shown in FIG. 17. The pixel electrode 192' of FIG. 17 includes the minute branches extending from four edges forming the outer perimeter at about 45 degrees and an opening 193 is formed at the center of the pixel electrode. The opening 193 has a stem opening having a cross shape and a branch opening extending from the stem opening with the angle of about 45 degrees.

In the structure of FIG. 17, the liquid crystal molecules are naturally slanted at the outside, and if the pixel electrode is applied to the comparative embodiment of FIG. 13, the liquid crystal molecules are all slanted at the outside on substantially the entire region as well as the side edge of the microcavity layer such that the declination is not generated.

In an exemplary embodiment of the invention, where the microcavity layer 305 having the reversely-tapered side wall is used, the liquid crystal layer is slanted inside at the side wall portion of the microcavity layer 305 (referring to FIG. 16), and the pixel electrode having the structure of FIG. 18 may be used.

The pixel electrode 192 shown in FIG. 18 includes a branch electrode 193' having the cross shape at the center and minute branches extending from the branch electrode 193 with the angle of about 45 degrees. In an exemplary embodiment, by the pixel electrode of FIG. 18, the liquid crystal molecules may be naturally slanted at the inner side such that the misalignment of the liquid crystal molecules is not generated on substantially the entire region as well as the side edge region of the microcavity layer 305.

As described above, an exemplary embodiment of the invention and the comparative embodiment are substantially the same as each other except that the structural of the side wall due to the different structures of the light blocking member 220. In the comparative embodiment, the light blocking member is lower than the microcavity layer such that the microcavity layer is not influenced. In an exemplary embodiment of the invention, the light blocking member 220 is formed while having the tapered side wall and corresponding to the height of the microcavity layer such that the side wall of the microcavity layer has the corresponding reversed taper structure. In an exemplary embodiment, the light blocking member 220 has the height or thickness in a range of about 2.0 μm to about 3.6 μm, and the height is shown through a cross-sectional photo of the light blocking member 220 in FIG. 19.

FIG. 19 is a view showing a cross-section of an exemplary embodiment of a light blocking member according to the invention.

As shown in FIG. 19, the light blocking member 220 may have the height or thickness in a range of about 1.5 μm to about 3.6 μm. FIG. 19 is the photo showing that the height is about 3 μm. In an alternative exemplary embodiment, the height or thickness may be greater than about 3 μm by controlling the material of the light blocking member 220 and the process conditions. The light blocking member 220 may have a height in a range of about 2.0 μm to about 3.6 μm, as described above, in an exemplary embodiment of the invention.

Figure 20:
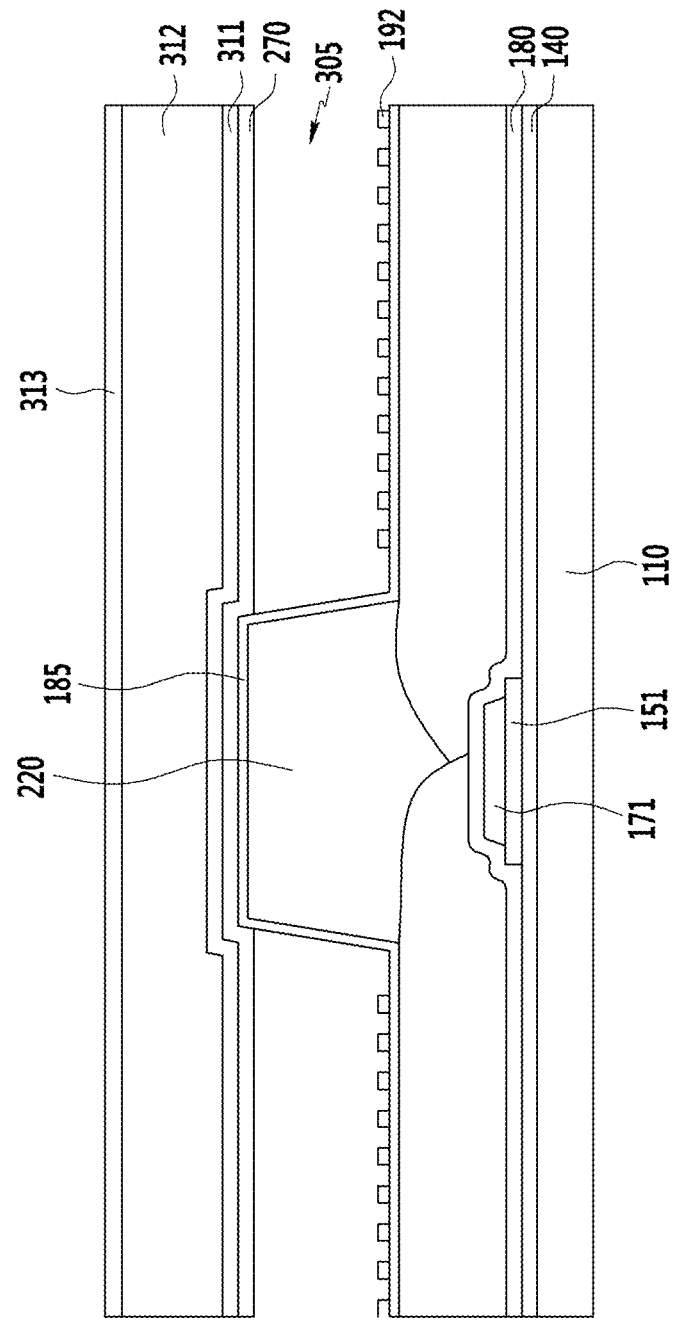
FIG. 20 and FIG. 21 are cross-sectional views of a liquid crystal display according to another exemplary embodiment of the invention.
Figure 21:
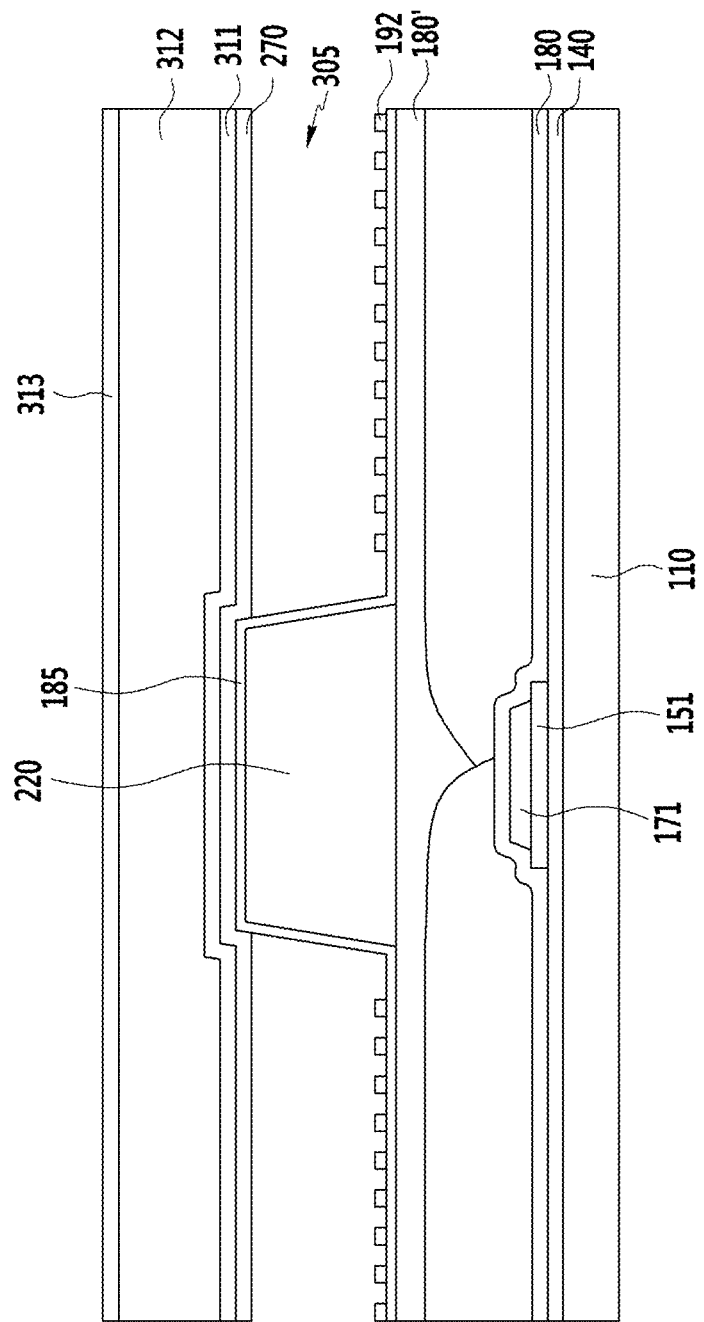

Next, an alternative exemplary embodiment of the invention will be described with reference to FIG. 20 and FIG. 21. In such an embodiment, the common electrode 270 is slightly bent. In an exemplary embodiment, the curved structure of the common electrode 270 may be provided to compensate an error in a manufacturing process. In an exemplary embodiment, as shown in FIG. 20 and FIG. 21, the electric field may be slightly distorted, but the distortion of the electrical field is slight as the common electrode 270 is not substantially curved as in the structure of a comparative embodiment, in which the common electrode 270 is curved along the side surface of the microcavity layer 305. In such an embodiment, the common electrode 270 is separated from the pixel electrode 192 with the predetermined distance such that the short is not generated.

Hereinafter, an alternative exemplary embodiment will be described in greater detail with reference to FIG. 20 and FIG. 21.

FIG. 20 and FIG. 21 are cross-sectional views of an alternative exemplary embodiment of a liquid crystal display according to the invention.

In an exemplary embodiment, as shown in FIG. 20 and FIG. 21, which are cross-sectional views corresponding to FIG. 2, the height of the common electrode 270 at the microcavity layer 305 is lower than the height of the exemplary embodiment of FIG. 2 such that the common electrode 270 has the curved structure near the light blocking member 220. In such an embodiment, if the height of the upper surface of the sacrificial layer 300 is lower than of the height of the upper surface of the light blocking member 220, the common electrode 270 is curved upward near the light blocking member 220.

FIG. 21 shows an exemplary embodiment in which an interlayer passivation layer 180' is provided between the color filter 230 and the light blocking member 220.

In another alternative exemplary embodiment, the height of the common electrode 270 in the microcavity layer 305 is higher than the height of the common electrode 270 of the exemplary embodiment in FIG. 2 such that the common electrode 270 may be curved downward near the light blocking member 220.

In exemplary embodiments, the curved structures of the common electrode 270 may be formed in a manufacturing process, in which the heights of the sacrificial layer 300 and the light blocking member 220 are not substantially the same as each other.

As described above, the liquid crystal display may include the microcavity layer 305 of the reversed tapered side wall.

Next, an alternative exemplary embodiment of a liquid crystal display in which a difference of the common voltage generated when the common voltage is not applied in a first direction (for example, the vertical direction; the data line direction) is substantially reduced or effectively removed by the structure in which the common electrode 270 is connected only in a second direction (for example, the horizontal direction; the gate line direction) while etching the liquid crystal injection hole 335, will now be described.

Figure 22:
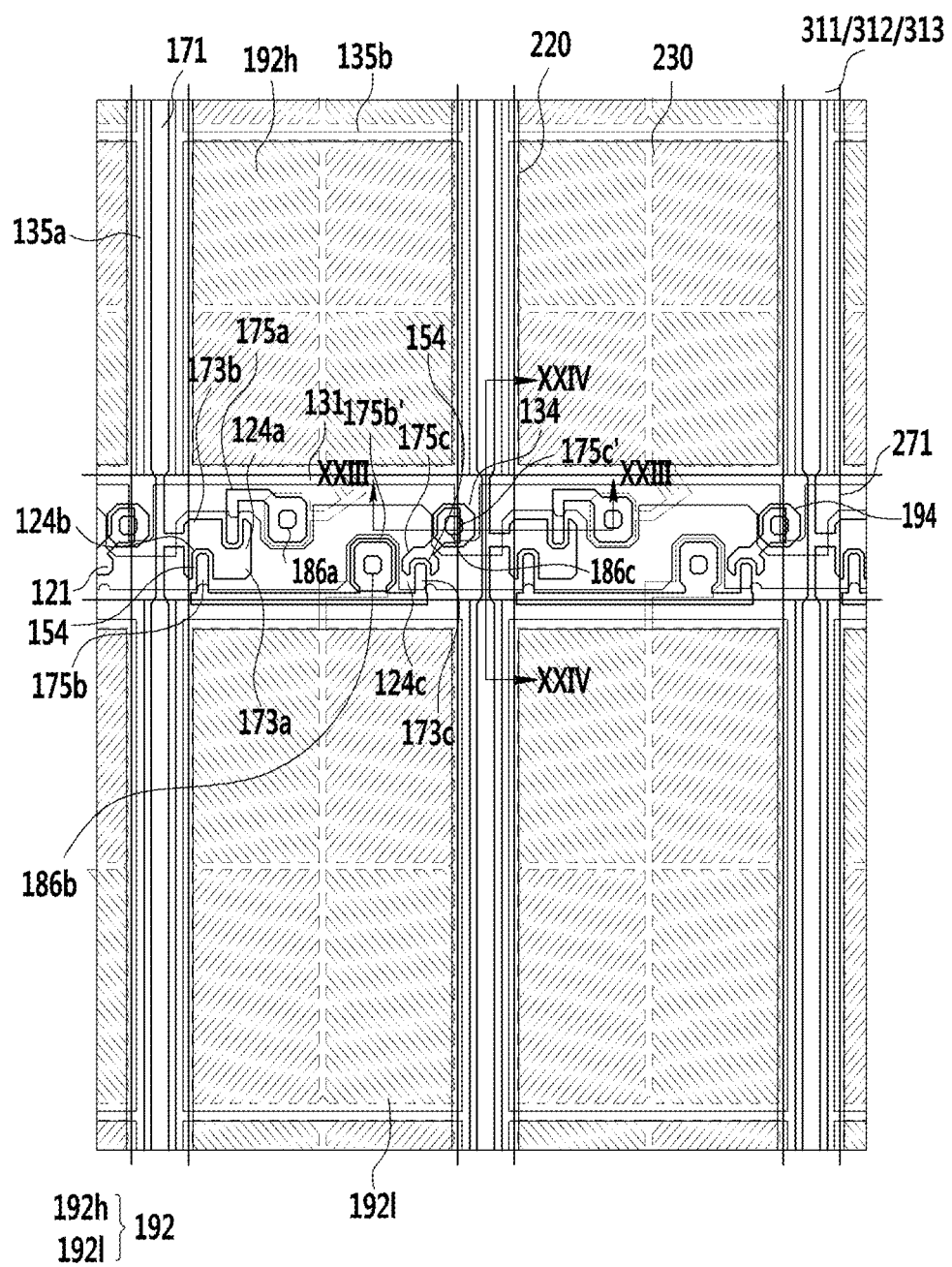
FIG. 22 is a top plan view of an alternative exemplary embodiment of a liquid crystal display according to the invention.
Figure 23:
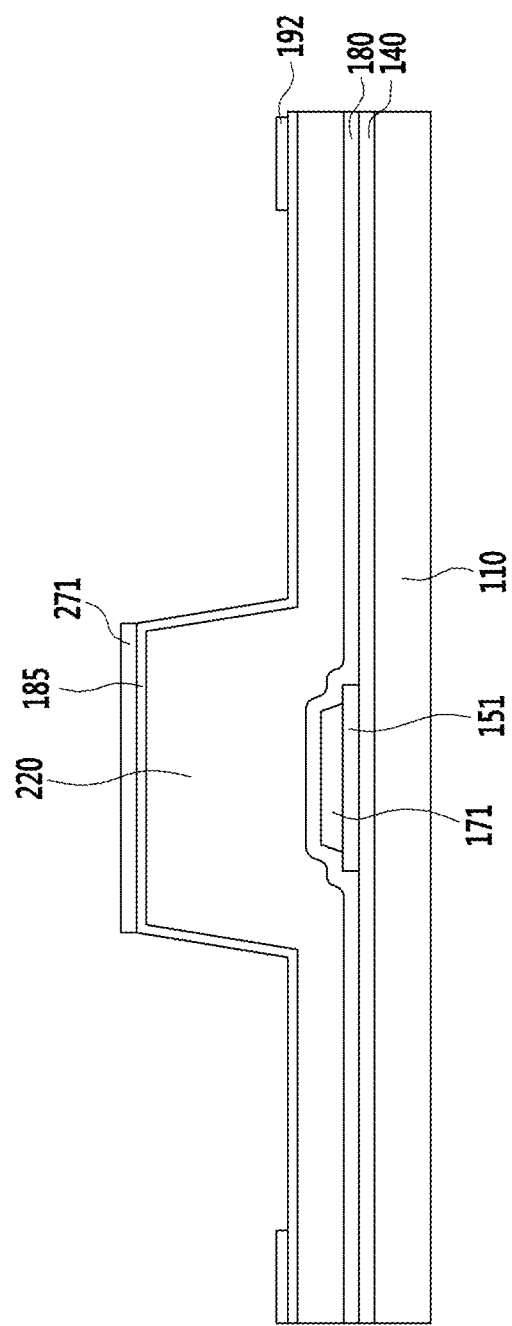
FIG. 23 is a cross-sectional view taken along line XXIII-XXIII of FIG. 22.
Figure 24:
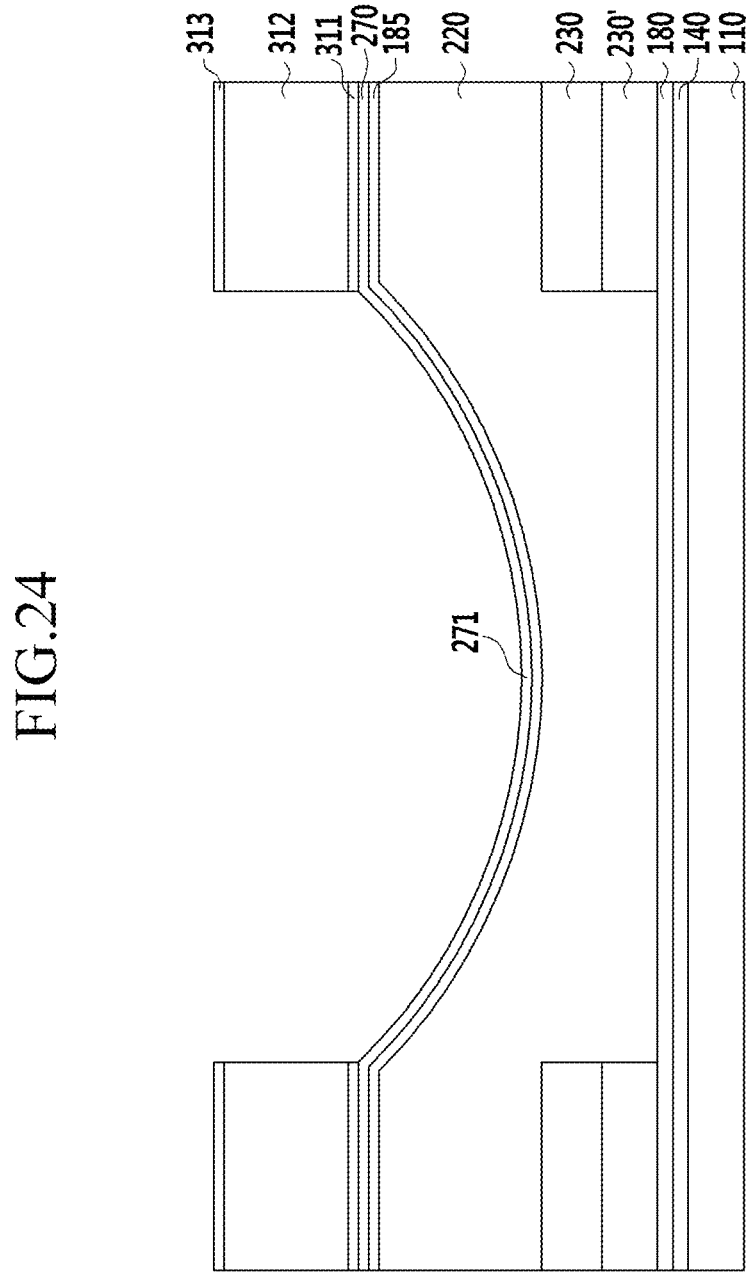
FIG. 24 is a cross-sectional view taken along line XXIV-XXIV of FIG. 22.

FIG. 22 is a top plan view of an alternative exemplary embodiment of a liquid crystal display according to the invention, FIG. 23 is a cross-sectional view taken along line XXIII-XXIII of FIG. 22, and FIG. 24 is a cross-sectional view taken along line XXIV-XXIV of FIG. 22.

The liquid crystal display in FIG. 22 is substantially the same as the liquid crystal display shown in FIG. 1 except for a common electrode connection and the light blocking member 220, for example. The same or like elements shown in FIG. 22 have been labeled with the same reference characters as used above to describe the exemplary embodiments of the liquid crystal display shown in FIG. 1, and any repetitive detailed description thereof will hereinafter be simplified. In FIG. 23 and FIG. 24, some of feature of FIG. 22 (e.g., elements corresponding to the thin film transistors), which are substantially the same as those in FIG. 1, are omitted for convenience of illustration.

Figure 30A:
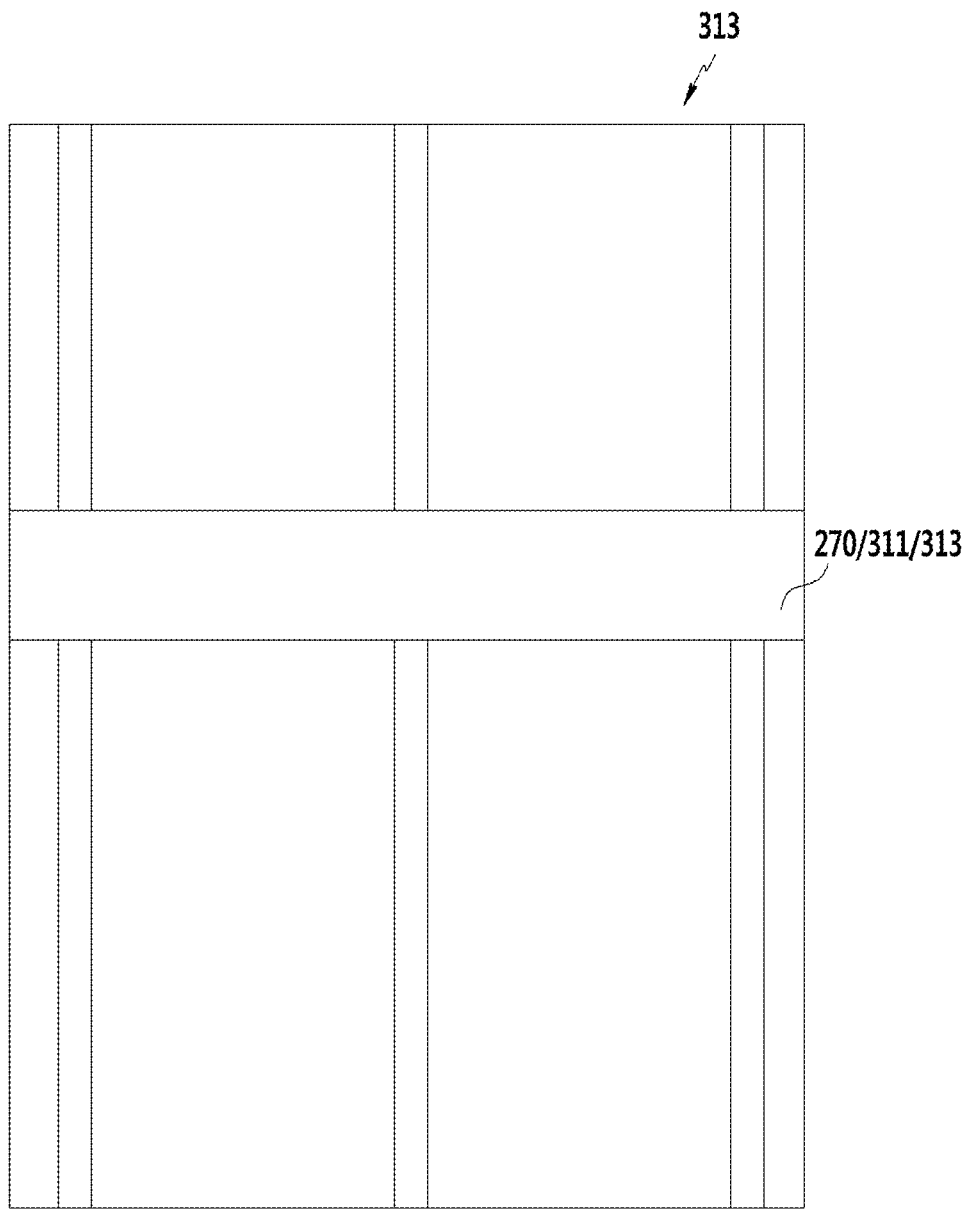
Figure 30B:
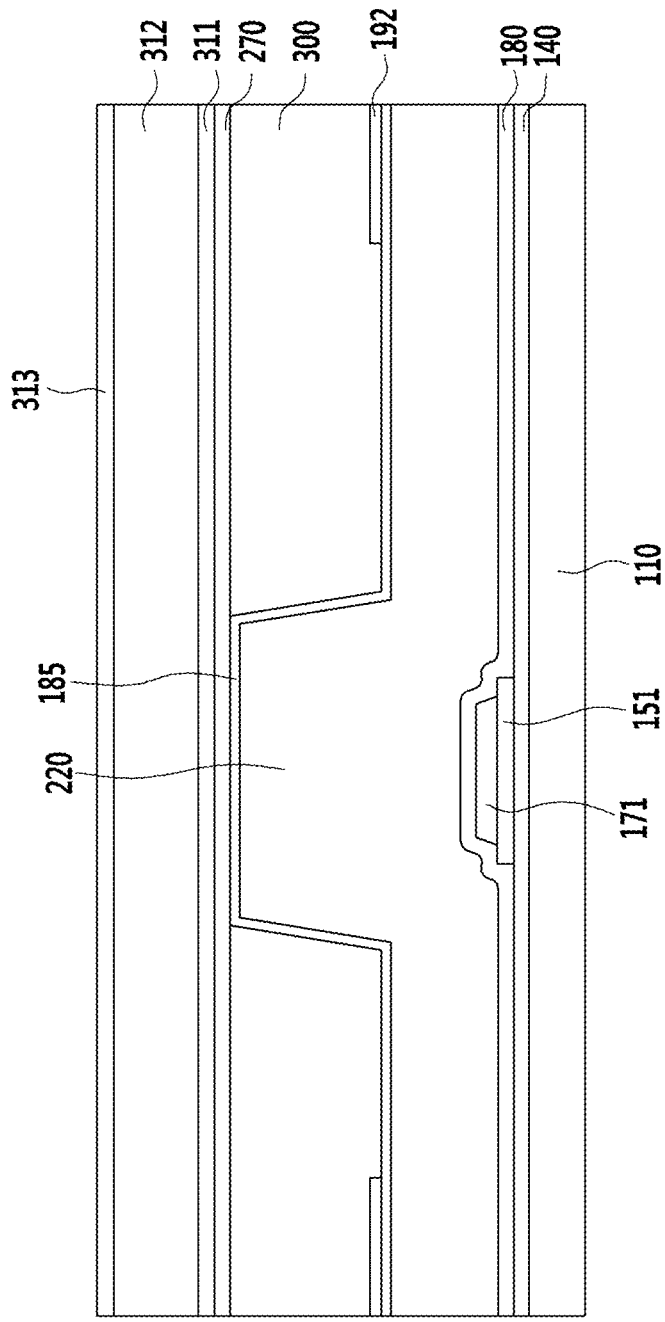
Figure 30C:
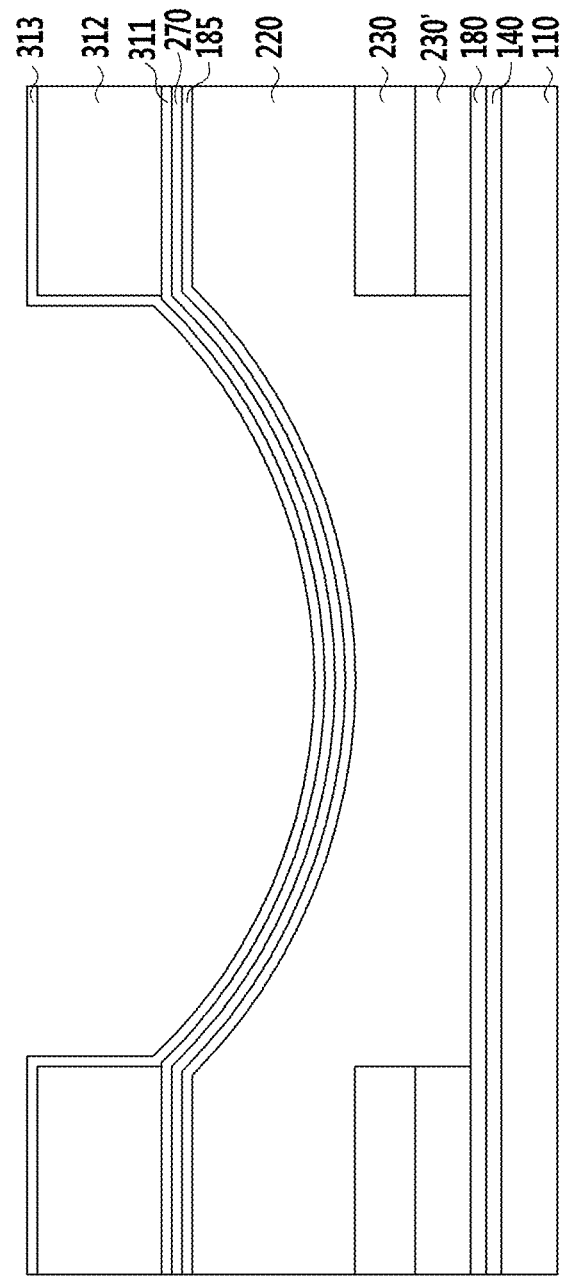
Figure 30D:
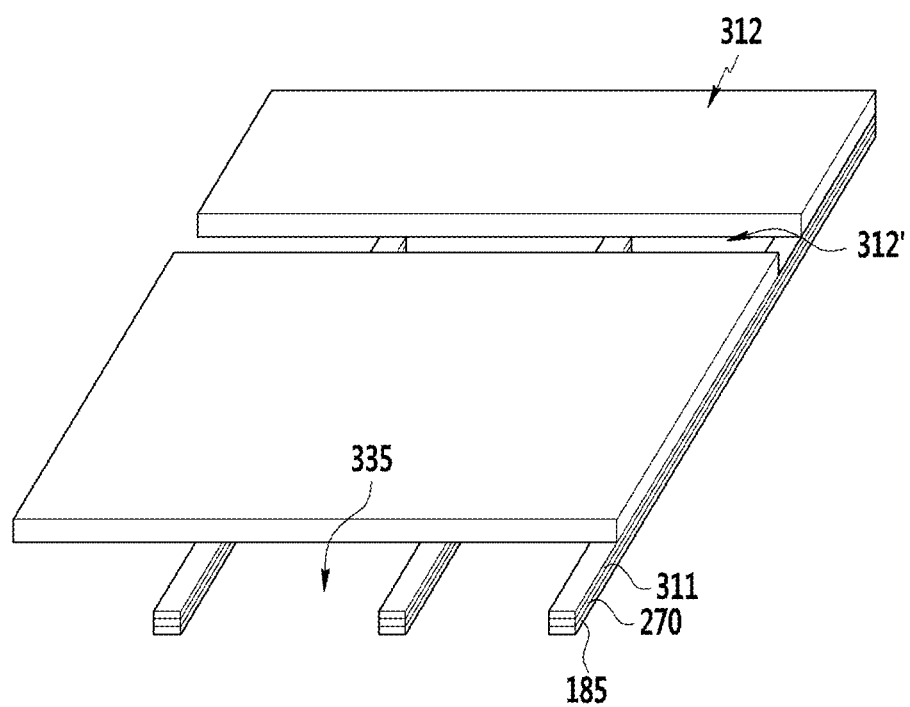

In an alternative exemplary embodiment, as shown in FIG. 22, the common electrode 270 has a common electrode connection 271 for connecting portions of the common electrode 270 in the vertical direction (the data line direction) near the liquid crystal injection hole 335 (shown in FIG. 30D).

A gate line 121 and a storage voltage line 131 are disposed on an insulation substrate 110 including a material such as transparent glass, plastic, or the like. The gate line 121 includes a first gate electrode 124a, a second gate electrode 124b and a third gate electrode 124c. The storage voltage line 131 includes storage electrodes 135a and 135b and a protrusion 134 protruding toward the gate line 121. The storage electrodes 135a and 135b have a structure surrounding a first subpixel electrode 192h and a second subpixel electrode 192l of the previous pixel.

A gate insulating layer 140 is disposed on the gate line 121 and the storage voltage line 131. A semiconductor 151 positioned below a data line 171, a semiconductor positioned below source/drain electrodes, and a semiconductor 154 positioned at a channel portion of a thin film transistor are disposed on the gate insulating layer 140.

A plurality of ohmic contacts (not shown) may be disposed on each of the semiconductors 151 and 154 and between the data line 171 and the source/drain electrodes.

In such an embodiment, data conductors 171, 173a, 173b, 173c, 175a, 175b and 175c, which include a plurality of data lines 171 including a first source electrode 173a and a second source electrode 173b, a first drain electrode 175a, a second drain electrode 175b, a third source electrode 173c and a third drain electrode 175c, are disposed on the semiconductors 151 and 154, and the gate insulating layer 140.

The first gate electrode 124a, the first source electrode 173a and the first drain electrode 175a collectively define a first thin film transistor together with the semiconductor 154, and a channel of the thin film transistor is formed at the semiconductor portion 154 between the first source electrode 173a and the first drain electrode 175a. The second gate electrode 124b, the second source electrode 173b and the second drain electrode 175b collectively define a second thin film transistor together with the semiconductor 154, and a channel of the thin film transistor is formed at the semiconductor portion 154 between the second source electrode 173b and the second drain electrode 175b. The third gate electrode 124c, the third source electrode 173c and the third drain electrode 175c collectively define a third thin film transistor together with the semiconductor 154, and a channel of the thin film transistor is formed at the semiconductor portion 154 between the third source electrode 173c and the third drain electrode 175c.

In such an embodiment, the data line 171 has a structure in which a width becomes decreased in a forming region of the thin film transistor in the vicinity of an extension 175c' of the third drain electrode 175c such that an interval with the adjacent wiring is substantially maintained and signal interference is substantially reduced, but not being limited thereto.

A first passivation layer 180 is disposed on the data conductors 171, 173a, 173b, 173c, 175a, 175b and 175c and an exposed portion of the semiconductor 154. The first passivation layer 180 may include an inorganic insulator such as silicon nitride (SiNx) and silicon oxide (SiOx), for example, or an organic insulator.

A color filter 230 is disposed on the passivation layer 180. Color filters 230 of the same color are disposed in the pixels adjacent in the vertical direction (the data line direction). In such an embodiment, color filters 230 and 230' of different colors are disposed in the pixels adjacent in a horizontal direction (a gate line direction), and two color filters 230 and 230' adjacent in the horizontal direction may overlap each other on the data line 171. The color filters 230 and 230' may display one of primary colors such as three primary colors of red, green and blue, but not being limited thereto. In an alternative exemplary embodiment, the color filters 230 and 230' may display one of cyan, magenta, yellow and white colors.

A light blocking member (black matrix; 220) is disposed on the color filters 230 and 230'. The light blocking member 220 is disposed at a region (hereinafter referred to as "a transistor formation region") where the gate line 121, the thin film transistor and the data line 171 are disposed, and has a lattice structure having openings corresponding to a region where an image is displayed. The color filter 230 is disposed in the opening of the light blocking member 220. Also, the light blocking member 220 may include a material through which light is not transmitted. In such an embodiment, the light blocking member 220 has a height corresponding to the height of a microcavity layer, in which the liquid crystal layer 3 (shown in FIGS. 2 and 3) is injected. In exemplary embodiments, the height of the microcavity layer may be varied such that the height of the light blocking member 220 may be varied. In an exemplary embodiment, the light blocking member 220 may have a height in a range of about 2.0 μm to about 3.6 μm.

In an exemplary embodiment, the light blocking member 220 is disposed with a taper structure, thereby having a tapered side wall. In such embodiments, an angle of the tapered side wall may be varied.

A second passivation layer 185 is disposed on the color filter 230 and the light blocking member 220 to cover the color filter 230 and the light blocking member 220. The second passivation layer 185 may include an inorganic insulator such as silicon nitride (SiNx) and silicon oxide (SiOx), for example, or an organic insulator. In an exemplary embodiment, where a step occurs due to a thickness difference between the color filter 230 and the light blocking member 220, the second passivation layer 185 includes the organic insulator, thereby substantially reducing or effectively preventing the step.

A first contact hole 186a and a second contact hole 186b, which expose the first drain electrode 175a and extensions 175b' of the second drain electrode 175b, respectively, are formed in the color filter 230, the light blocking member 220 and the passivation layers 180 and 185. A third contact hole 186c which exposes the protrusion 134 of the storage voltage line 131 and the extension 175c' of the third drain electrode 175c is formed in the color filter 230, the light blocking member 220 and the passivation layer 180.

In an exemplary embodiment, the light blocking member 220 and the color filter 230 further include the contact holes 186a, 186b and 186c. In an exemplary embodiment, where the etching of the contact hole may not be efficiently performed due to the material of the light blocking member 220 and the color filter 230 compared with the passivation layers 180 and 185, when etching the light blocking member 220 or the color filter 230, the light blocking member 220 or the color filter 230 may be previously removed at the position where the contact holes 186a, 186b and 186c are formed.

In an exemplary embodiment, the contact holes 186a, 186b and 186c may be formed by changing a position of the light blocking member 220 and etching only the color filter 230 and the passivation layers 180 and 185.

A pixel electrode 192 including a first subpixel electrode 192h and a second subpixel electrode 192l is disposed on the second passivation layer 185. The pixel electrode 192 may include a transparent conductive material such as ITO or IZO, for example.

The first subpixel electrode 192h and the second subpixel electrode 192l are adjacent to each other in a column direction, have an entirely quadrangular shape, and include a cross stem including a transverse stem and a longitudinal stem crossing the transverse stem. In such an embodiment, the first subpixel electrode 192h and the second subpixel electrode 192l are divided into four subregions by the transverse stem and the longitudinal stem, and each subregion includes a plurality of minute branches.

The minute branches of the first subpixel electrode 192h and the second subpixel electrode 192l form angles in a range of about 40 degrees to 45 degrees with the gate line 121 or the transverse stem. In an exemplary embodiment, the minute branches of two adjacent subregions may be substantially perpendicular to each other. In an exemplary embodiment, a width of the minute branch may become gradually increased or intervals between the minute branches 194 may be different from each other.

The first subpixel electrode 192h and the second subpixel electrode 192l are physically and electrically connected to the first drain electrode 175a and the second drain electrode 175b through the contact holes 186a and 186b, and receive data voltages from the first drain electrode 175a and the second drain electrode 175b.

In an exemplary embodiment, a connecting member 194 electrically connects the extension 175c' of the third drain electrode 175c and the protrusion 134 of the storage voltage line 131 through the third contact hole 186c. In such an embodiment, part of the data voltage applied to the second drain electrode 175b is divided through the third source electrode 173c, and thus the magnitude of the voltage applied to the second subpixel electrode 192l may be less than the magnitude of the voltage applied to the first subpixel electrode 192h.

Here, an area of the second subpixel electrode 192l may be about twice an area of the first subpixel electrode 192h.

In an exemplary embodiment, an opening for collecting gas discharged from the color filter 230 and an overcoat covering the corresponding opening with the same material as the pixel electrode 192 thereon may be disposed on the second passivation layer 185. The opening and the overcoat block the gas discharged from the color filter 230 from being transferred to another element. In an alternative exemplary embodiment, the opening and the overcoat may be omitted.

A common electrode 270 is disposed on the second passivation layer 185 and the pixel electrode 192, and the liquid crystal layer 3 that is injected in the microcavity layer (305; referring to FIG. 12B). The common electrode 270 has a substantially planar structure with reference to the height of the second passivation layer 185 positioned on the light blocking member 220. The height or level of the common electrode 270 may be substantially maintained, e.g., having planar shape substantially parallel to the insulation substrate 110, on the microcavity layer by the support of a roof layer 312 that will be described later.

In an exemplary embodiment, the common electrode 270 is not disposed at the portion of the liquid crystal injection hole 335, thereby having a structure that extends in the direction of the gate line (a left and right direction). In an exemplary embodiment, as shown in FIG. 22, a common electrode connection 271 for connecting portions of the common electrode 270 disposed extending in the vertical direction (the data line direction). By the common electrode connection 271, the common voltage is not only applied in the gate line direction and but is also applied in the data line direction such that the common voltage is not changed at the center of the display area, and the display quality is thereby substantially improved. The common electrode connection 271 is supported by the light blocking member 220 and the second passivation layer 185.

The common electrode 270 may include a transparent conductive material such as ITO or IZO, for example, and generates an electric field together with the pixel electrode 192 to control an alignment direction of liquid crystal molecules 310.

A lower insulating layer 311 is positioned on the common electrode 270. The lower insulating layer 311 may have the liquid crystal injection hole 335 formed at one side thereof to inject the liquid crystal into the microcavity layer 305. The lower insulating layer 311 may include the inorganic insulating material such as silicon nitride (SiNx). The liquid crystal injection hole 335 may be used when a sacrificial layer for forming the microcavity 305 is removed, which will be described later in detail.

In an exemplary embodiment, the microcavity layer 305, in which the liquid crystal layer 3 is injected, has the side wall corresponding to the tapered side wall of the light blocking member 220 such that the side wall of the microcavity layer 305 is reversely tapered.

In an exemplary embodiment, an alignment layer (not shown) may be disposed below the common electrode 270 and above the pixel electrode 192 to arrange the liquid crystal molecules injected into the microcavity 305. The alignment layer may include at least one of materials such as polyamic acid, polysiloxane, or polyimide, for example.

A liquid crystal layer 3 is disposed in the microcavity 305 (e.g., in the alignment layer disposed in the microcavity). The liquid crystal molecules 310 are initially aligned by the alignment layer, and the alignment direction is changed according to the electric field generated therein. The height of the liquid crystal layer 3 corresponds to the height of the microcavity layer 305, and the height of the microcavity layer 305 corresponds to the height of the light blocking member 220. In an exemplary embodiment, the height of the microcavity layer 305 is substantially the same as the height of the second passivation layer 185 positioned on the light blocking member 220. In the exemplary embodiment, the height or thickness of the liquid crystal layer 3 may be in a range of about 2.0 μm to about 3.6 μm. In such an embodiment, where the thickness of the liquid crystal layer 3 is increased, the height of the light blocking member 220 may be increased.

The liquid crystal layer 3 disposed on the microcavity 305 may be injected into the microcavity 305 using a capillary force, and the alignment layer may be disposed by the capillary force.

A roof layer 312 is disposed on the lower insulating layer 311. The roof layer 312 has a predetermined thickness and supports the microcavity layer 305. In an exemplary embodiment, a step, which may be generated by the microcavity layer 305 and the liquid crystal layer 3, may be compensated by the roof layer 312. The roof layer 312 may include an organic material.

An upper insulating layer 313 is disposed on the roof layer 312. The upper insulating layer 313 may include the inorganic insulating material such as silicon nitride (SiNx). The roof layer 312 and the upper insulating layer 313 may be patterned along with the lower insulating layer 311 to form the liquid crystal injection hole.

According to an exemplary embodiment, the lower insulating layer 311 and the upper insulating layer 313 may be omitted.

A polarizer (not shown) is positioned on the lower and the upper insulating layer 313 of the insulation substrate 110. The polarizer includes a polarization element for generating polarization and a TAC layer to improve durability, and directions of transmissive axes in an upper polarizer and a lower polarizer may be substantially perpendicular or substantially parallel to each other.

An exemplary embodiment of a manufacturing method of a liquid crystal of FIG. 22 will be described with reference to FIG. 25 to FIG. 30.

FIG. 25 to FIG. 30 are views showing an exemplary embodiment of a manufacturing method of the liquid crystal display of FIG. 22.

Figure 25A:
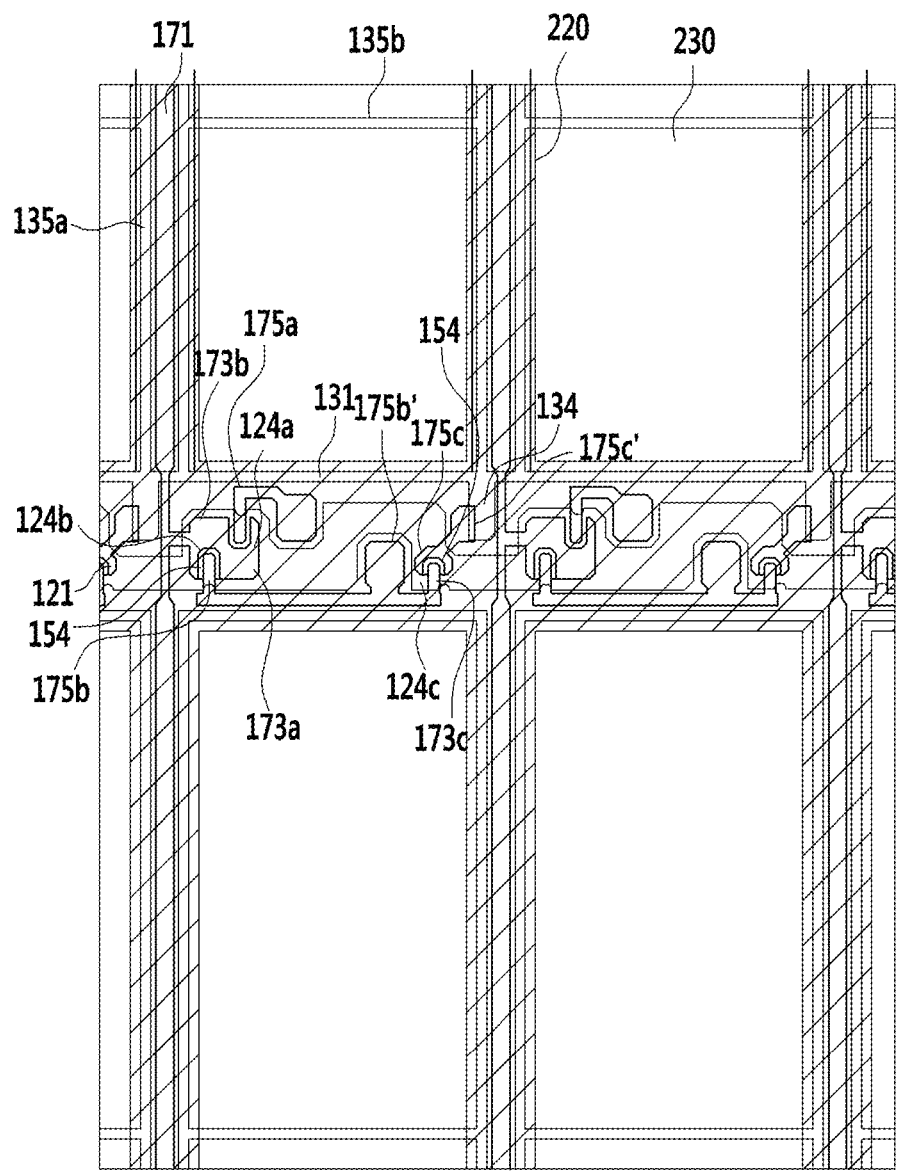
FIG. 25 to FIG. 30D are views showing an exemplary embodiment of a manufacturing method of the liquid crystal display of FIG. 22.

Firstly, FIG. 25A corresponds to FIG. 7A, and the processes shown in FIG. 4 to FIG. 6 is applied to the exemplary embodiment of the manufacturing method of a liquid crystal of FIG. 22.

In such an embodiment, as shown in FIGS. 4 to 6, firstly, a gate line 121 and a storage voltage line 131 are provided on an insulation substrate 110, and a gate insulating layer 140 covering the gate line 121 and the storage voltage line 131 is provided thereon.

Next, semiconductors 151, 154 and 155, a data line 171, and source/drain electrodes 173a, 173b, 173c, 175a, 175b, 175c, 175b' and 175c' are provided on the gate insulating layer 140.

Next, a first passivation layer 180 is provided on the data conductors 171, 173a, 173b, 173c, 175a, 175b, and 175c and an exposed portion of the semiconductor 154 all over the region. Next, color filters 230 are provided on the first passivation layer 180. When etching the color filter 230, the color filter 230 may be previously removed at the position where the contact holes 186a, 186b and 186c are provided.

Next, as shown in FIG. 25A to FIG. 25G, a light blocking member 220 including the material, through which the light is not transmitted, is provided on the color filter 230 and the first passivation layer 180. In such an embodiment, the light blocking member 220 (slashed portion of FIG. 25A) is provided with the lattice structure having the opening corresponding to the region for displaying the image. The color filter 230 is provided in the opening.

As shown in FIG. 25A, the light blocking member 220 has a portion extending in the horizontal direction along the transistor formation region, where the gate line 121, the storage voltage line 131 and the thin film transistor are provided, and a portion extending in the vertical direction with respect to a region where the data line 171 is provided.

An exemplary embodiment of providing the light blocking member 220 will be described in detail with reference to FIG. 25B to FIG. 25G. Here, FIG. 25B, FIG. 25D and FIG. 25F correspond to FIG. 23, and FIG. 25C, FIG. 25E and FIG. 25G correspond to FIG. 24.

Figure 25B:
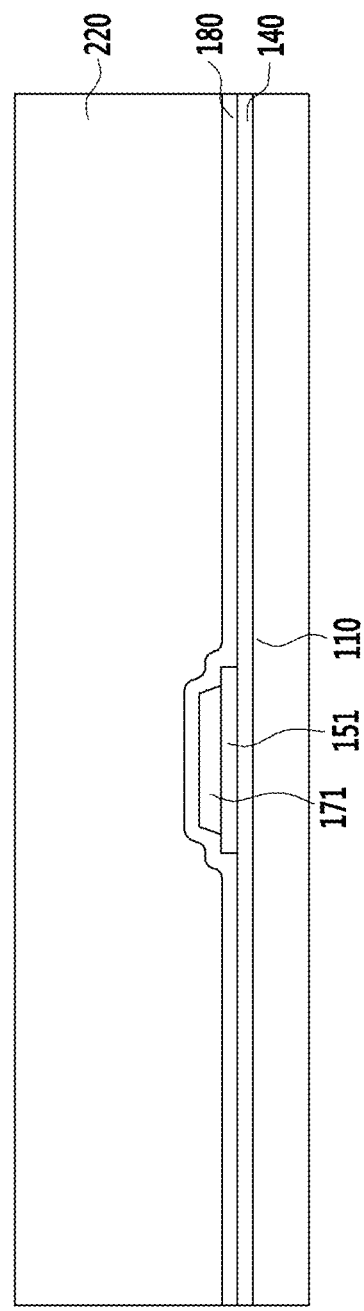
Figure 25C:
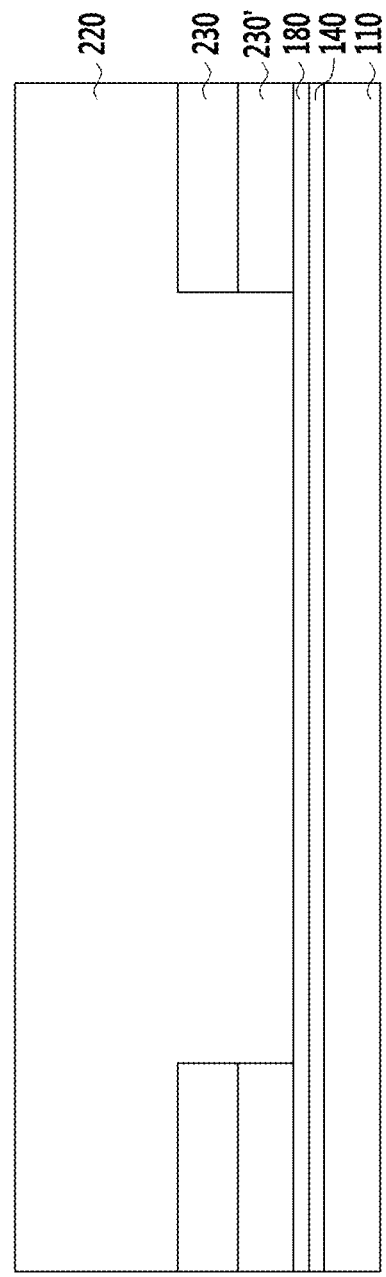

As shown in FIG. 25B and FIG. 25C, a material through which the light is not transmitted is deposited on the first passivation layer 180 and the color filter 230.

Figure 25D:
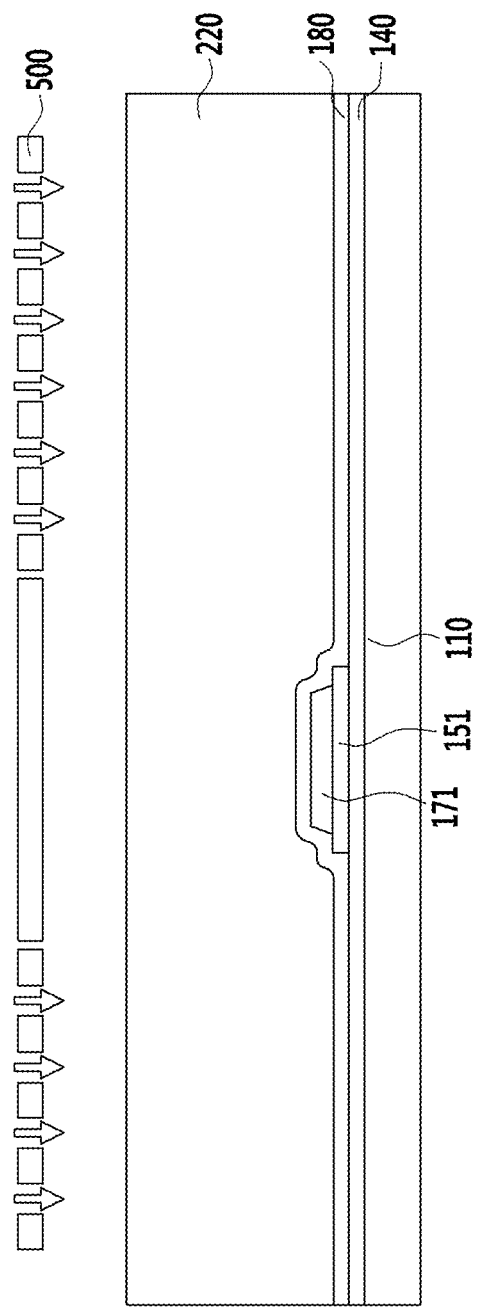
Figure 25F:
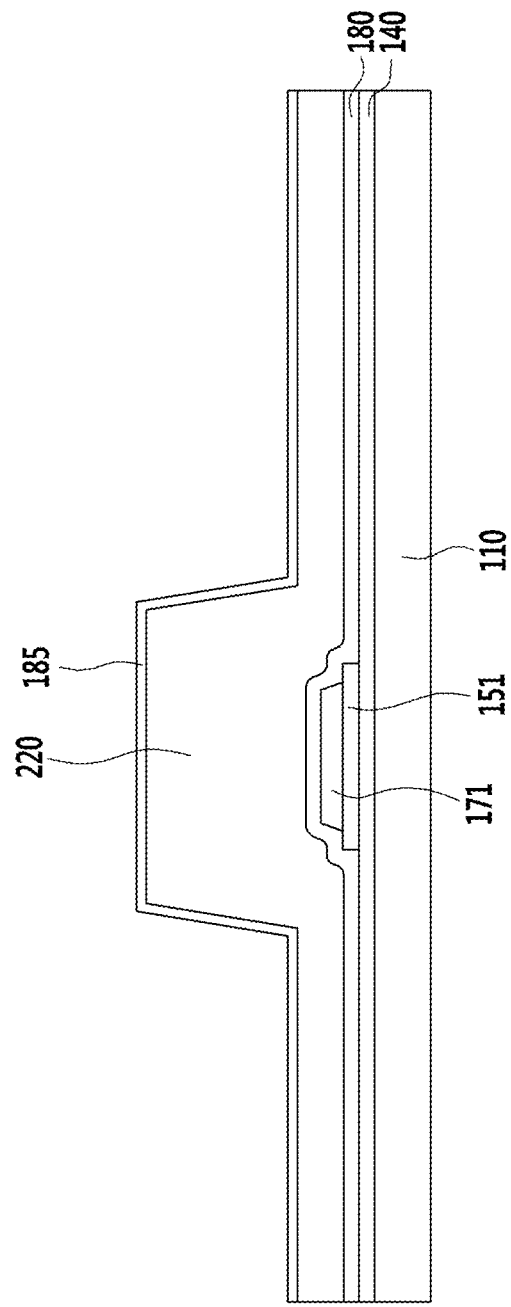

Next, as shown in FIG. 25D and FIG. 25E, the material of the light blocking member is exposed by the mask 500 to form the light blocking member 220 of FIG. 25F and FIG. 25G. In the exemplary embodiment of FIG. 22, as shown in FIG. 25F, the height of the light blocking member 220 is substantially increased in the region (hereinafter referred to as a connection region) where the common electrode connection 271 is provided. In the exemplary embodiment of FIG. 22, the light blocking member 220 is provided with the predetermined height to obtain the microcavity layer 305, as in the light blocking member 220 provided at the right and left side of FIG. 24. In such an embodiment, the light blocking member 220 to obtain the microcavity layer 305 may have the height in a range of about 2.0 μm to about 3.6 μm. In an exemplary embodiment, the mask 500 may include a transflective region or a slit pattern where light is partially transmitted to control the height of the light blocking member 220.

The light blocking member 220 may include an organic material for a spacer and a black color pigment for blocking light.

In an exemplary embodiment, the side wall of the light blocking member 220 is tapered. In an exemplary embodiment, the mask may include a transflective pattern or a slit pattern to control the exposure amount to provide the tapered side wall. In an alternative exemplary embodiment, the tapered side wall may be naturally provided in the etching process without the transflective pattern or the slit pattern.

Referring to FIG. 25F and FIG. 25G, a second passivation layer 185 is provided on substantially an entire region of the color filter 230 and the light blocking member 220. The second passivation layer 185 may include an inorganic insulator such as silicon nitride (SiNx) and silicon oxide (SiOx), for example, or an organic insulator.

Next, a first contact hole 186*a* and a second contact hole 186*b*, which expose the first drain electrode 175*a* and extensions 175*b*' of the second drain electrode 175*b*, respectively, are provided, e.g., formed, in the color filter 230, the light blocking member 220 and the passivation layers 180 and 185. A third contact hole 186*c* which exposes the protrusion 134 of the storage voltage line 131 and the extension 175*c*' of the third drain electrode 175*c* is provided in the color filter 230, the light blocking member 220 and the passivation layers 180 and 185.

Figure 26A:
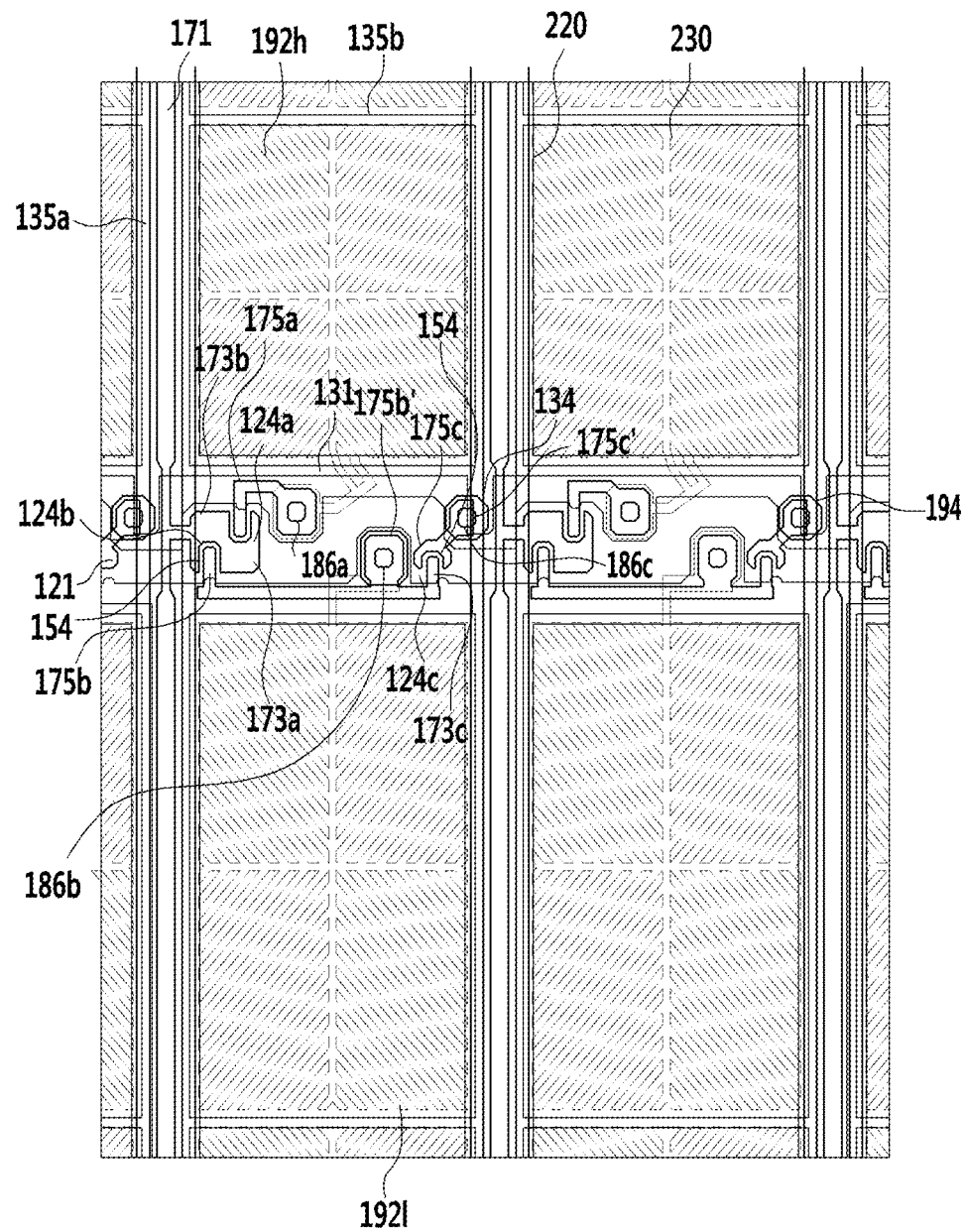
Figure 26B:
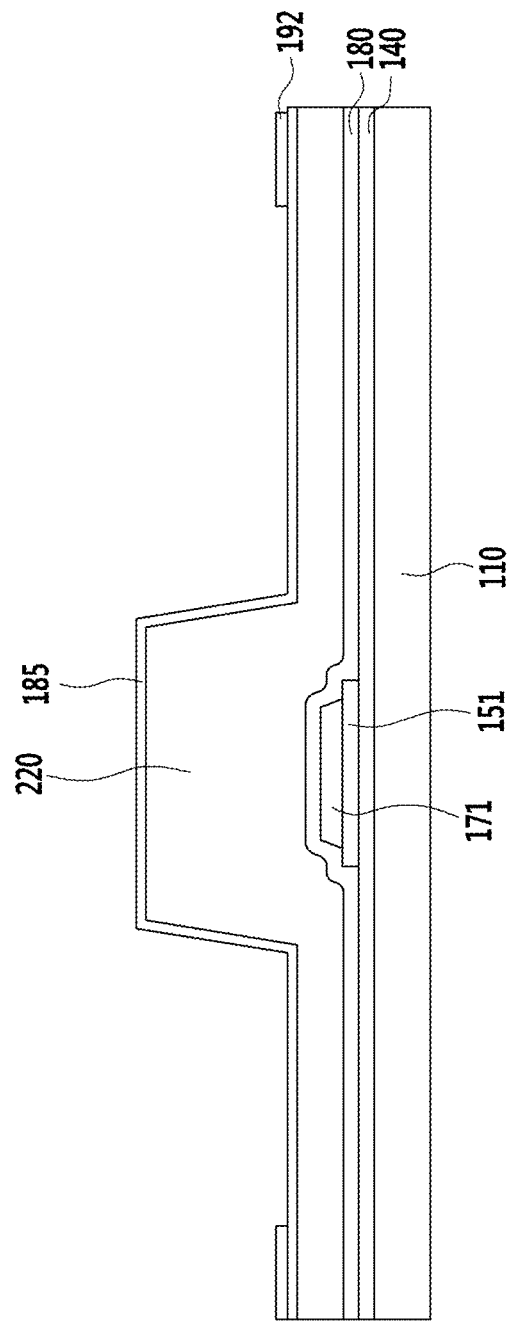
Figure 26C:
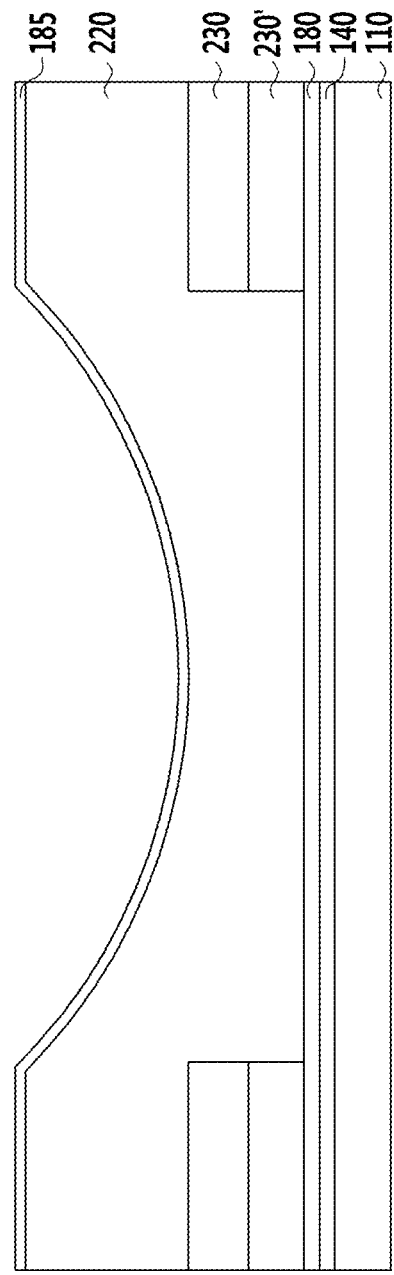

Next, as shown in FIG. 26A to FIG. 26C, a pixel electrode 192 including a first subpixel electrode 192*h* and a second subpixel electrode 192*l* is provided on the second passivation layer 185. In an exemplary embodiment, the pixel electrode 192 may include a transparent conductive material such as ITO or IZO, for example. In such an embodiment, the first subpixel electrode 192*h* and the second subpixel electrode 192*l* are physically and electrically connected to the first drain electrode 175*a* and the second drain electrode 175*b* through the contact holes 186*a* and 186*b*. In such an embodiment, a connecting member 194 which electrically connects the extension 175*c*' of the third drain electrode 175*c* and the protrusion 134 of the storage voltage line 131 through the third contact hole 186*c* is also provided, such that part of the data voltage applied to the second drain electrode 175*b* is divided through the third source electrode 173*c*, and the magnitude of the voltage applied to the second subpixel electrode 192*l* is thereby less than the magnitude of the voltage applied to the first subpixel electrode 192*h*.

Figure 27A:
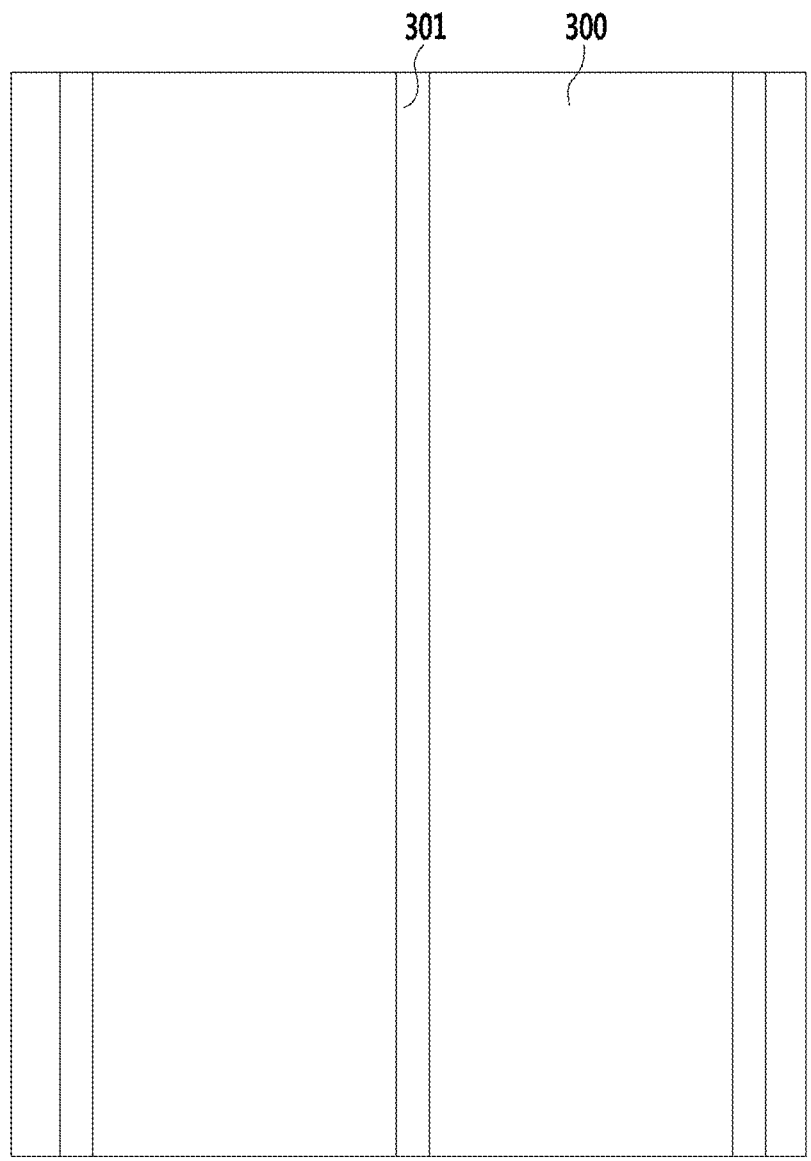
Figure 27B:
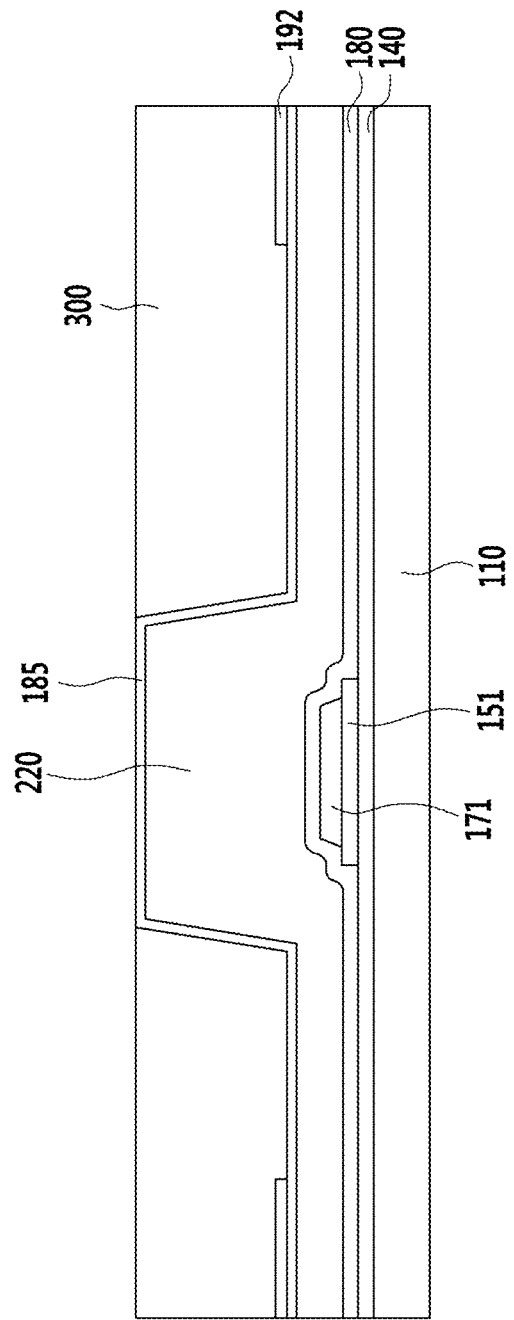
Figure 27C:
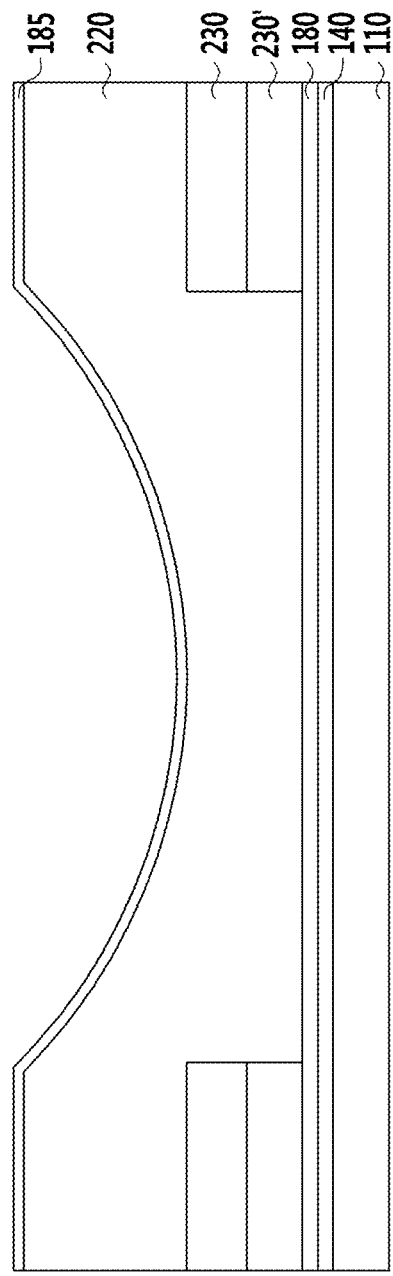

Next, as shown in FIG. 27A to 27C, a sacrificial layer 300 having an opening 301 is provided. The sacrificial layer 300 may be provided using an organic material such as a PR, and the PR is deposited and is exposed, then developed and etched using the mask 500 to complete the sacrificial layer 300. The sacrificial layer 300 is provided in the region where the light blocking member 220 is not provided such that the side wall of the light blocking member 220 and the side wall of the sacrificial layer 300 correspond to each other. As a result, the side wall of the sacrificial layer 300 is reversely tapered by corresponding to the tapered side wall of the light blocking member 220. The sacrificial layer 300 has the opening 301 which is positioned between a main body corresponding to a structure of a microcavity and an adjacent main body at a position to form the microcavity In an exemplary embodiment, a width of the opening 301 may be about 2.5 μm, for example. In an exemplary embodiment, the height of the sacrificial layer 300 may be substantially the same as the height of the second passivation layer 185 at the upper surface of the light blocking member 220.

Figure 28A:
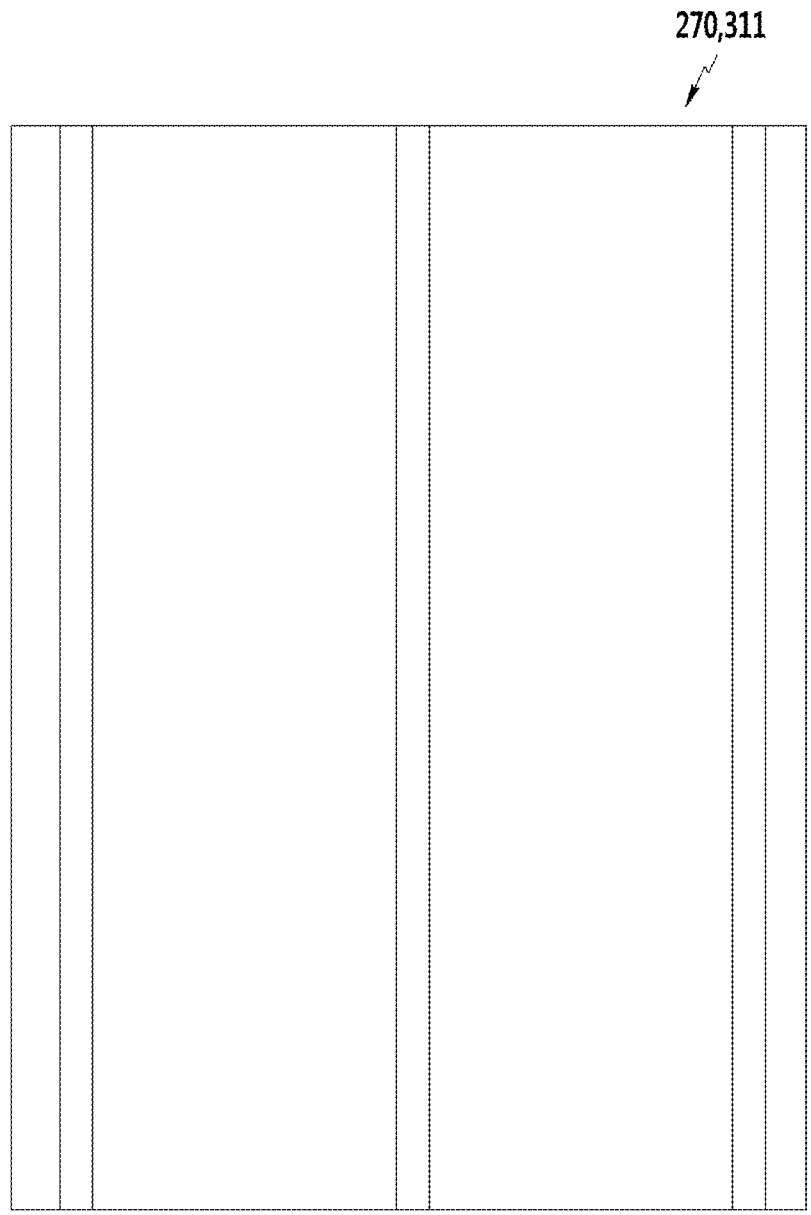
Figure 28B:
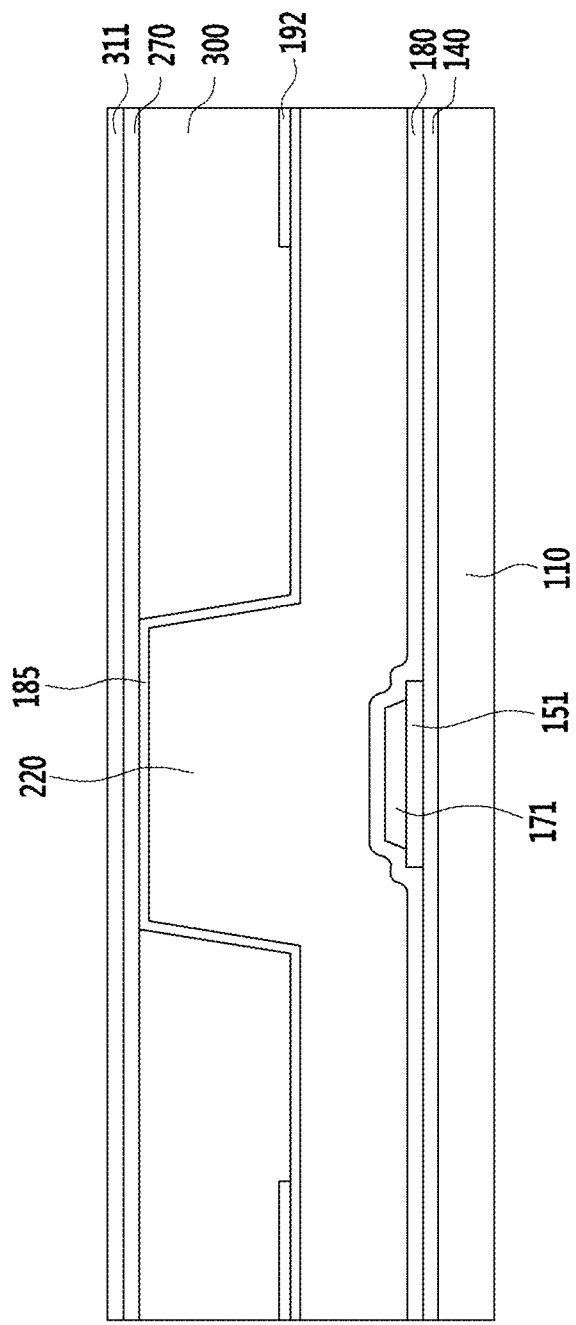
Figure 28C:
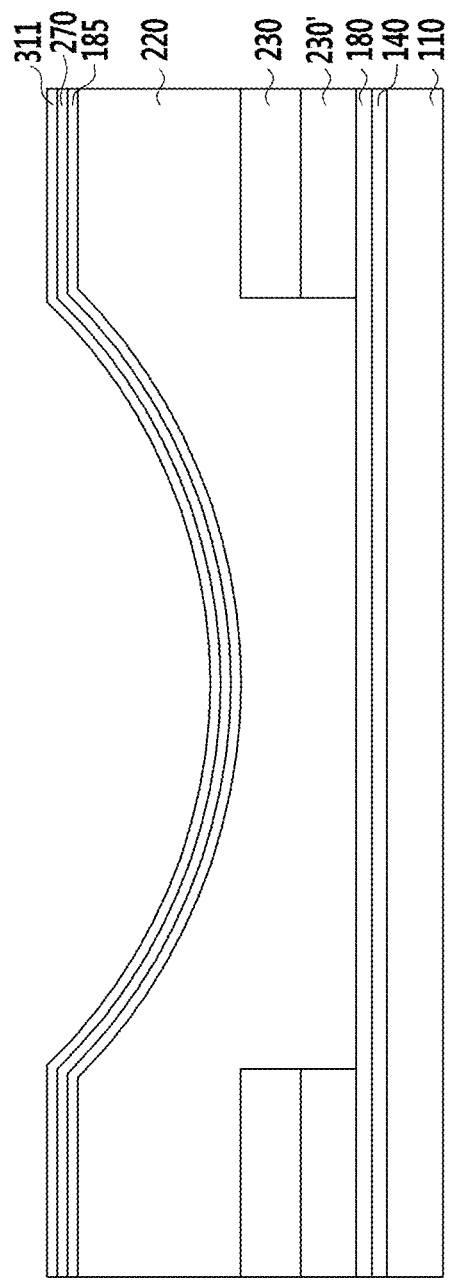

Next, as shown in FIG. 28A to FIG. 28C, a common electrode 270 and a lower insulating layer 311 are sequentially provided. In an exemplary embodiment, a transparent conductive material such as ITO or IZO is laminated over substantially an entire region of the display panel, and then a material of a support layer, which includes an inorganic insulating material such as silicon nitride (SiNx), is laminated over substantially the entire region of the display panel, such that the lower insulating layer 311 is provided to cover the common electrode 270.

Figure 29A:
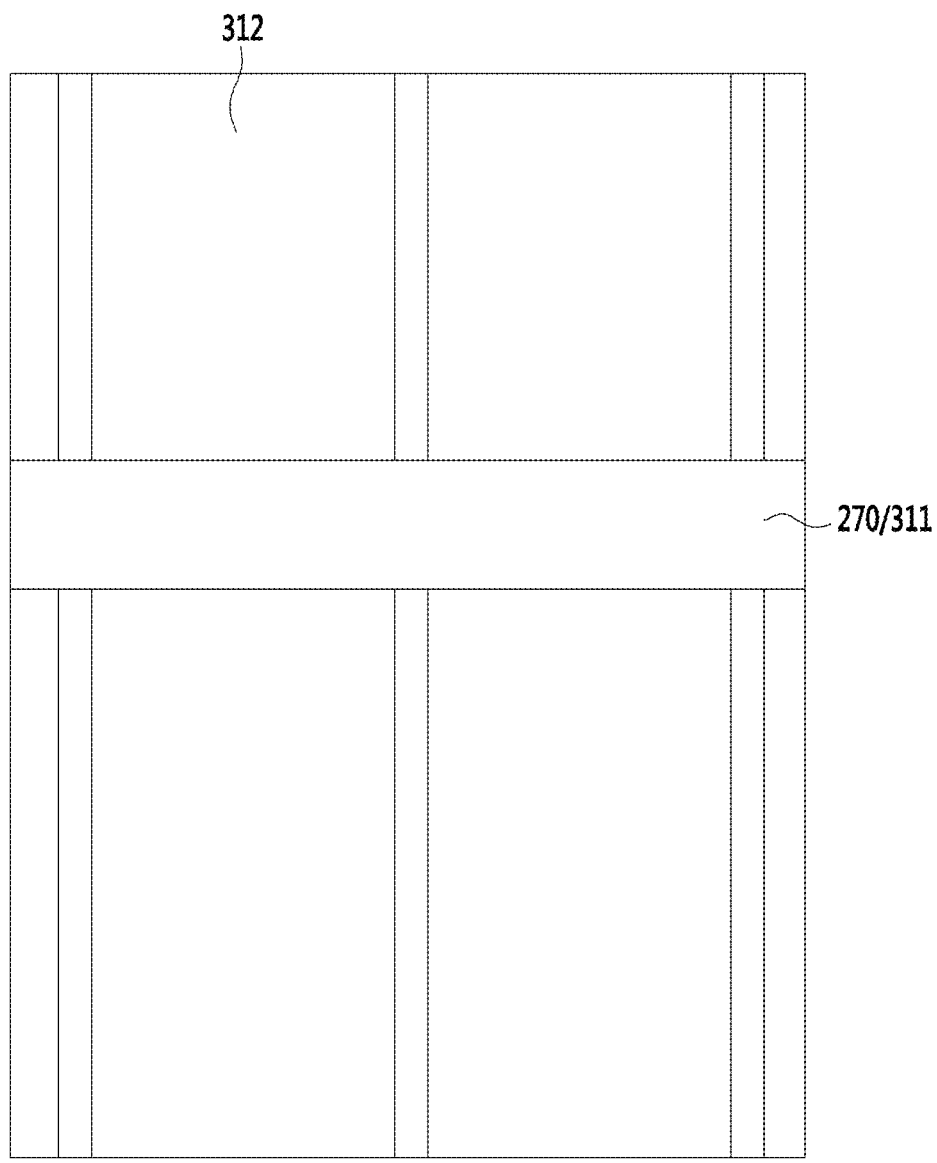
Figure 29B:
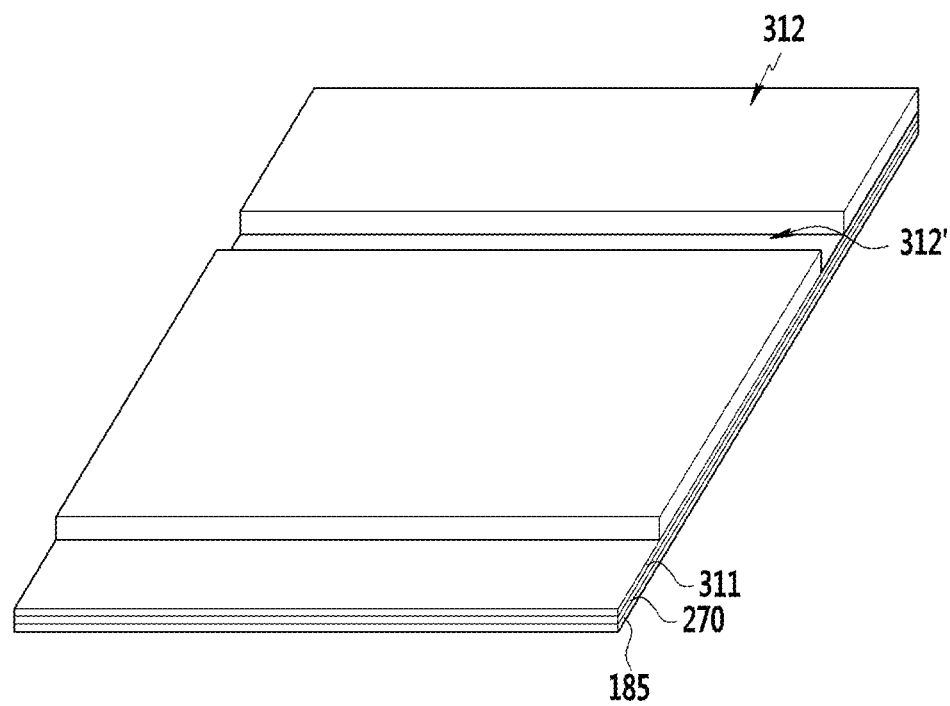
Figure 29C:
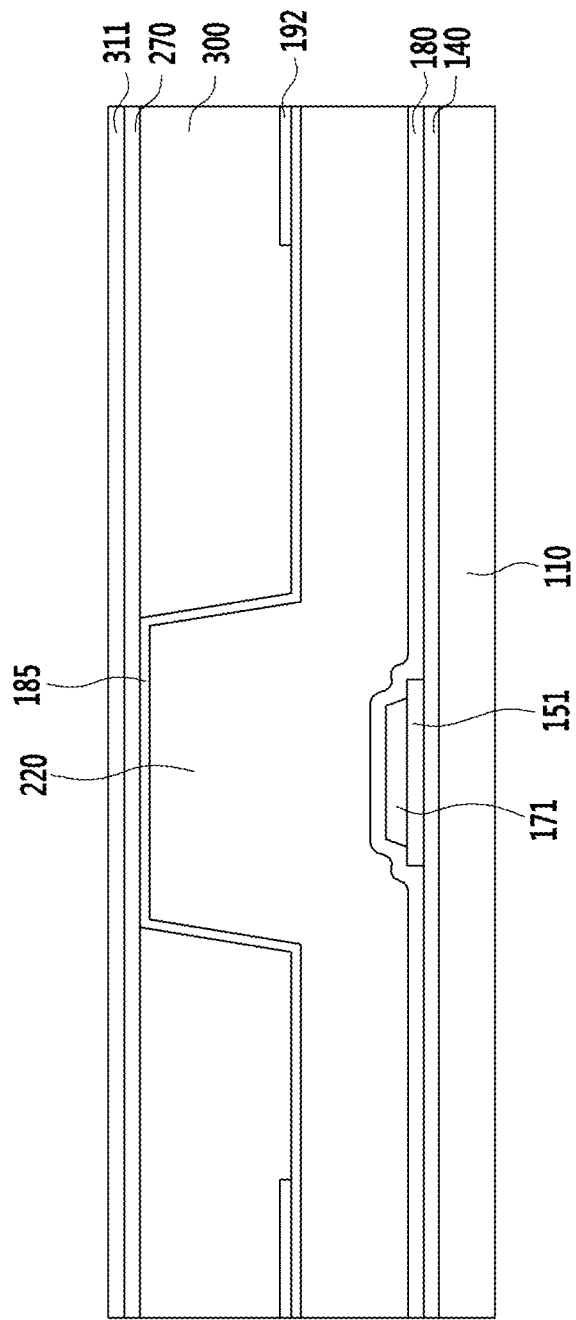

Next, as shown in FIG. 29A to FIG. 29D, a roof layer 312 is provided. The roof layer 312 may include the organic material, and the roof layer 312 is not provided on the region (hereinafter referred to as "a liquid crystal injection hole open region") that is etched in the process for providing the liquid crystal injection hole 3. FIG. 29A shows the liquid crystal injection hole open region corresponding to the thin film transistor formation region. In such an embodiment, the roof layer 312 is not provided in the corresponding region, and in FIG. 29A to 29D, the exposure of the common electrode 270 and the lower insulating layer 311 that are entirely provided is indirectly indicated by the reference numerals.

In an exemplary embodiment of the providing the roof layer 312, a material for the roof layer including the organic material is deposited in substantially the entire region of the panel and exposed and developed using a mask, and then the material for the roof layer of the region corresponding to the liquid crystal injection hole open region is removed. In such an embodiment, the common electrode 270 and the support layer 311 which are provided below the roof layer 312 are not etched and then exposed. In the liquid crystal injection hole open region, only the sacrificial layer 300, the common electrode 270 and the lower insulating layer 311 are provided, and in the remaining region, the sacrificial layer 300 or the opening 301, the common electrode 270, the lower insulating layer 311 and the roof layer 312 are provided.

Next, as shown FIG. 30A to FIG. 30C, a material for an upper insulating layer 313 including an inorganic insulating material such as silicon nitride (SiNx) is deposited.

Next, as shown in FIG. 30D, the material corresponding to the liquid crystal injection hole open region is etched to complete the upper insulating layer 313 and the liquid crystal injection hole 335 and to form a common electrode connection 271. In an exemplary embodiment, as shown in FIG. 30D, the liquid crystal injection hole open region is not etched at the portion where the common electrode connection 271 is provided. As a result, the common electrodes 270 are connected to each other in the expansion direction of the data line. The common electrode connection 271 is supported by the light blocking member 220 and the second passivation layer 185.

In an exemplary embodiment, the PR is provided on substantially the entire region to etch the liquid crystal injection hole open region, the PR corresponding to the liquid crystal injection hole open region is removed to form a photoresist pattern, and the liquid crystal injection hole open region is etched according to the photoresist pattern. In such an embodiment, in the liquid crystal injection hole open region, the materials 313 for the upper insulating layer, the lower insulating layer 311, the common electrode 270, and the sacrificial layer 300 are etched and the underlying layer is not etched. In such an embodiment, the region where the common electrode connection 271 is provided is not etched. According to an alternative exemplary embodiment, the sacrificial layer 300 may be partially etched or may not be etched. In an exemplary embodiment, the process of etching the liquid crystal injection hole open region may be a dry etch process. In an alternative exemplary embodiment, when an etchant capable of etching several layers together exists, a wet etch method may be applied.

Next, the sacrificial layer 300 is removed through the liquid crystal injection hole open region to form a microcavity layer 305. In the exemplary embodiment, the sacrificial layer 300 is provided by the PR, and a process of removing the photoresist pattern provided on the upper insulating layer 313 is performed together. In such an embodiment, the photoresist pattern provided on the upper insulating layer 313 together with the sacrificial layer 300 is immersed in an etchant (for example, a photoresist stripper) for removing the photoresist pattern to be wet-etched. According to the above process, the process of removing the PR provided on the upper insulating layer 313 and the process of removing the sacrificial layer 300 may be performed together, such that a manufacturing process is substantially simplified. In an alternative exemplary embodiment, where the sacrificial layer 300 is provided by a material other than the PR, the two processes may be separately performed. In such an embodiment, the sacrificial layer 300 may be dry-etched.

Thereafter, an alignment layer (not shown) or a liquid crystal material is injected in the provided microcavity 305 using the capillary force.

Although not shown, a process of sealing the microcavity layer 305 may be performed to effectively prevent the liquid crystal layer 3 from flowing outside of the microcavity layer 305.

In an exemplary embodiment, as shown in FIG. 22, the common electrode connection 271 is provided such that the liquid crystal injection hole open region is not etched at the position corresponding to the common electrode connection 271.

In an exemplary embodiment, where the common electrode connection 271 is provided as in the exemplary embodiment of FIG. 22, the common voltage is also applied in the data line direction such that a drawback that the common voltage is deteriorated at the center of the display area is effectively prevented or substantially reduced.

Figure 31:
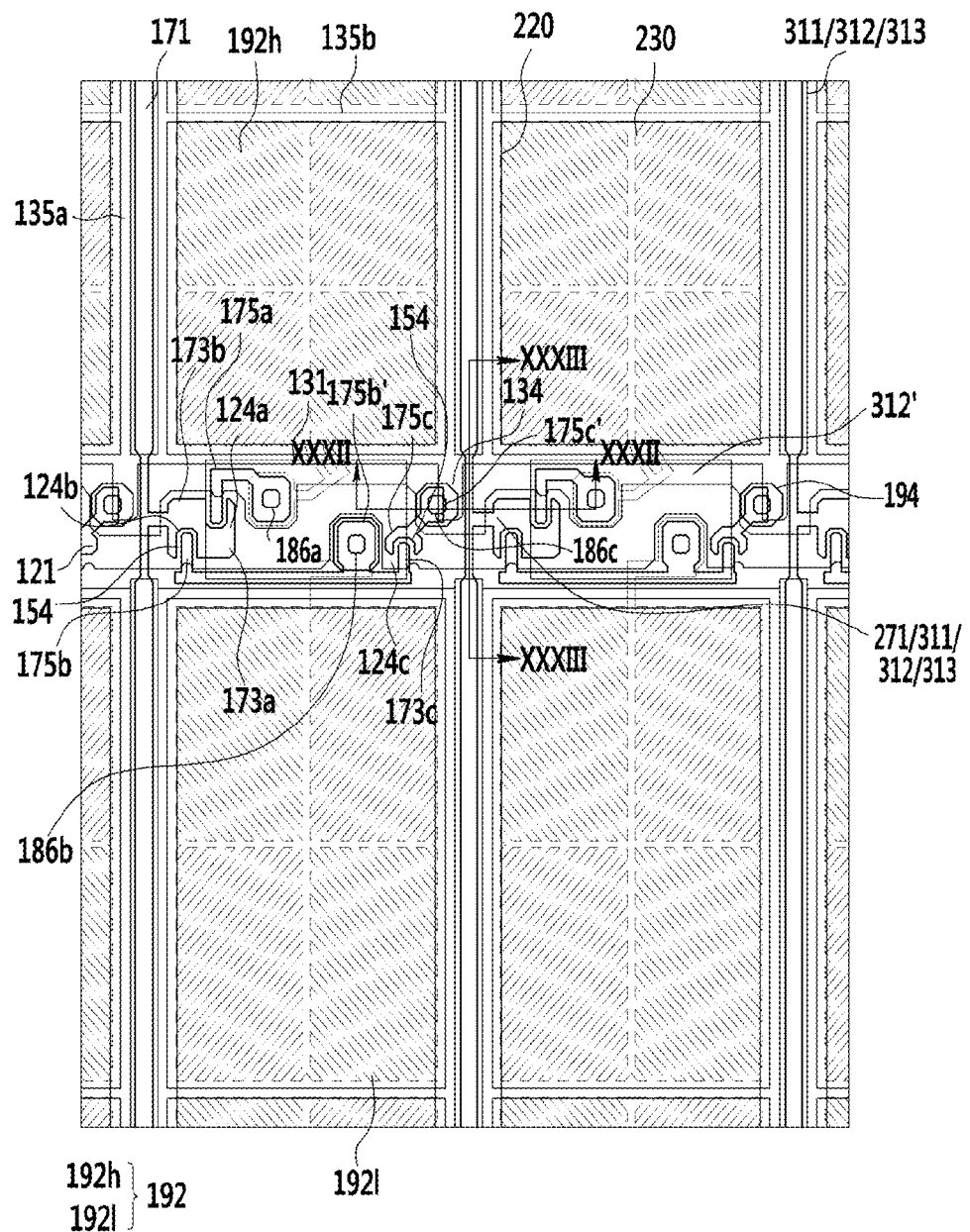
FIG. 31 is a top plan view of another alternative exemplary embodiment of a liquid crystal display according to the invention.

An exemplary embodiment including a common electrode connection 271 of a different structure will now be described in reference with FIG. 31. In an exemplary embodiment, as shown in FIG. 31, a roof layer 312 is disposed on the common electrode connection 271. In such an embodiment, as shown in FIG. 31, the roof layer 312 is not entirely etched in the gate line direction and an opening 312' on the liquid crystal injection hole open region, and a liquid crystal injection hole 335 may be provided at a corresponding opening 312'. In such an embodiment, a common electrode connection 271, a lower insulating layer 311, a roof layer 312 and an upper insulating layer 313 may be sequentially deposited.

The exemplary embodiment of FIG. 31 will be described in greater detail.

Figure 32:
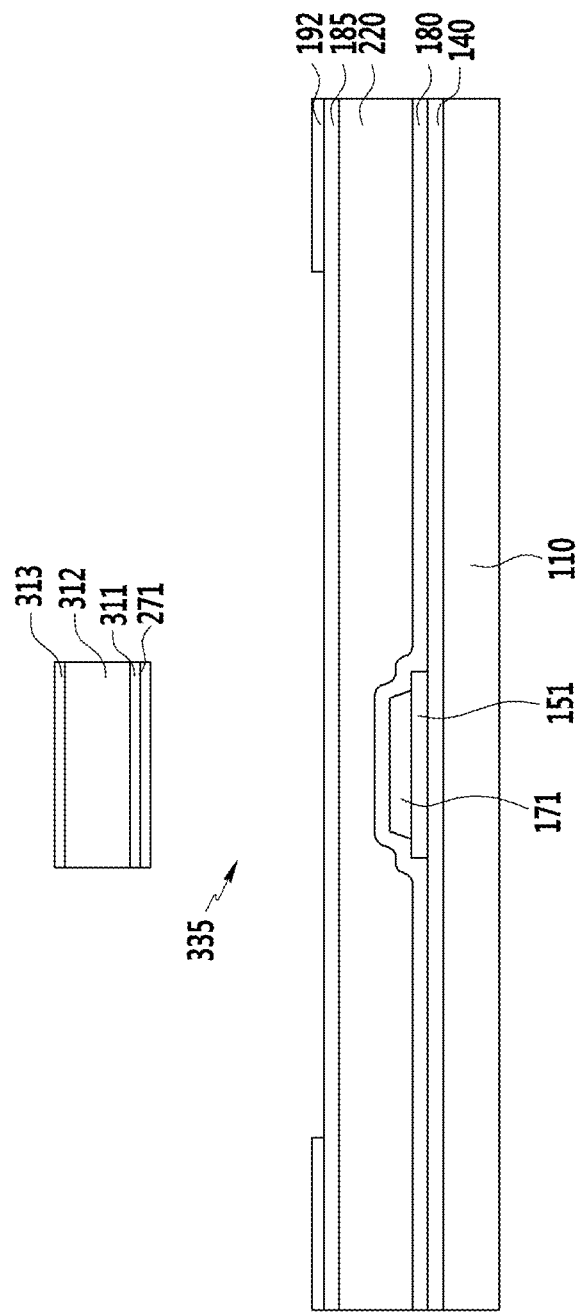
FIG. 32 is a cross-sectional view taken along line XXXII-XXXII of FIG. 31.
Figure 33:
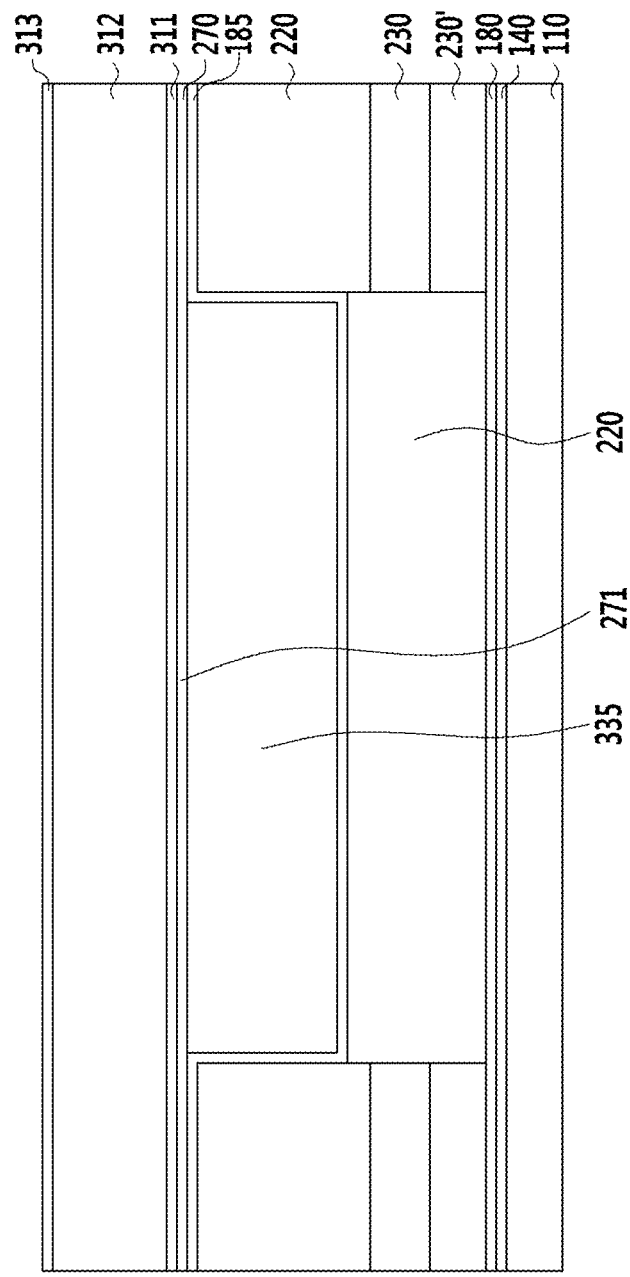
FIG. 33 is a cross-sectional view taken along line XXXIII-XXXIII of FIG. 31.

FIG. 31 is a top plan view of another alternative exemplary embodiment of a liquid crystal display according to the invention, FIG. 32 is a cross-sectional view taken along line XXXII-XXXII of FIG. 31, and FIG. 33 is a cross-sectional view taken along line XXXIII-XXXIII of FIG. 31.

The liquid crystal display in FIG. 31 is substantially the same as the liquid crystal display shown in FIG. 1 except for the common electrode connection 271 and the light blocking member 220, for example. The same or like elements shown in FIG. 31 have been labeled with the same reference characters as used above to describe the exemplary embodiments of the liquid crystal display shown in FIG. 1, and any repetitive detailed description thereof will hereinafter be simplified. In FIG. 32 and FIG. 33, some of feature of FIG. 31 (e.g., elements corresponding to the thin film transistors), which are substantially the same as those in FIG. 1, are omitted for convenience of illustration In the exemplary embodiment of FIG. 31, the common electrode 270 includes a common electrode connection 271 for connecting portions of the common electrode 270 in the vertical direction (the data line direction) near the liquid crystal injection hole 335.

A gate line 121 and a storage voltage line 131 are disposed on an insulation substrate 110 including a material, such as transparent glass, plastic, or the like. The gate line 121 includes a first gate electrode 124a, a second gate electrode 124b and a third gate electrode 124c. The storage voltage line 131 includes storage electrodes 135a and 135b and a protrusion 134 protruding toward gate line 121. The storage electrodes 135a and 135b have a structure surrounding a first subpixel electrode 192h and a second subpixel electrode 192l of the previous pixel.

A gate insulating layer 140 is disposed on the gate line 121 and the storage voltage line 131. A semiconductor 151 positioned below a data line 171, a semiconductor 155 positioned below source/drain electrodes, and a semiconductor 154 positioned at a channel portion of a thin film transistor are disposed on the gate insulating layer 140.

A plurality of ohmic contacts (not shown) may be disposed on each of the semiconductors 151, 154 and 155 and between the data line 171 and the source/drain electrodes.

In an exemplary embodiment, data conductors 171, 173a, 173b, 173c, 175a, 175b, and 175c, which include a plurality of data lines 171 including a first source electrode 173a and a second source electrode 173b, a first drain electrode 175a, a second drain electrode 175b, a third source electrode 173c and a third drain electrode 175c, are disposed on the semiconductors 151, 154 and 155, and the gate insulating layer 140.

The first gate electrode 124a, the first source electrode 173a and the first drain electrode 175a collectively define a first thin film transistor together with the semiconductor 154, and a channel of the thin film transistor is disposed at the semiconductor portion 154 between the first source electrode 173a and the first drain electrode 175a. The second gate electrode 124b, the second source electrode 173b and the second drain electrode 175b collectively define a second thin film transistor together with the semiconductor 154, and a channel of the thin film transistor is disposed at the semiconductor portion 154 between the second source electrode 173b and the second drain electrode 175b. The third gate electrode 124c, the third source electrode 173c and the third drain electrode 175c collectively define a third thin film transistor together with the semiconductor 154, and a channel of the thin film transistor is disposed at the semiconductor portion 154 between the third source electrode 173c and the third drain electrode 175c.

In such an embodiment, the data line 171 has a structure in which a width becomes decreased in a forming region of the thin film transistor in the vicinity of an extension 175c' of the third drain electrode 175c such that an interval with the adjacent wiring is substantially maintained and signal interference is substantially reduced, but not being limited thereto.

A first passivation layer 180 is disposed on the data conductors 171, 173a, 173b, 173c, 175a, 175b, and 175c and an exposed portion of the semiconductor 154. The first passivation layer 180 may include an inorganic insulator such as silicon nitride (SiNx) and silicon oxide (SiOx), for example, or an organic insulator.

A color filter 230 is disposed on the passivation layer 180. Color filters 230 of the same color are disposed in the pixels adjacent in a vertical direction (a data line direction). In such an embodiment, color filters 230 and 230' of different colors are disposed in the pixels adjacent in a horizontal direction (a gate line direction), and two color filters 230 and 230' adjacent in the horizontal direction may overlap each other on the data line 171. The color filters 230 and 230' may display one of primary colors such as three primary colors of red, green and blue, but not being limited thereto. In an alternative exemplary embodiment, the color filters 230 and 230' may also display one of cyan, magenta, yellow and white colors.

A light blocking member (black matrix; 220) is disposed on the color filters 230 and 230'. The light blocking member 220 is disposed at a region (hereafter referred to as "a transistor formation region") where the gate line 121, the thin film transistor and the data line 171 are disposed, and has a lattice structure having openings corresponding to a region where an image is displayed. The color filter 230 is disposed in the opening of the light blocking member 220. In an exemplary embodiment, the light blocking member 220 may include a material through which light is not transmitted. In such an embodiment, the light blocking member 220 has a height corresponding to the height of a microcavity layer into which the liquid crystal layer 3 (shown in FIGS. 2 and 3) is injected. In exemplary embodiments, the height of the microcavity layer may be varied such that the height of the light blocking member 220 may be varied. In an exemplary embodiment, the light blocking member 220 may have a height in a range of about 2.0 µm to about 3.6 µm.

In an exemplary embodiment, the light blocking member 220 is disposed with a taper structure, thereby having a tapered side wall. In such embodiments, an angle of the tapered side wall may vary according.

A second passivation layer 185 is disposed on the color filter 230 and the light blocking member 220 to cover the color filter 230 and the light blocking member 220. The second passivation layer 185 may include an inorganic insulator such as silicon nitride (SiNx) and silicon oxide (SiOx), for example, or an organic insulator. In an exemplary embodiment, where a step occurs due to a thickness difference between the color filter 230 and the light blocking member 220, the second passivation layer 185 includes the organic insulator, thereby substantially reducing or effectively preventing the step.

A first contact hole 186a and a second contact hole 186b, which expose the first drain electrode 175a and extensions 175b' of the second drain electrode 175b, respectively, are disposed in the color filter 230, the light blocking member 220 and the passivation layers 180 and 185. A third contact hole 186c which exposes the protrusion 134 of the storage voltage line 131 and the extension 175c' of the third drain electrode 175c is disposed in the color filter 230, the light blocking member 220 and the passivation layer 180.

In an exemplary embodiment, the light blocking member 220 and the color filter 230 further include the contact holes 186a, 186b, and 186c. In an exemplary embodiment, where the etching of the contact hole may not be efficiently performed due to the material of the light blocking member 220 and the color filter 230 compared with the passivation layers 180 and 185, when etching the light blocking member 220 or the color filter 230, the light blocking member 220 or the color filter 230 may be previously removed at the position where the contact holes 186a, 186b and 186c are formed.

In an exemplary embodiment, the contact holes 186a, 186b and 186c may be disposed by changing a position of the light blocking member 220 and etching only the color filter 230 and the passivation layers 180 and 185.

A pixel electrode 192 including a first subpixel electrode 192h and a second subpixel electrode 192l is disposed on the second passivation layer 185. The pixel electrode 192 may include a transparent conductive material such as ITO or IZO, for example.

The first subpixel electrode 192h and the second subpixel electrode 192l are adjacent to each other in a column direction, have an entirely quadrangular shape, and include a cross stem including a transverse stem and a longitudinal stem crossing the transverse stem. In such an embodiment, the first subpixel electrode 192h and the second subpixel electrode 192l are divided into four subregions by the transverse stem and the longitudinal stem, and each subregion includes a plurality of minute branches.

The minute branches of the first subpixel electrode 192h and the second subpixel electrode 192l form angles in a range of about 40 degrees to 45 degrees with the gate line 121 or the transverse stem. Further, the minute branches of two adjacent subregions may be substantially perpendicular to each other. In an exemplary embodiment, a width of the minute branch may become gradually increased or intervals between the minute branches 194 may be different from each other.

The first subpixel electrode 192h and the second subpixel electrode 192l are physically and electrically connected to the first drain electrode 175a and the second drain electrode 175b through the contact holes 186a and 186b, and receive data voltages from the first drain electrode 175a and the second drain electrode 175b.

In an exemplary embodiment, a connecting member 194 electrically connects the extension 175c' of the third drain electrode 175c and the protrusion 134 of the storage voltage line 131 through the third contact hole 186c. In such an embodiment, some of the data voltages applied to the second drain electrode 175b are divided through the third source electrode 173c and thus the magnitude of the voltage applied to the second subpixel electrode 192l may be less than the magnitude of the voltage applied to the first subpixel electrode 192h.

Here, an area of the second subpixel electrode 192l may be about twice an area of the first subpixel electrode 192h.

In an exemplary embodiment, an opening for collecting gas discharged from the color filter 230 and an overcoat covering the corresponding opening with the same material as the pixel electrode 192 thereon may be disposed on the second passivation layer 185. The opening and the overcoat block the gas discharged from the color filter 230 from being transferred to another element. In an alternative exemplary embodiment, the opening and the overcoat may be omitted.

A common electrode 270 is disposed on the second passivation layer 185 and the pixel electrode 192, and the liquid crystal layer 3 is injected into the microcavity layer (305; referring to FIG. 12B). The common electrode 270 includes a planar structure substantially parallel to the insulation substrate 110 at the height of the second passivation layer 185 positioned on the light blocking member 220. The height or level of the common electrode 270 may be substantially maintained on the microcavity layer by the support of the roof layer 312 that will be described later.

In an exemplary embodiment, the common electrode 270 is not disposed at the portion of the liquid crystal injection hole 335 thereby having a structure that extends in the direction of the gate line (a left and right direction). In an exemplary embodiment, as shown in FIG. 31, the common electrode connection 271 for connecting the common electrode 270 in the vertical direction (the data line direction) is provided. The common electrode connection 271 is disposed on the light blocking member 220 such that the common electrode connection 271 is not supported by the light blocking member 220 and is disposed under the lower insulating layer 311, the roof layer 312 and the upper insulating layer 313, thereby being supported by the roof layer 312. In an exemplary embodiment, as shown in FIG. 31, the common electrode connection 271 is supported by the lower insulating layer 311, the roof layer 312 and the upper insulating layer 313.

By the common electrode connection 271, the common voltage is not only applied in the gate line direction and but is also applied in the data line direction such that the common voltage is not changed on the center of the display area, and the display quality is thereby substantially improved.

The common electrode 270 may include a transparent conductive material such as ITO or IZO, for example, and generates an electric field together with the pixel electrode 192 to control an alignment direction of liquid crystal molecules 310.

A lower insulating layer 311 is positioned on the common electrode 270. The lower insulating layer 311 may have the liquid crystal injection hole 335 disposed at one side to inject the liquid crystal in the microcavity layer 305. The lower insulating layer 311 may include the inorganic insulating material such as silicon nitride (SiNx). The liquid crystal injection hole 335 may be used even when a sacrificial layer for forming the microcavity 305 is removed, which will be described later in detail.

In an exemplary embodiment, the microcavity layer 305 in which the liquid crystal layer 3 is injected has the side wall corresponding to the tapered side wall of the light blocking member 220 such that the side wall of the microcavity layer 305 is reversely tapered.

In an exemplary embodiment, an alignment layer (not shown) may be disposed below the common electrode 270 and above the pixel electrode 192 to arrange the liquid crystal molecules injected into the microcavity 305. The alignment layer may include at least one of materials such as polyamic acid, polysiloxane or polyimide.

A liquid crystal layer 3 is disposed in the microcavity 305 (e.g., in the alignment layer disposed in the microcavity 305). The liquid crystal molecules 310 are initially aligned by the alignment layer, and the alignment direction is changed according to the electric field generated therein. The height of the liquid crystal layer corresponds to the height of the microcavity layer 305, and the height of the microcavity layer 305 corresponds to the height of the light blocking member 220. In an exemplary embodiment, the height of the microcavity layer 305 is substantially the same as the height of the second passivation layer 185 positioned on the light blocking member 220. In the exemplary embodiment, the thickness of the liquid crystal layer 3 may be in a range of about 2.0 µm to about 3.6 µm. In an exemplary embodiment, where the thickness of the liquid crystal layer 3 is increased, the thickness of the light blocking member 220 is also increased.

The liquid crystal layer 3 disposed on the microcavity 305 may be injected into the microcavity 305 using a capillary force, and the alignment layer may be disposed by the capillary force.

A roof layer 312 is disposed on the lower insulating layer 311. The roof layer 312 supports the microcavity layer 305 and may effectively reduce the step generated by the microcavity layer 305 and the liquid crystal layer 3. The roof layer 312 may include the organic material.

An upper insulating layer 313 is disposed on the roof layer 312. The upper insulating layer 313 may include the inorganic insulating material such as silicon nitride (SiNx). In an exemplary embodiment, as shown in FIG. 31, the lower insulating layer 311, the roof layer 312 and the upper insulating layer 313 are disposed on the common electrode connection 271.

The roof layer 312 and the upper insulating layer 313 may be patterned along with the lower insulating layer 311 to form the liquid crystal injection hole.

According to an alternative exemplary embodiment, the lower insulating layer 311 and the upper insulating layer 313 may be omitted.

A polarizer (not shown) is positioned on the lower and upper insulating layers 311 and 313 of the insulation substrate 110. The polarizer includes a polarization element for generating polarization and a tri-acetyl-cellulose (TAC) layer for ensuring durability, and directions of transmissive axes in an upper polarizer and a lower polarizer may be substantially perpendicular or substantially parallel to each other.

An exemplary embodiment of a manufacturing method of a liquid crystal display of FIG. 31 will be described with reference to FIG. 34 to FIG. 41.

FIG. 34 to FIG. 41 are views showing an exemplary embodiment of a manufacturing method of the liquid crystal display of FIG. 31.

Figure 34A:
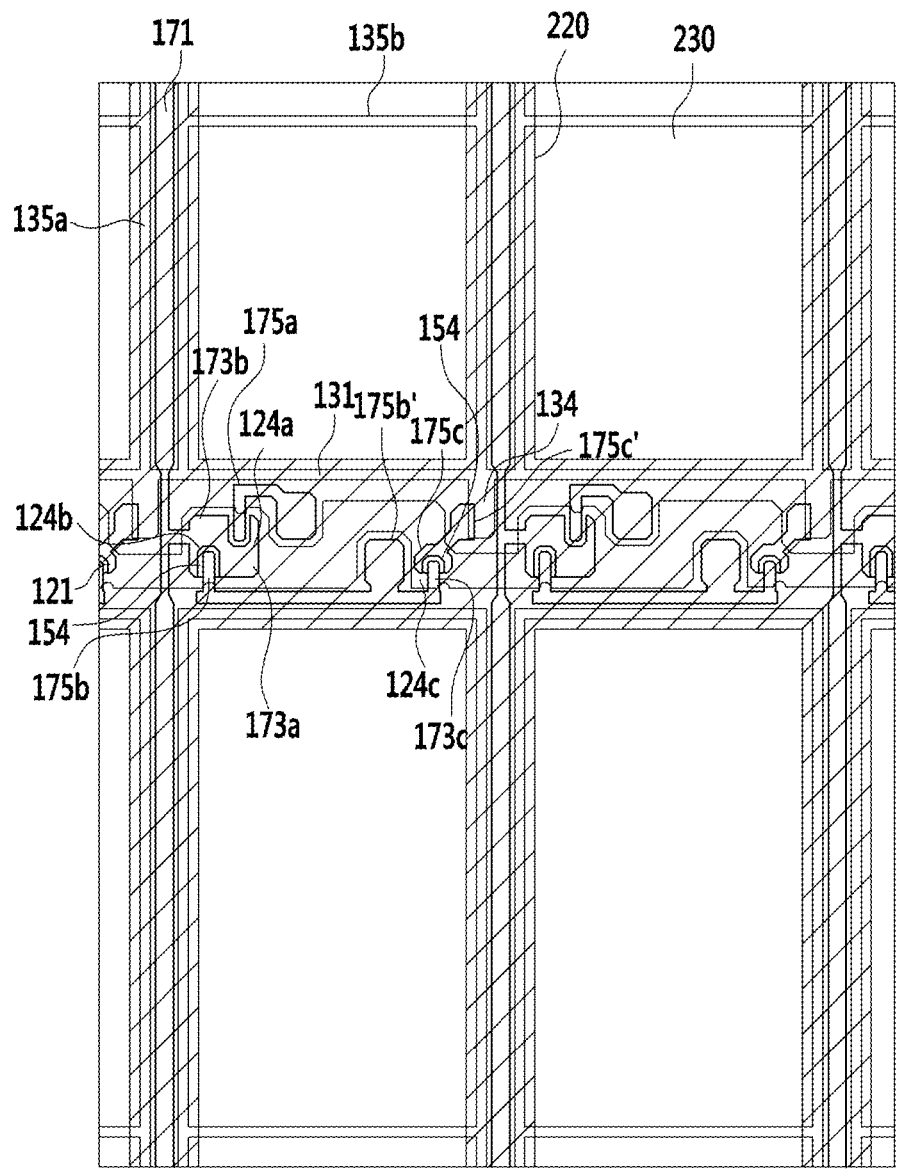
FIG. 34A to FIG. 41 are views showing an exemplary embodiment of a manufacturing method of the liquid crystal display of FIG. 31.

Firstly, FIG. 34A corresponds to FIG. 7A, and the process of FIG. 4 to FIG. 6 is applied to the exemplary embodiment of FIG. 31.

As shown in FIG. 4 to FIG. 6, in such an embodiment, firstly, a gate line 121 and a storage voltage line 131 are provided on an insulation substrate 110, and a gate insulating layer 140 covering the gate line 121 and the storage voltage line 131 is provided thereon.

Next, semiconductors 151, 154 and 155, a data line 171, and source/drain electrodes 173a, 173b, 173c, 175a, 175b and 175c are provided on the gate insulating layer 140.

Next, a first passivation layer 180 is provided on the data conductors 171, 173a, 173b, 173c, 175a, 175b and 175c and an exposed portion of the semiconductor 154 all over the region. Next, color filters 230 are provided on the first passivation layer 180. When etching the color filter 230, the color filter 230 may be previously removed at the position where the contact holes 186a, 186b and 186c are provided.

Next, as shown in FIG. 34A to FIG. 34G, a light blocking member 220 including the material through which the light is not transmitted is provided on the color filter 230 and the first passivation layer 180. In such an embodiment, the light blocking member 220 (slashed portion of FIG. 34G) is provided with the lattice structure having the opening corresponding to the region displaying the image. The color filter 230 is provided in the opening.

As shown in FIG. 34A, the light blocking member 220 has a portion extending in the horizontal direction according to the transistor formation region where the gate line 121, the storage voltage line 131, and the thin film transistor are provided and a portion extending in the vertical direction with respect to a region where the data line 171 is provided.

An exemplary embodiment of providing the light blocking member 220 will be described in detail with reference to FIG. 34B to FIG. 34G. Here, FIG. 34B, FIG. 34D and FIG. 34F correspond to FIG. 32, and FIG. 34C, FIG. 34E and FIG. 34G correspond to FIG. 33.

Figure 34B:
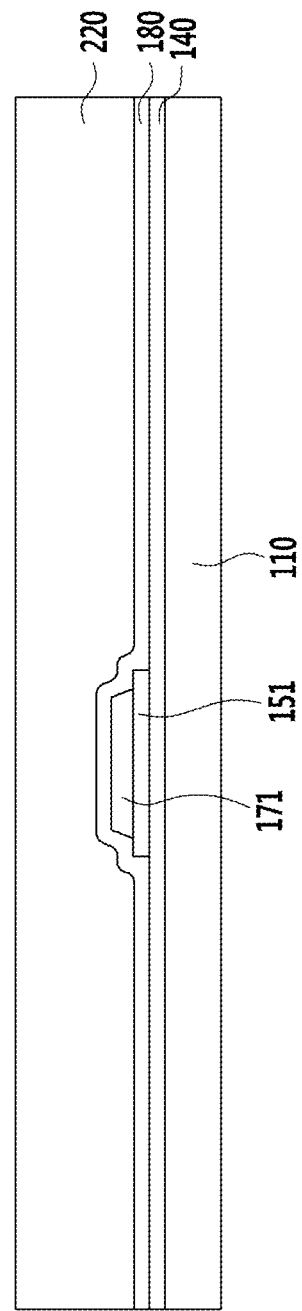
Figure 34C:
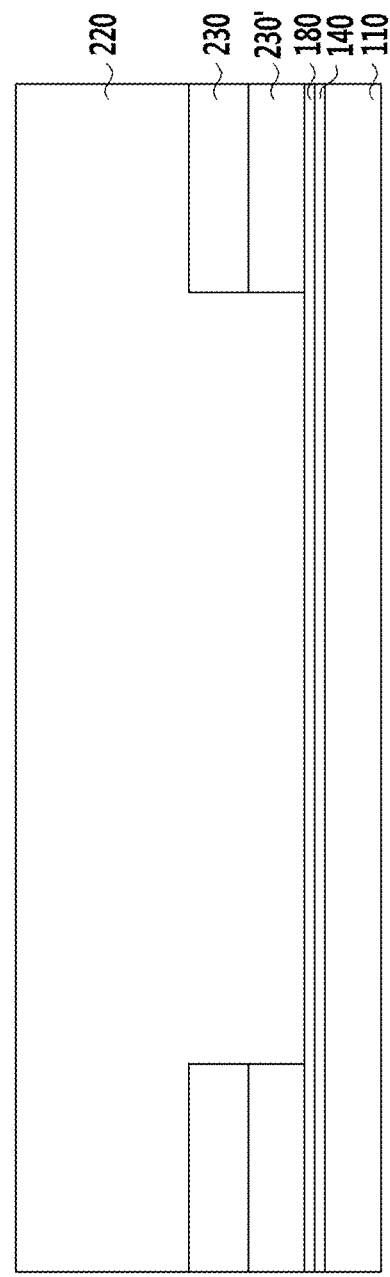

As shown in FIG. 34B and FIG. 34C, a material through which the light is not transmitted is deposited on the first passivation layer 180 and the color filter 230.

Figure 34E:
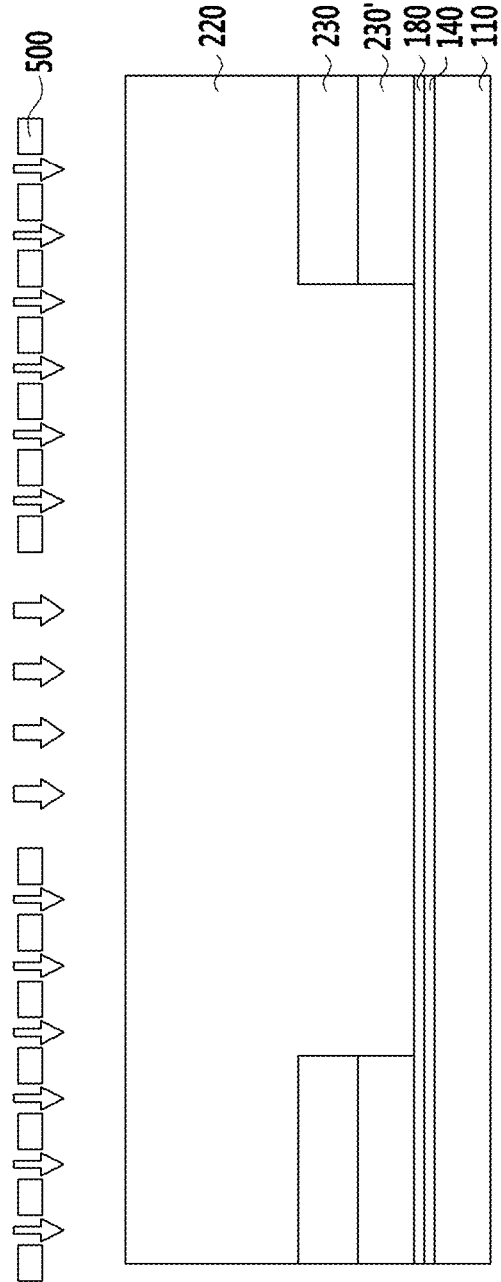
Figure 34F:
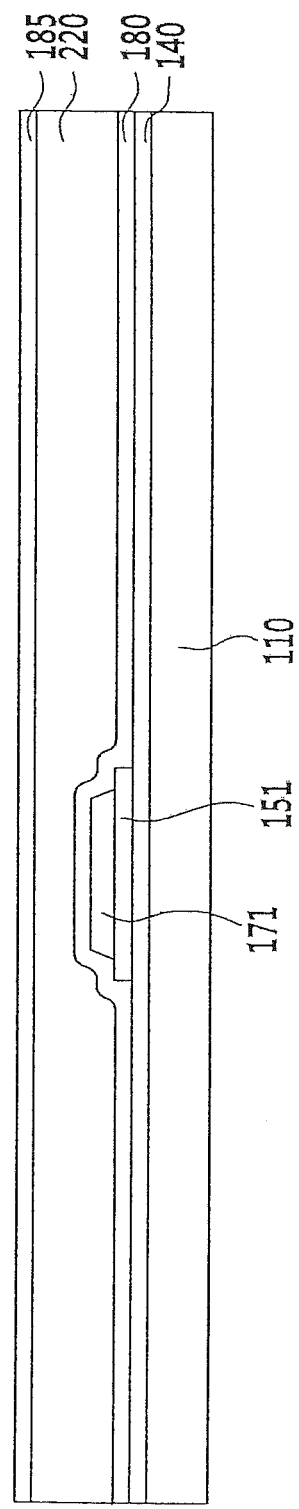
Figure 34G:
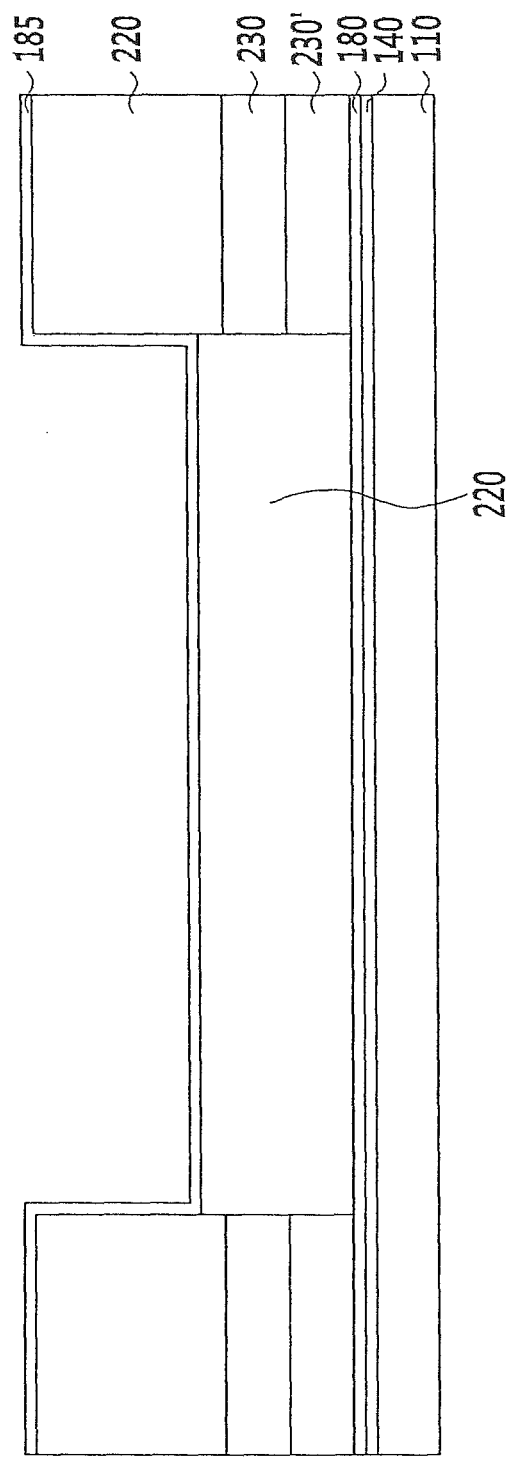

Next, as shown in FIG. 34D and FIG. 34E, the material is exposed by the mask 500 to form a light blocking member 220 of FIG. 34F and FIG. 34G. In the exemplary embodiment of FIG. 31, as shown in FIG. 34F, the height of the light blocking member 220 is lower than the height of the exemplary embodiment of FIG. 22 in the region (hereinafter referred to as a connection region) where the common electrode connection 271 passes. In the exemplary embodiment of FIG. 31, the light blocking member 220 is provided with the predetermined height to obtain the microcavity layer 305. This may be confirmed from the light blocking member 220 provided at the right and left sides in FIG. 33, and the light blocking member 220 to obtain the microcavity layer 305 may have the height or thickness in a range of about 2.0 µm to about 3.6 µm. In an exemplary embodiment, the mask 500 may include a transflective region or a slit pattern where light is partially transmitted to control the height of the light blocking member 220.

The light blocking member 220 may include the organic material for the spacer and the black color pigment for blocking the light.

In an exemplary embodiment, the side wall of the light blocking member 220 is tapered. In an exemplary embodiment, the mask may include a transflective pattern or a slit pattern to control the exposure amount to provide the tapered side wall. In an alternative exemplary embodiment, the tapered side wall may be naturally provided in the etching process without the transflective pattern or the slit pattern.

Referring to FIG. 34F and FIG. 34G, a second passivation layer 185 is provided on substantially an entire region of the color filter 230 and the light blocking member 220. The second passivation layer 185 may include an inorganic insulator such as silicon nitride (SiNx) and silicon oxide (SiOx), for example, or an organic insulator.

Next, a first contact hole 186a and a second contact hole 186b, which expose the first drain electrode 175a and extensions 175b' of the second drain electrode 175b, respectively, are provided in the color filter 230, the light blocking member 220, and the passivation layers 180 and 185. A third contact hole 186c which exposes the protrusion 134 of the storage voltage line 131 and the extension 175c' of the third drain electrode 175c is provided in the color filter 230, the light blocking member 220, and the passivation layers 180 and 185.

Figure 35A:
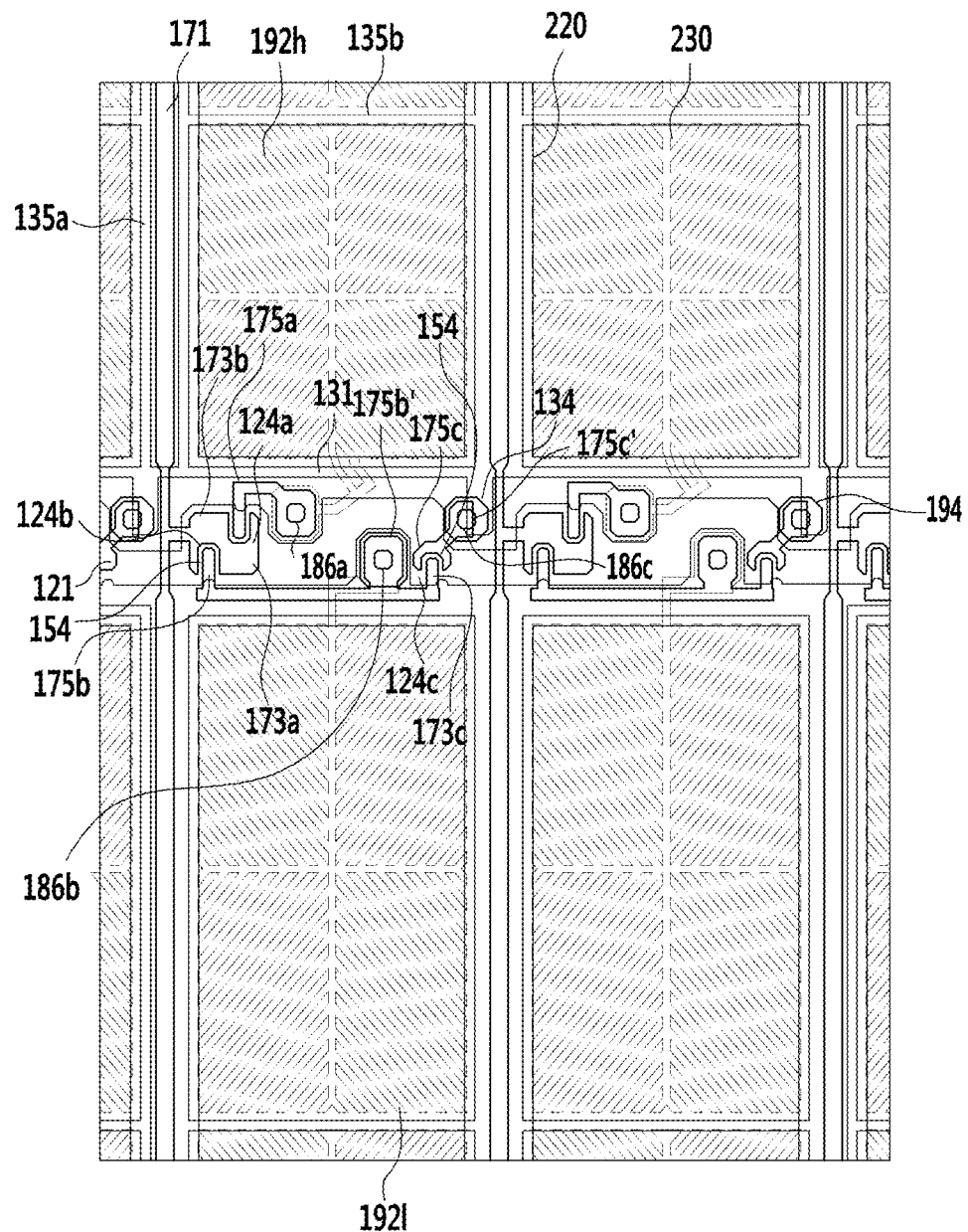
Figure 35B:
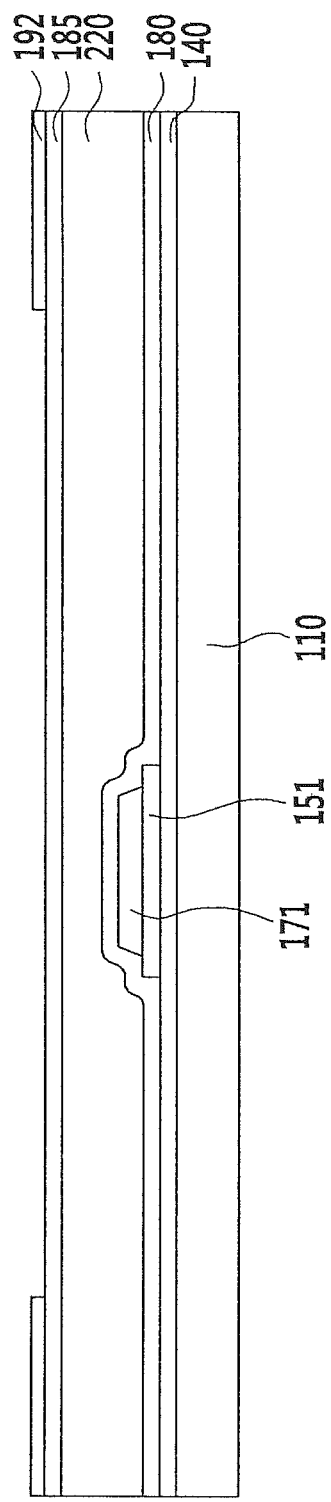
Figure 35C:
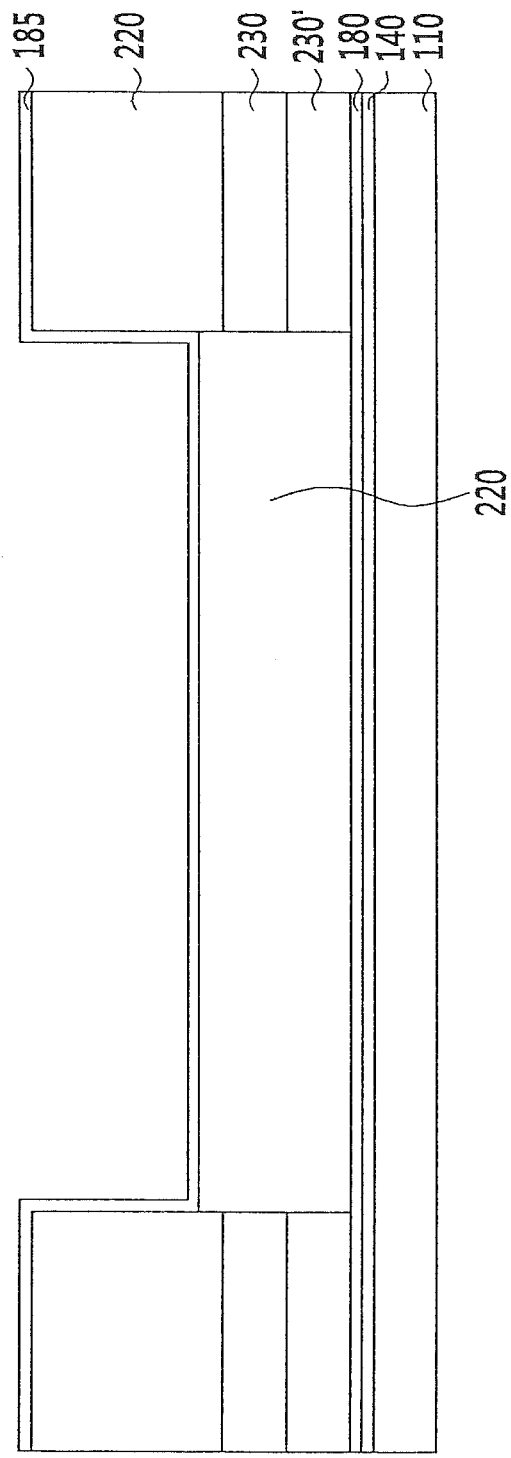

Next, as shown in FIG. 35A to FIG. 35C, a pixel electrode 192 including a first subpixel electrode 192h and a second subpixel electrode 192l is provided on the second passivation layer 185. In an exemplary embodiment, the pixel electrode 192 may include a transparent conductive material such as ITO or IZO, for example. In such an embodiment, the first subpixel electrode 192h and the second subpixel electrode 192l are physically and electrically connected with the first drain electrode 175a and the second drain electrode 175b through the contact holes 186a and 186b. In such an embodiment, a connecting member 194 which electrically connects the extension 175c' of the third drain electrode 175c and the protrusion 134 of the storage voltage line 131 through the third contact hole 186c is also provided, such that part of the data voltage applied to the second drain electrode 175b is divided through the third source electrode 173c, and the magnitude of the voltage applied to the second subpixel electrode 192l is thereby less than the magnitude of the voltage applied to the first subpixel electrode 192h.

Figure 36A:
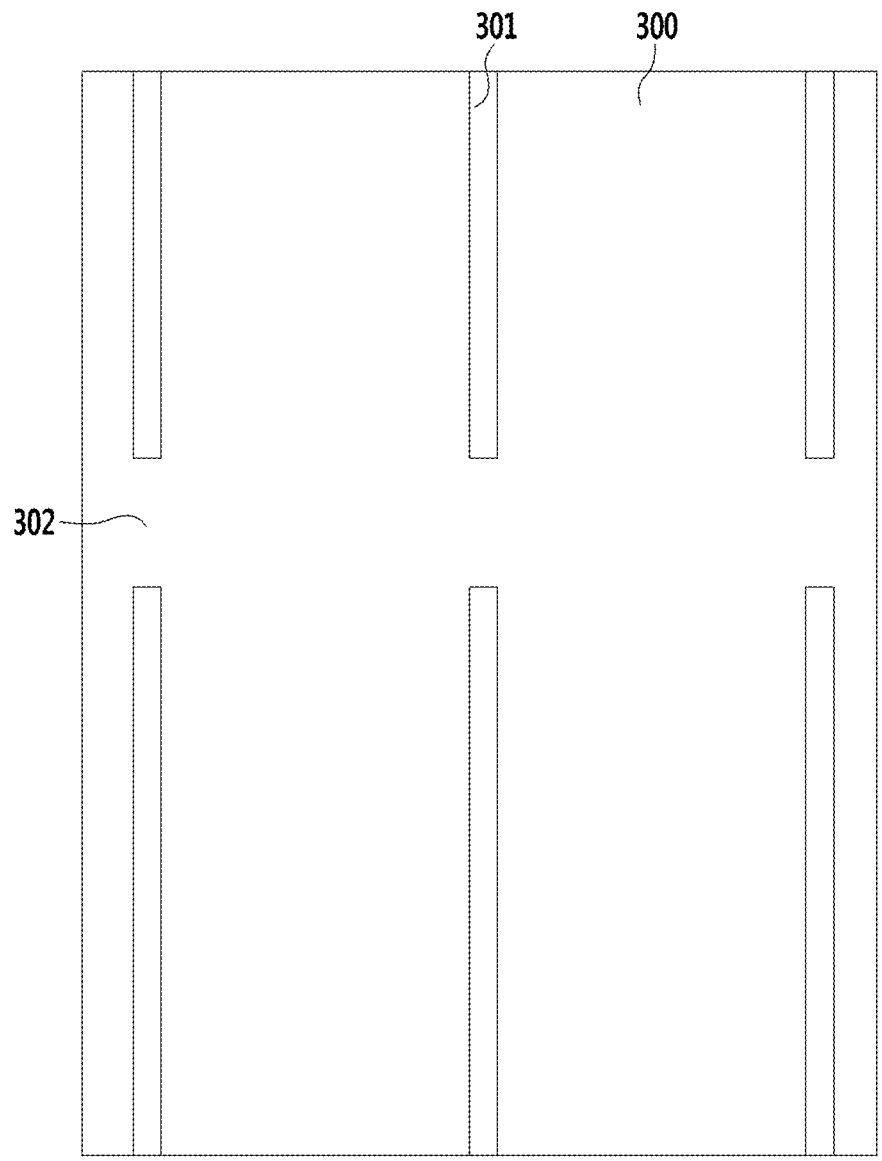
Figure 36B:
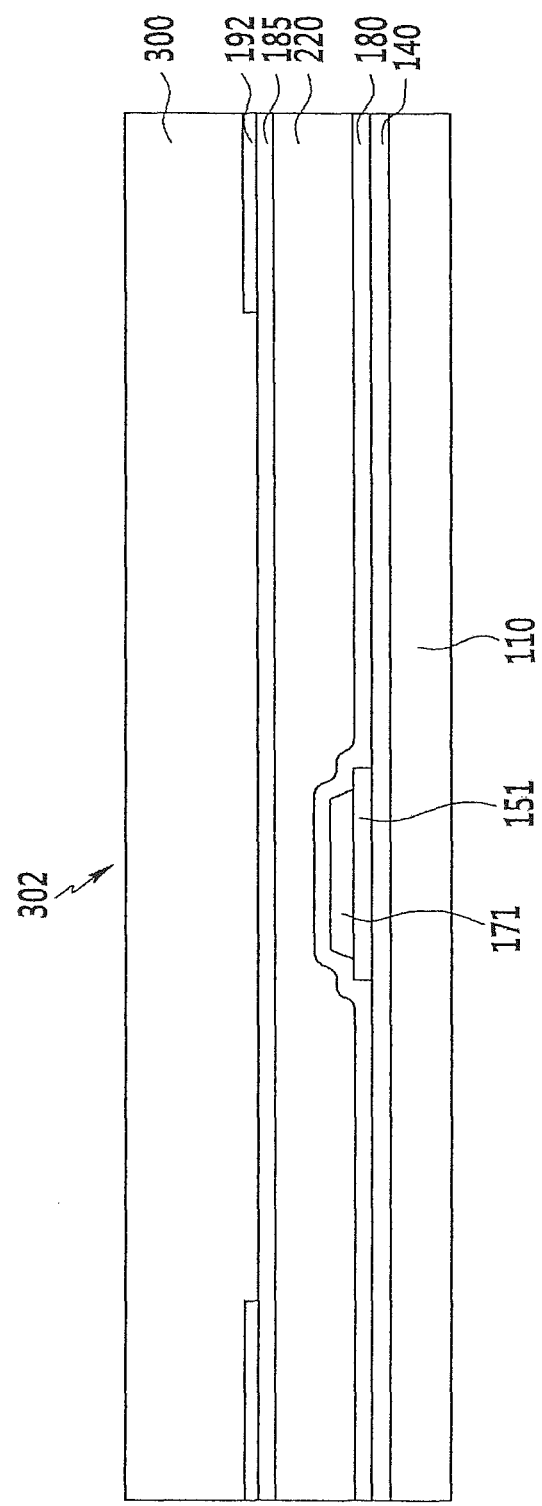
Figure 36C:
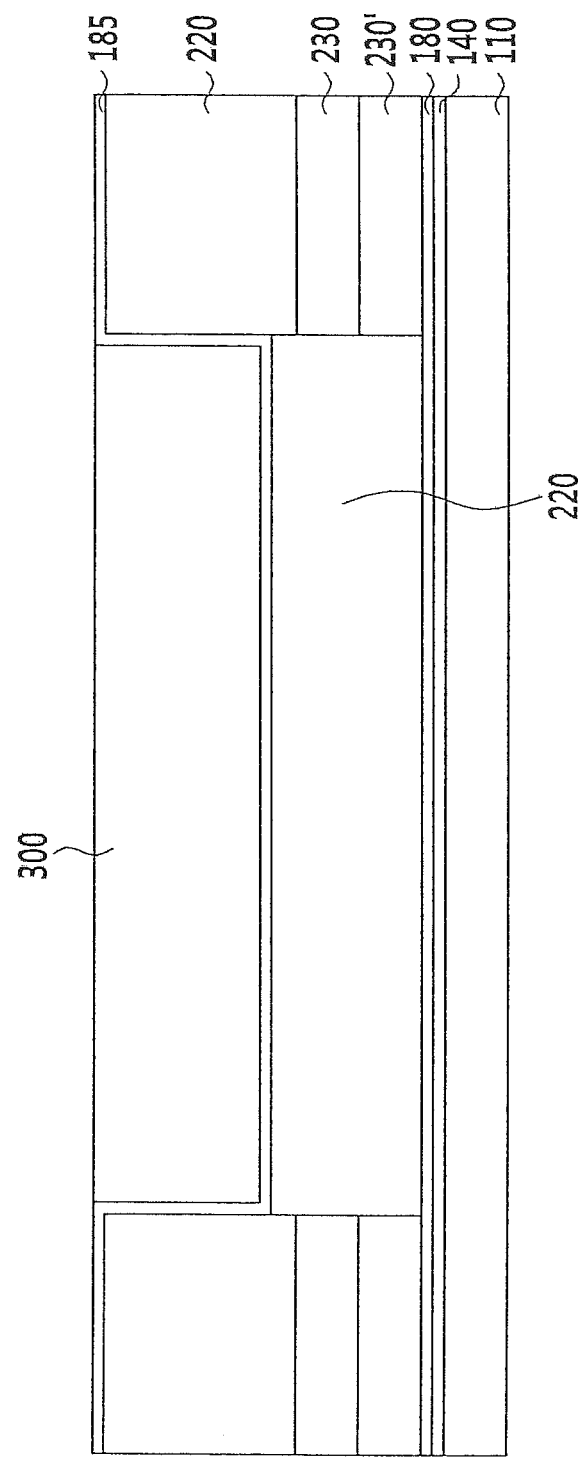

Next, as shown in FIG. 36A to 36C, a sacrificial layer 300 having an opening 301 and a connection 302 is provided. The sacrificial layer 300 may be provided using the organic material such as a PR, and the PR is deposited and is exposed, then developed and etched, by using the mask 500 to complete the sacrificial layer 300. The sacrificial layer 300 is provided in the region where the light blocking member 220 is not provided such that the side wall of the light blocking member 220 and the side wall of the sacrificial layer 300 correspond to each other. As a result, the side wall of the sacrificial layer 300 is reversely tapered by corresponding to the tapered side wall of the light blocking member 220. The sacrificial layer 300 has the opening 301 which is positioned between a main body corresponding to a structure of a microcavity and an adjacent main body at a position to form the microcavity In an exemplary embodiment, a width of the opening 301 may be about 2.5 µm. In an exemplary embodiment, the height of the sacrificial layer 300 may be substantially the same as the height of the second passivation layer 185 at the upper surface of the light blocking member 220. In an exemplary embodiment, the connection 302 is provided at the position corresponding to the region (the liquid crystal injection hole open region) that is etched in the process of providing the liquid crystal injection hole 335.

Figure 37A:
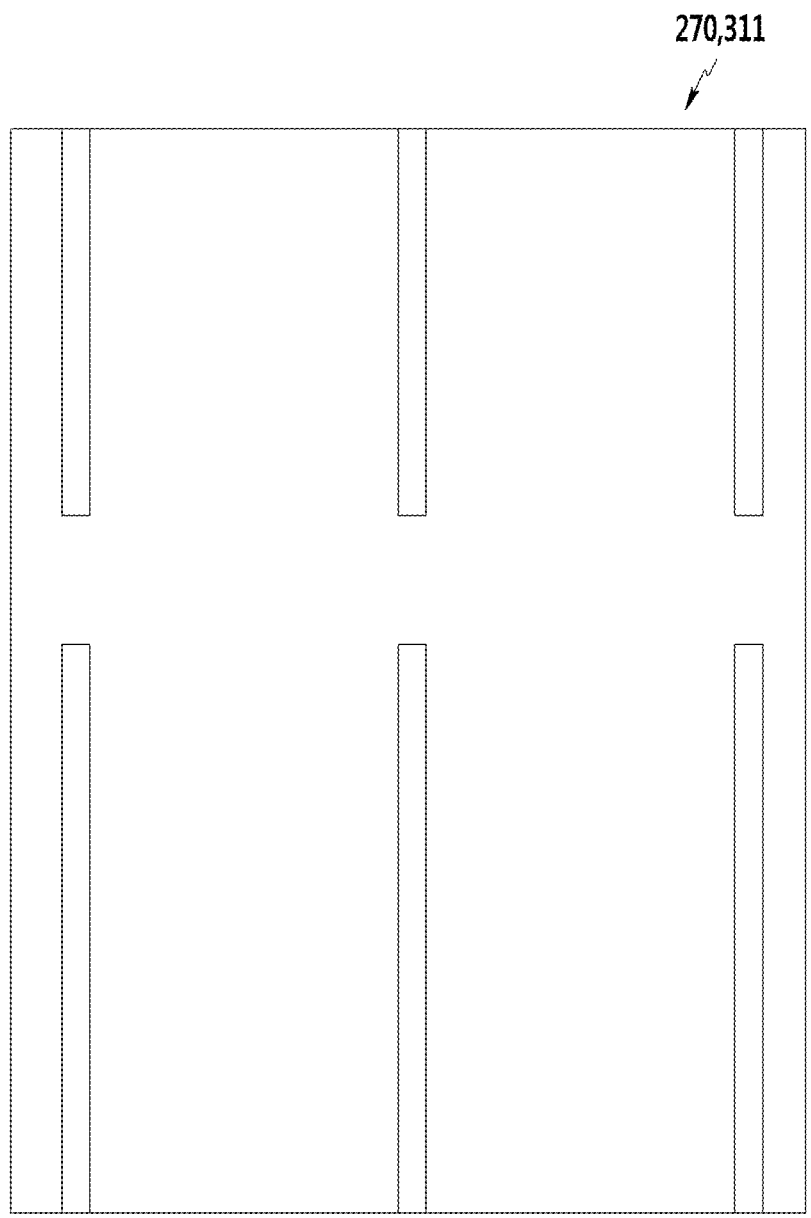
Figure 37B:
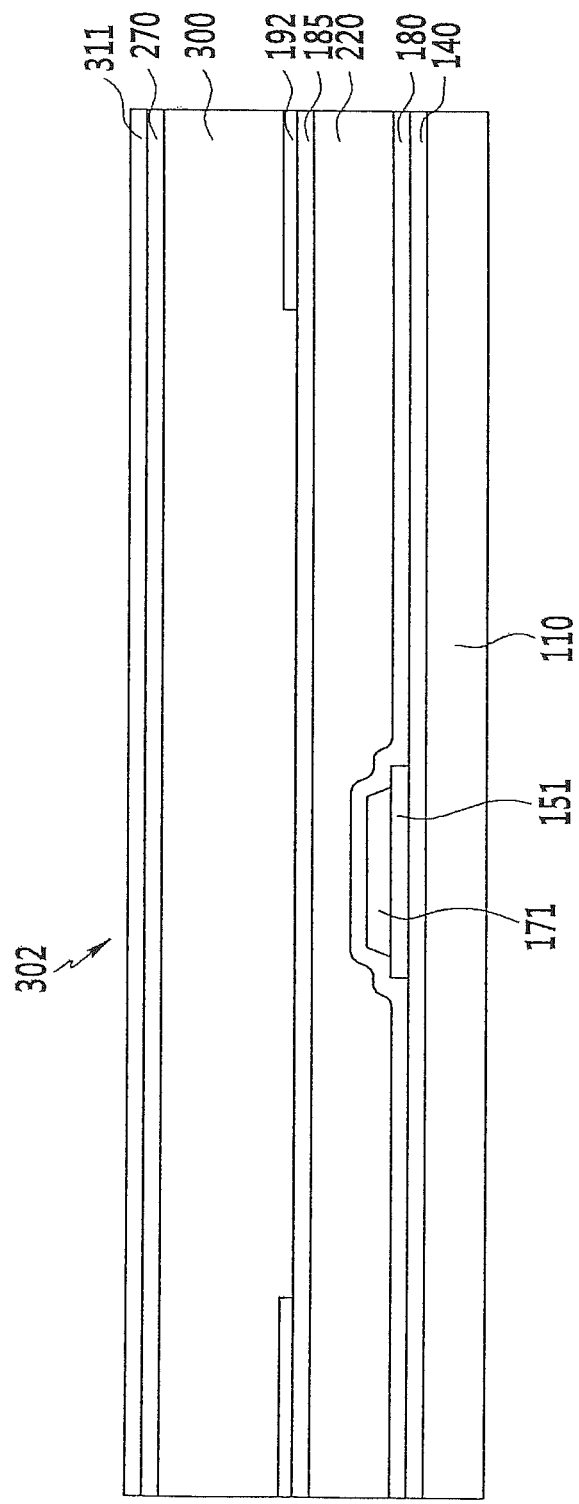
Figure 37C:
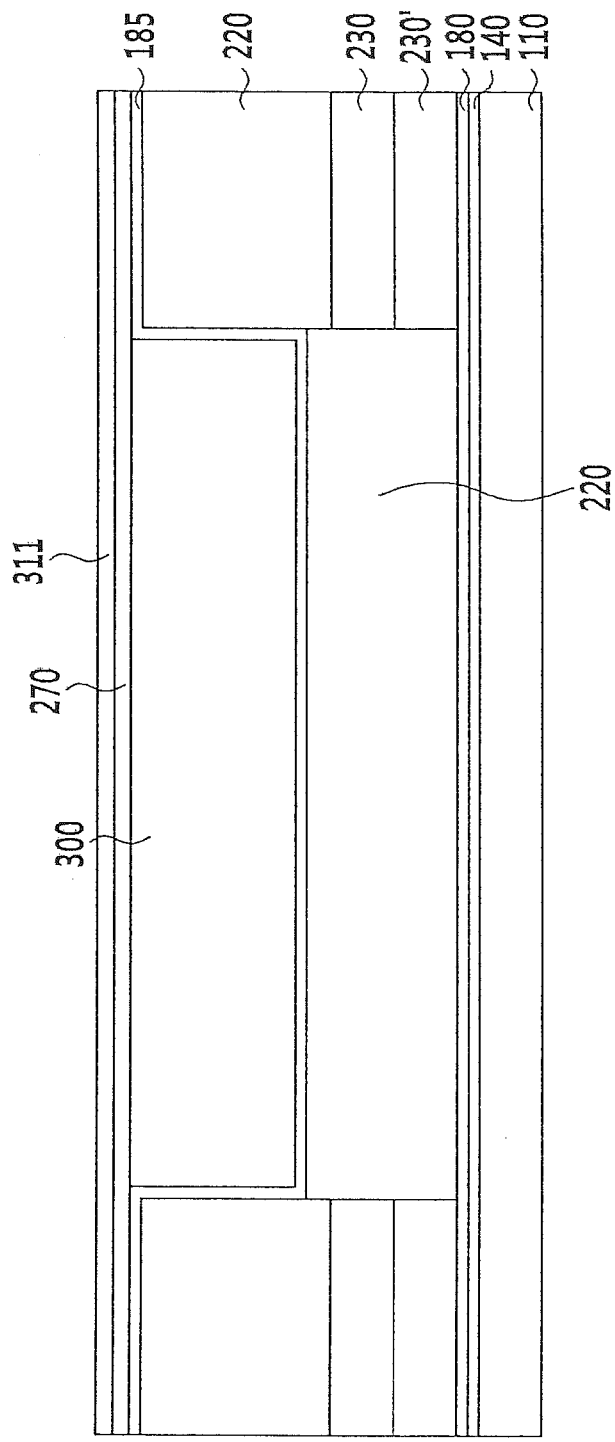

Next, as shown in FIG. 37A to FIG. 37C, a common electrode 270 and a lower insulating layer 311 are sequentially provided. That is, a transparent conductive material, such as ITO or IZO, for example, is laminated over substantially an entire region of the display panel, and then a material of a support layer, which includes an inorganic insulating material such as silicon nitride (SiNx), is laminated over substantially the entire region of the display panel. As a result, the lower insulating layer 311 is provided to cover the common electrode 270.

Figure 38A:
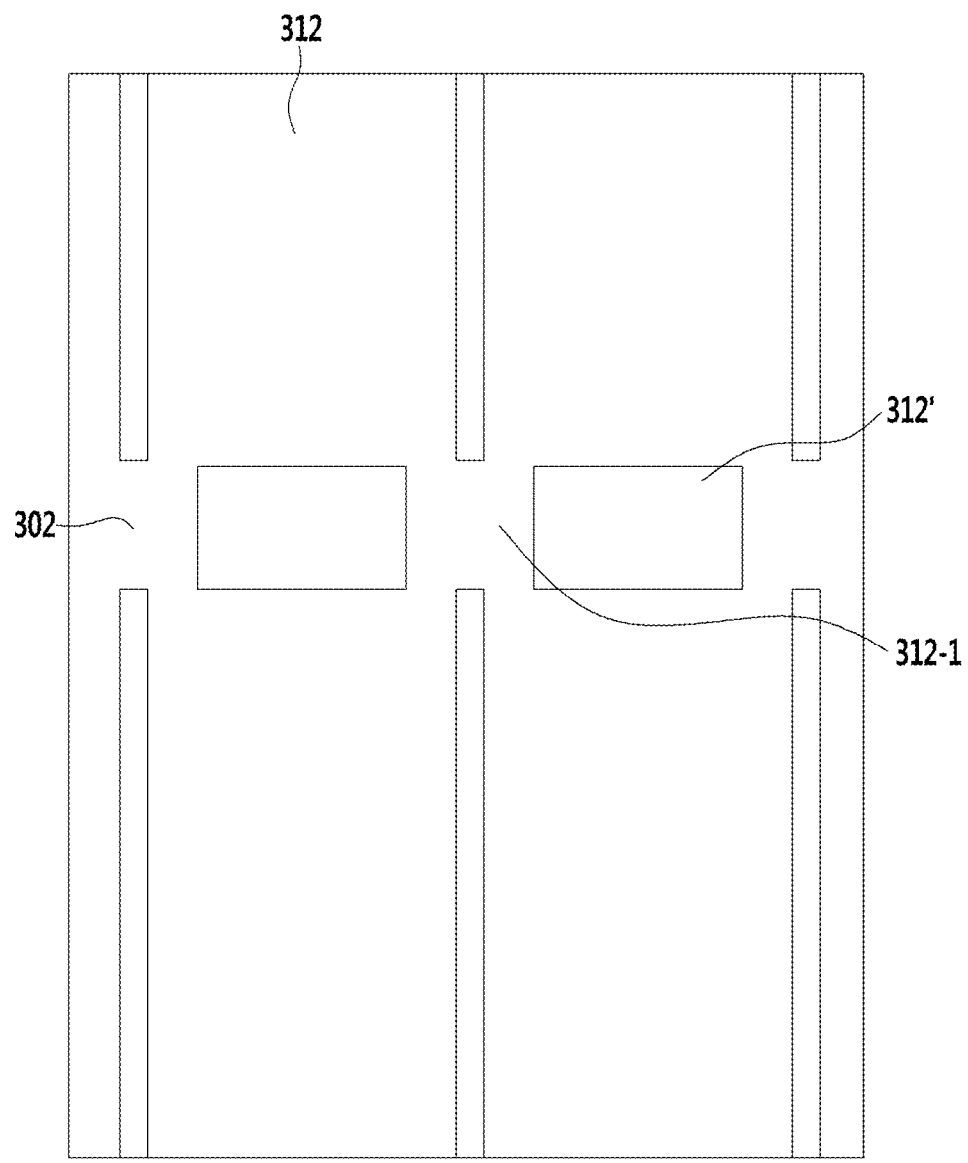
Figure 38B:
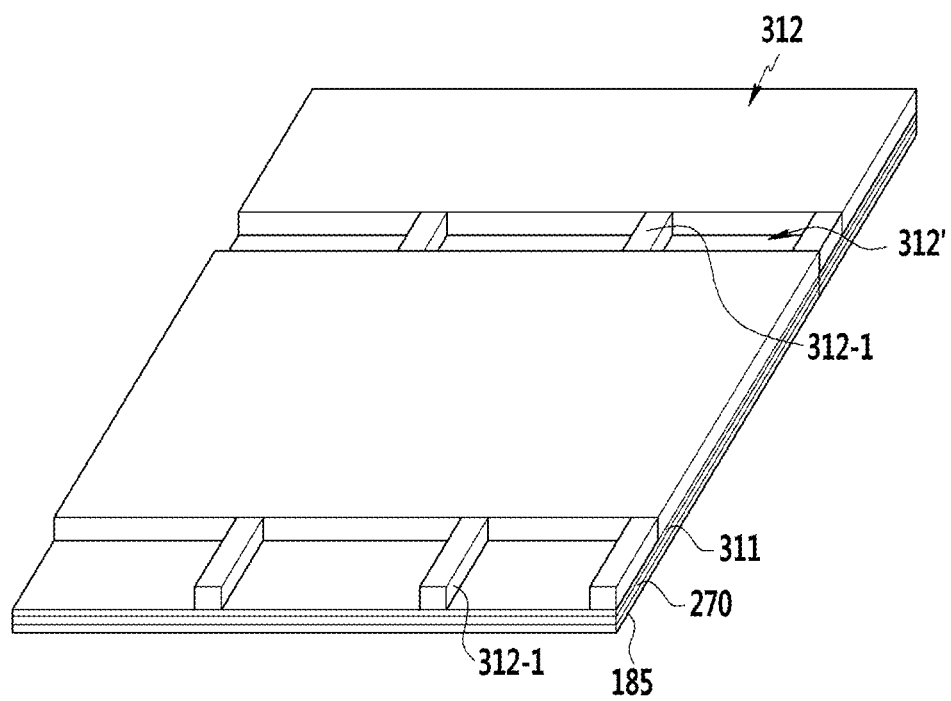
Figure 38C:
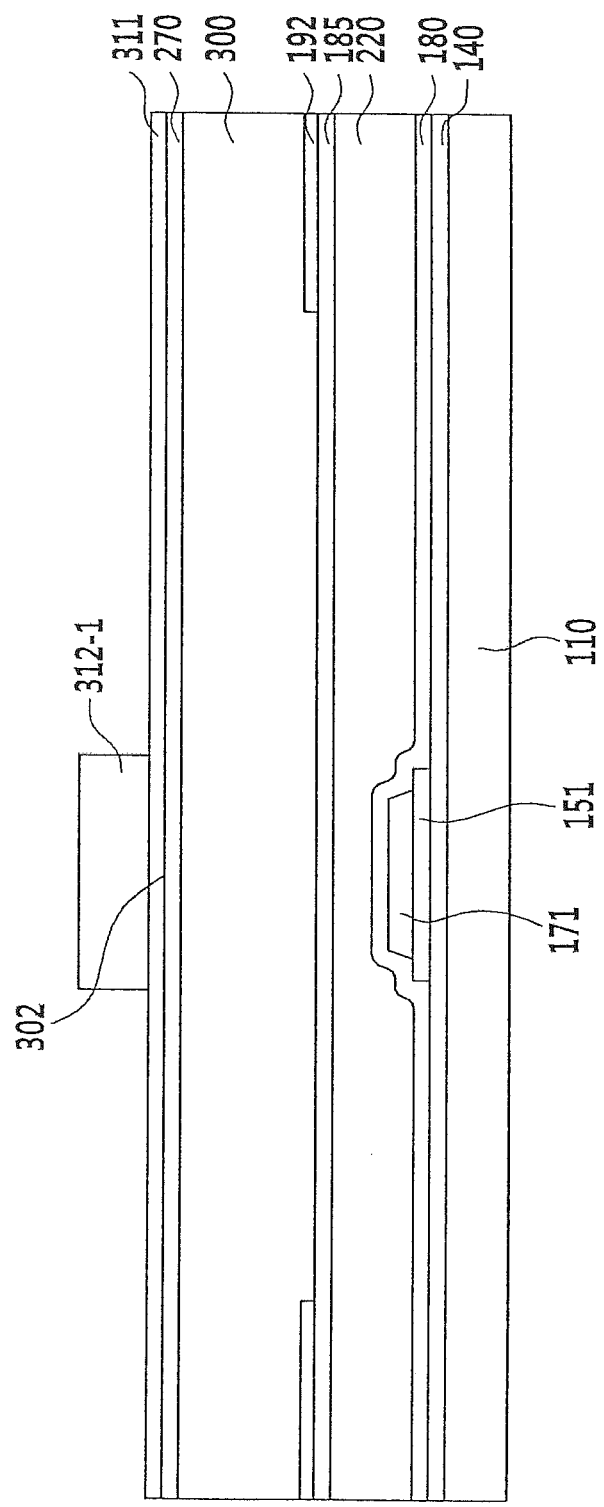
Figure 38D:
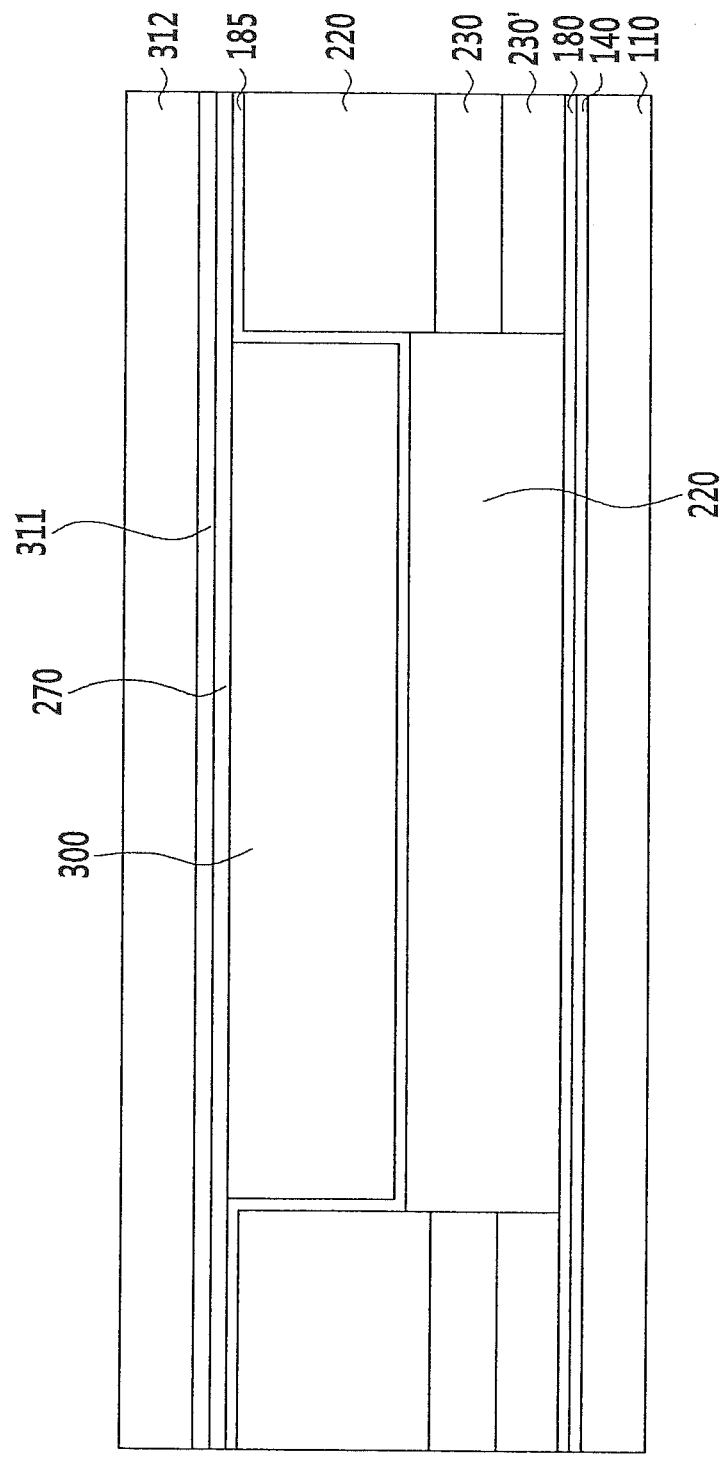

Next, as shown in FIG. 38A to FIG. 38D, a roof layer 312 having an opening 312' is provided on the liquid crystal injection hole open region. The region provided at the right side and the left side of the opening 312' is referred to as an opening peripheral area 312-1. The roof layer 312 may include the organic material, and the roof layer 312 is not provided on or exposes the region (hereinafter referred to as "a liquid crystal injection hole open region") that is etched in the process of providing the liquid crystal injection hole 3, thereby forming the opening 312'. FIG. 38A shows the liquid crystal injection hole open region corresponding to the thin film transistor formation region. Also, the roof layer 312 is not provided in the corresponding region, and in FIG. 38A to 38D, the common electrode 270 and the lower insulating layer 311 that are entirely provided are exposed.

In an exemplary embodiment of providing the roof layer 312, a material for the roof layer including the organic material is deposited in substantially the entire region of the panel, exposed and developed using a mask, and then the roof layer 312 is completed by removing the material for the roof layer at the portion of the liquid crystal injection hole open region. In such an embodiment, the common electrode 270 and the support layer 311 which are provided below the roof layer 312 are not etched and are then exposed. In such an embodiment, in the opening 312', only the sacrificial layer 300, the common electrode 270, and the lower insulating layer 311 are provided, and in the rest of the region (including the opening peripheral area 312-1), the sacrificial layer 300 or the opening 301, the common electrode 270, the lower insulating layer 311 and the roof layer 312 are provided.

Figure 39A:
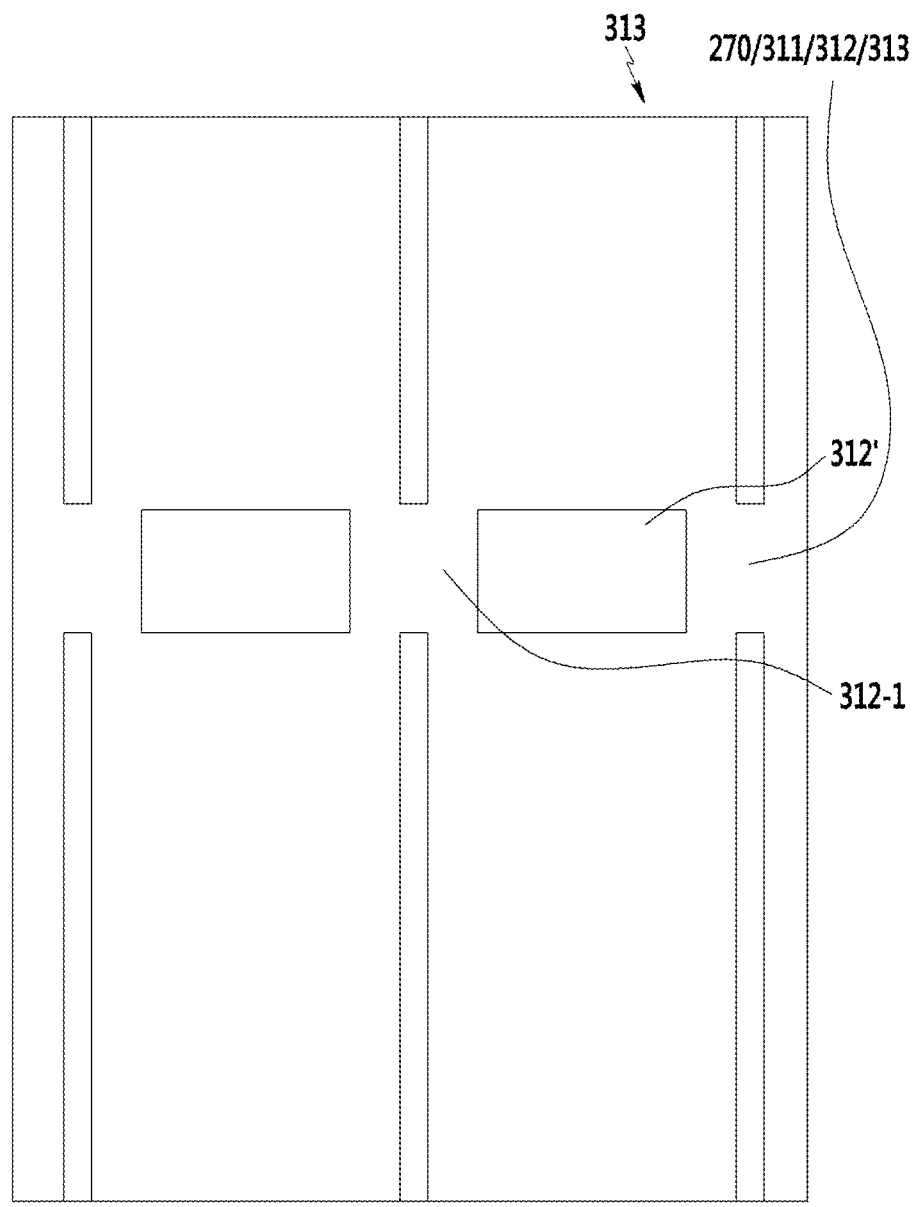
Figure 39B:
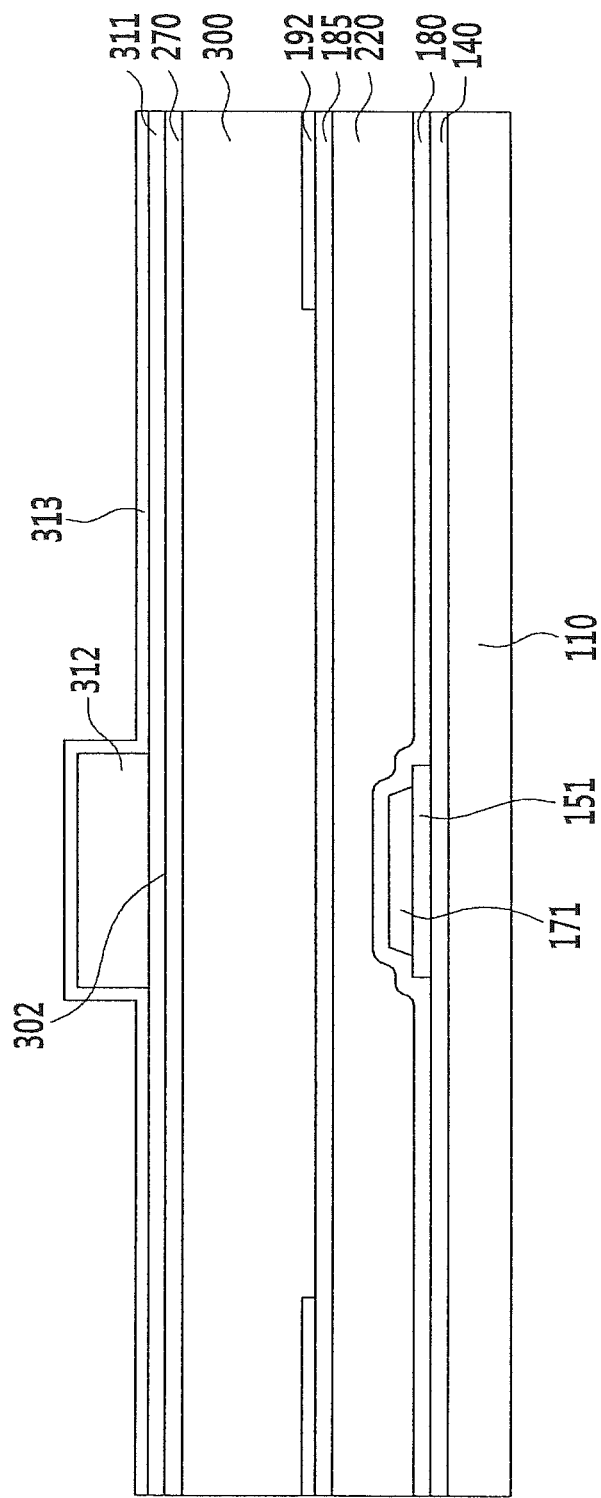
Figure 39C:
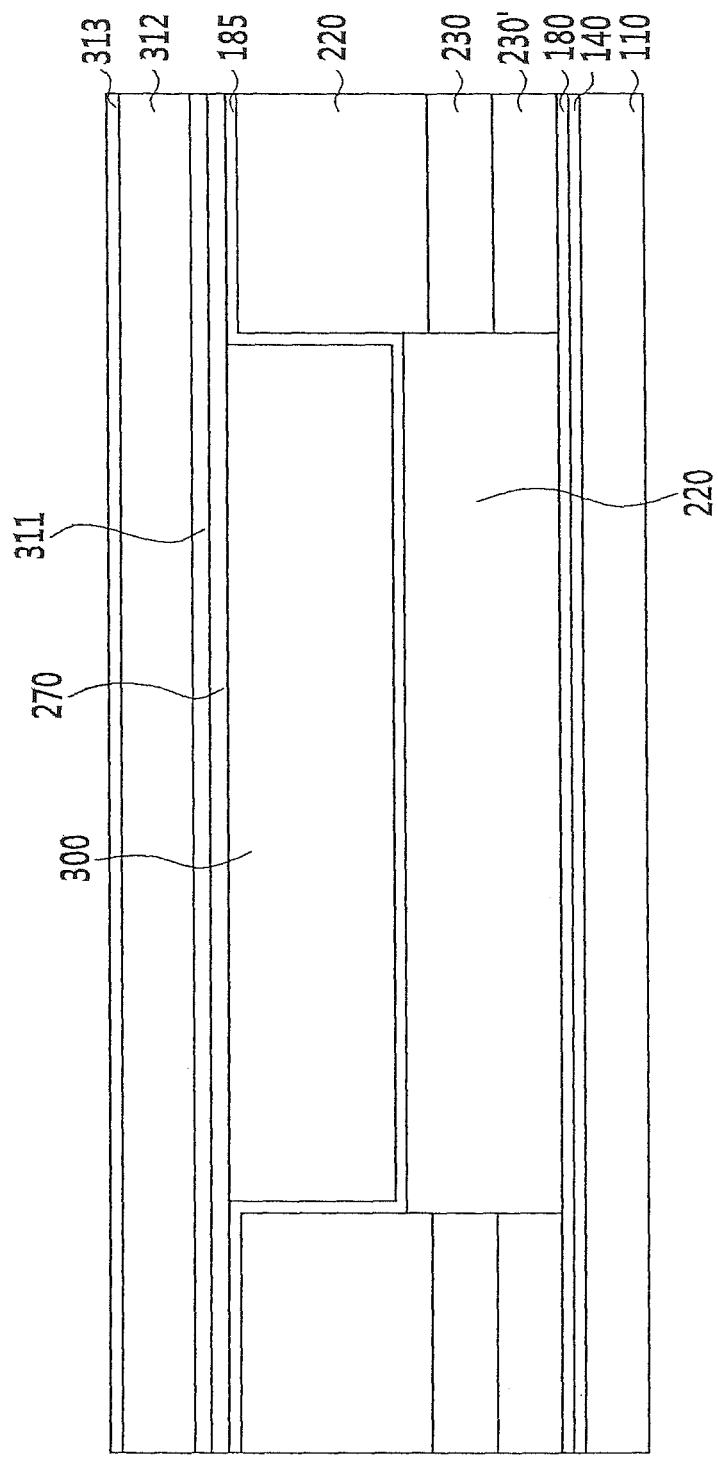

Next, as shown FIG. 39A to FIG. 39C, a material for an upper insulating layer 313 including an inorganic insulating material such as silicon nitride (SiNx) is deposited.

Figure 40:
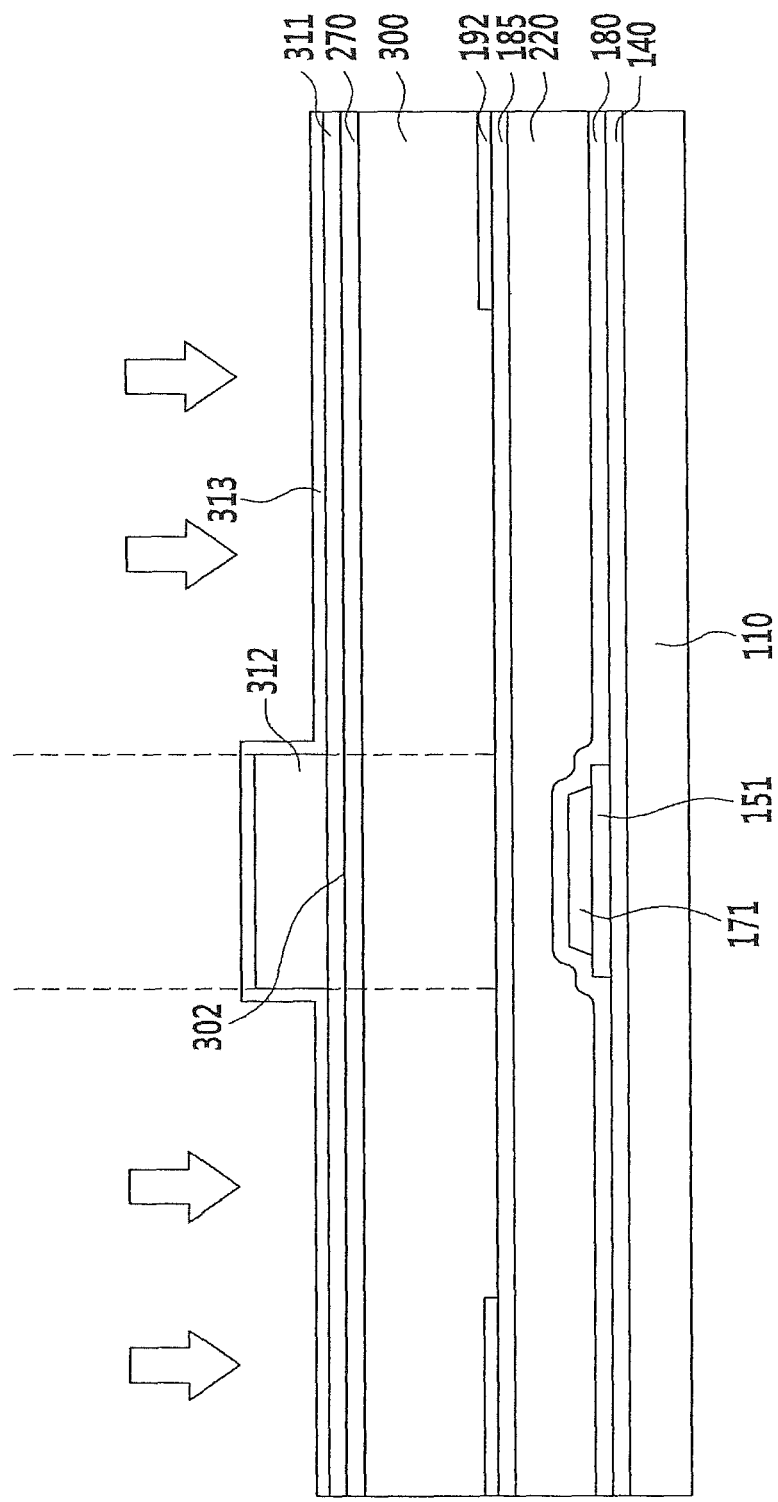
Figure 41:
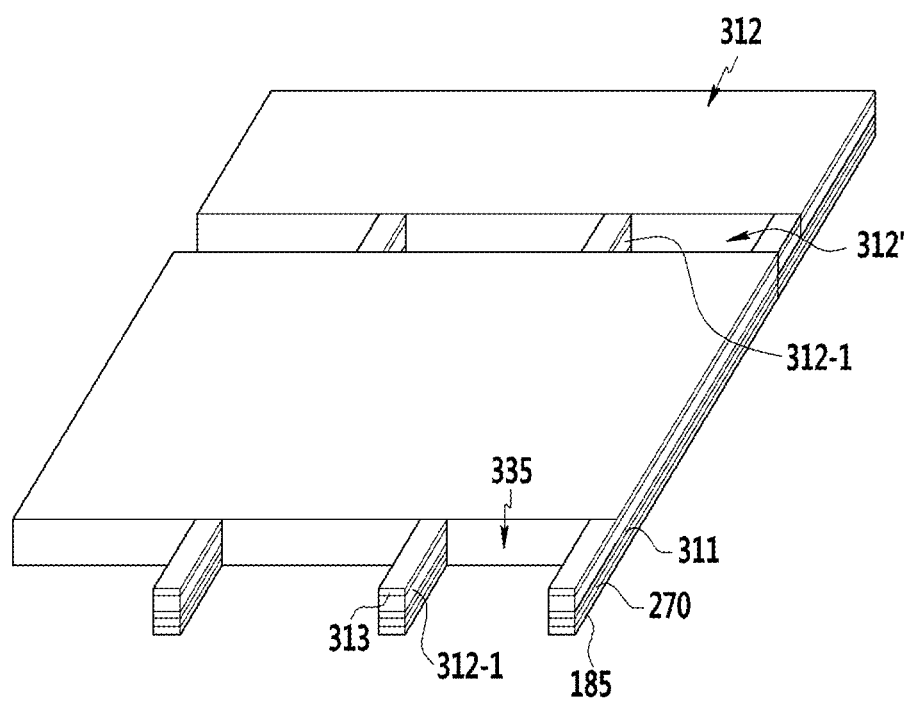

Next, as shown in FIG. 40 and FIG. 41, the region corresponding to the liquid crystal injection hole open region is etched and exposed to complete an upper insulating layer 313 and a liquid crystal injection hole 335 and to form a common electrode connection 271. As shown in FIG. 41, the liquid crystal injection hole open region is not etched at the portion where the common electrode connection 271 is provided, differently from the exemplary embodiment of FIG. 1. As a result, common electrodes 270 are also connected to each other in the expansion direction of the data line.

In an exemplary embodiment, the PR is provided on the entire region to etch the liquid crystal injection hole open region, the PR corresponding to the liquid crystal injection hole open region is removed to form a photoresist pattern, and the liquid crystal injection hole open region is etched according to the photoresist pattern. In such an embodiment, in the liquid crystal injection hole open region, the material 313 for the upper insulating layer, the lower insulating layer 311, the common electrode 270 and the sacrificial layer 300 are etched and the underlying layer is not etched. Also, the region where the common electrode connection 271 is provided is not etched. According to an alternative exemplary embodiment, the sacrificial layer 300 may be partially etched or may not be etched. In an exemplary embodiment, the process of etching the liquid crystal injection hole open region may be a dry etch process. In an alternative exemplary embodiment, when an etchant capable of etching several layers together exists, a wet etch process may be used.

Next, the sacrificial layer 300 is removed through the liquid crystal injection hole open region to form a microcavity layer 305. In an exemplary embodiment, where the sacrificial layer 300 is provided by the PR, a process of removing the photoresist pattern provided on the upper insulating layer 313 may be performed together. In such an embodiment, the photoresist pattern provided on the upper insulating layer 313 together with the sacrificial layer 300 is immersed in an etchant (for example, a photoresist stripper) for removing the photoresist pattern to be wet-etched. According to the above process, the process of removing the PR provided on the upper insulating layer 313 and the process of removing the sacrificial layer 300 may be performed together, such that the manufacturing process is substantially simplified. In an alternative exemplary embodiment, where the sacrificial layer 300 is provided by a material other than the PR, the two processes may be separately performed. In such an embodiment, the sacrificial layer 300 may be dry-etched.

As described above, when removing the sacrificial layer 300, the connection 302 of the sacrificial layer 300 is together removed. As a result, as shown in FIG. 32, the common electrode connection 271 is floated, and is supported by the overlying lower insulating layer 311, roof layer 312 and upper insulating layer 313.

Thereafter, an alignment layer (not shown) or a liquid crystal material is injected into the provided microcavity 305 by using the capillary force.

Although not shown, a process of sealing the microcavity layer 305 may be performed to effectively prevent the liquid crystal layer 3 from flowing outside of the microcavity layer 305.

In the above exemplary embodiment of FIG. 31, the common electrode connection 271 is provided such that the liquid crystal injection hole open region is not etched at the position corresponding to the common electrode connection 271.

In an exemplary embodiment, where the common electrode connection 271 is provided as in the exemplary embodiment of FIG. 31, the common voltage is also applied in the data line direction such that a drawback that the common voltage is deteriorated at the center of the display area is effectively prevented or substantially reduced.

The exemplary embodiment of FIG. 31 has the common electrode connection 271 as in the exemplary embodiment of FIG. 22. However, in the exemplary embodiment of FIG. 22, the light blocking member 220 is provided to protrude upwardly at the position of the formation of the common electrode connection 271, and the common electrode connection 271 is positioned thereon such that the common electrode connection 271 is supported by the light blocking member 220. In the exemplary embodiment of FIG. 31, the connection 302 of the sacrificial layer is provided at the position of the formation of the common electrode connection 271, and when removing the sacrificial layer 300, the connection 302 is removed such that a space is provided under the common electrode connection 271. According to an exemplary embodiment, the liquid crystal layer 3 may be filled in at least a portion of the space under the common electrode connection 271. In the structure of the exemplary embodiment of FIG. 31, the common electrode connection 271 is supported by the overlying lower insulating layer 311, roof layer 312 and upper insulating layer 313.

Next, another alternative exemplary embodiment of the invention will be described with reference to FIG. 42.

Figure 42:
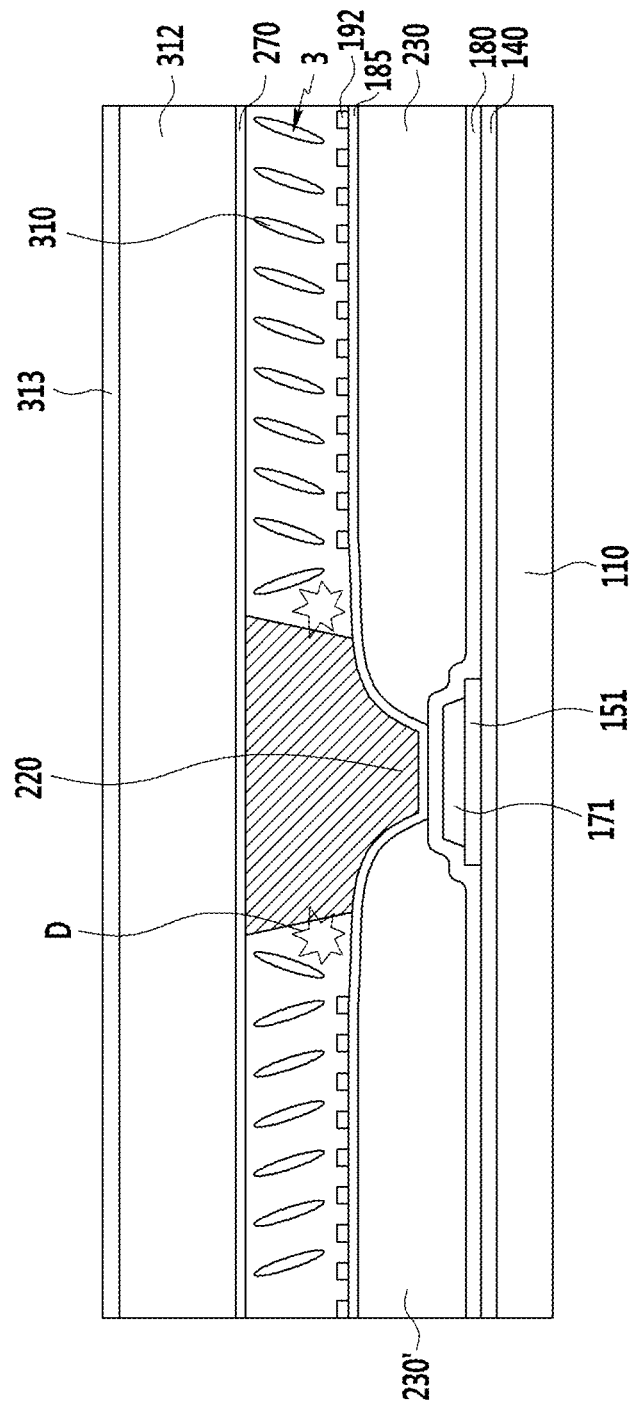
FIG. 42 is a cross-sectional view of another alternative exemplary embodiment of a liquid crystal display according to the invention.

FIG. 42 is a cross-sectional view of another alternative exemplary embodiment of a liquid crystal display according to the invention.

In an exemplary embodiment, as shown in FIG. 42, the region D where the liquid crystal molecules may be misaligned is covered by the upper surface of the light blocking member 220 in the microcavity layer 305 having the tapered side wall as in the comparative example of FIG. 13. In the exemplary embodiment of FIG. 42, the common electrode 270 is disposed substantially parallel to the insulation substrate 110 such that the electric field is not distorted.

The display device in FIG. 42 is substantially the same as the display device shown in FIG. 2 except for the microcavity layer and the lower insulating layer. The same or like elements shown in FIG. 42 have been labeled with the same reference characters as used above to describe the exemplary embodiments of the display device shown in FIG. 2, and any repetitive detailed description thereof will hereinafter be omitted or simplified.

In an exemplary embodiment, as shown in FIG. 42, the side wall of the microcavity layer 305 has the tapered structure, and the side wall of the light blocking member 220 has the reversed tapered structure corresponding to the side wall of the microcavity layer 305.

In an exemplary embodiment, as shown in FIG. 42, the lower insulating layer 311 is not disposed between the common electrode 270 and the roof layer 312. In an alternative exemplary embodiment, the lower insulating layer 311 may be disposed between the common electrode 270 and the roof layer 312.

Next, the exemplary embodiment of FIG. 42 will be described with reference to FIG. 1 and FIG. 42.

A gate line 121 and a storage voltage line 131 are disposed on an insulation substrate 110 including a material, such as transparent glass, plastic, or the like. The gate line 121 includes a first gate electrode 124a, a second gate electrode 124b and a third gate electrode 124c. The storage voltage line 131 includes storage electrodes 135a and 135b and a protrusion 134 protruding toward the gate line 121. The storage electrodes 135a and 135b have a structure surrounding a first subpixel electrode 192h and a second subpixel electrode 192l of a previous pixel. A horizontal portion 135b of the storage electrode may be a wire connected with the horizontal portion 135b of the previous pixel, which are not separated from each other.

A gate insulating layer 140 is disposed on the gate line 121 and the storage voltage line 131. A semiconductor 151 positioned below a data line 171, a semiconductor 155 positioned below source/drain electrodes, and a semiconductor 154 positioned at a channel portion of a thin film transistor are disposed on the gate insulating layer 140.

A plurality of ohmic contacts (not shown) may be disposed on each of the semiconductors 151 and 154 and between the data line 171 and the source/drain electrodes.

Data conductors 171, 173a, 173b, 173c, 175a, 175b, and 175c, which include a plurality of data lines 171 including a first source electrode 173a and a second source electrode 173b, a first drain electrode 175a, a second drain electrode 175b, a third source electrode 173c, and a third drain electrode 175c, are disposed on the semiconductors 151 and 154 and the gate insulating layer 140.

The first gate electrode 124a, the first source electrode 173a and the first drain electrode 175a collectively define a first thin film transistor together with the semiconductor 154, and a channel of the thin film transistor is disposed at the semiconductor portion 154 between the first source electrode 173a and the first drain electrode 175a. The second gate electrode 124b, the second source electrode 173b and the second drain electrode 175b collectively define a second thin film transistor together with the semiconductor 154, and a channel of the thin film transistor is disposed at the semiconductor portion 154 between the second source electrode 173b and the second drain electrode 175b. The third gate electrode 124c, the third source electrode 173c and the third drain electrode 175c collectively define a third thin film transistor together with the semiconductor 154, and a channel of the thin film transistor is disposed at the semiconductor portion 154 between the third source electrode 173c and the third drain electrode 175c.

The data line 171 has a structure in which a width becomes decreased in a forming region of the thin film transistor in the vicinity of an extension 175c' of the third drain electrode 175c such that an interval with the adjacent wiring is substantially maintained and signal interference is substantially reduced, but not being limited thereto.

A first passivation layer 180 is disposed on the data conductors 171, 173a, 173b, 173c, 175a, 175b and 175c and an exposed portion of the semiconductor 154. The first passivation layer 180 may include an inorganic insulator such as silicon nitride (SiNx) and silicon oxide (SiOx), for example, or an organic insulator.

A color filter 230 is disposed on the passivation layer 180. Color filters 230 of the same color are disposed in the pixels adjacent in a vertical direction (a data line direction). In such an embodiment, color filters 230 and 230' of different colors are disposed in the pixels adjacent in a horizontal direction (a gate line direction), and two color filters 230 and 230' adjacent in the horizontal direction may overlap each other on the data line 171. The color filters 230 and 230' may display one of primary colors such as three primary colors of red, green and blue, but not being limited thereto. In an alternative exemplary embodiment, the color filters 230 and 230' may also display one of cyan, magenta, yellow and white colors, for example.

The second passivation layer 185 is disposed on the color filters 230 and 230'. The second passivation layer 185 may include an inorganic insulator such as silicon nitride (SiNx) and silicon oxide (SiOx), for example, or an organic insulator. According to an alternative exemplary embodiment, the second passivation layer 185 may include the organic insulator.

A first contact hole 186a and a second contact hole 186b, which expose the first drain electrode 175a and extensions 175b' of the second drain electrode 175b, respectively, are defined, e.g., formed, in the color filter 230 and the passivation layers 180 and 185. A third contact hole 186c which exposes the protrusion 134 of the storage voltage line 131 and the extension 175c' of the third drain electrode 175c is defined, e.g., formed, in the color filter 230, the light blocking member 220 and the passivation layers 180 and 185.

In an exemplary embodiment, the color filter 230 may further include the contact holes 186a, 186b and 186c. In an exemplary embodiment, where the etching of the contact hole may not be efficiently performed according to the material of the color filter 230 compared with the passivation layers 180 and 185, when etching the color filter 230, the color filter 230 may be previously removed at the position where the contact holes 186a, 186b, and 186c are formed.

A pixel electrode 192 including a first subpixel electrode 192h and a second subpixel electrode 192l is disposed on the second passivation layer 185. The pixel electrode 192 may include a transparent conductive material such as ITO or IZO, for example.

The first subpixel electrode 192h and the second subpixel electrode 192l are adjacent to each other in a column direction, have an entirely quadrangular shape, and include a cross stem including a transverse stem and a longitudinal stem crossing the transverse stem. In such an embodiment, the first subpixel electrode 192h and the second subpixel electrode 192l are divided into four subregions by the transverse stem and the longitudinal stem, and each subregion includes a plurality of minute branches.

The minute branches of the first subpixel electrode 192h and the second subpixel electrode 192l form angles in a range of about 40 degrees to 45 degrees with the gate line 121 or the transverse stem. In such an embodiment, the minute branches of two adjacent subregions may be perpendicular to each other. In such an embodiment, a width of the minute branch may become gradually increased or intervals between the minute branches 194 may be different from each other.

The first subpixel electrode 192h and the second subpixel electrode 192l are physically and electrically connected to the first drain electrode 175a and the second drain electrode 175b through the contact holes 186a and 186b, and receive data voltages from the first drain electrode 175a and the second drain electrode 175b.

In an exemplary embodiment, a connecting member 194 electrically connects the extension 175c' of the third drain electrode 175c and the protrusion 134 of the storage voltage line 131 through the third contact hole 186c. In such an embodiment, part of the data voltage applied to the second drain electrode 175b is divided through the third source electrode 173c and thus the magnitude of the voltage applied to the second subpixel electrode 192l may be less than the magnitude of the voltage applied to the first subpixel electrode 192h.

In an exemplary embodiment, an area of the second subpixel electrode 192l may be about twice an area of the first subpixel electrode 192h.

In an exemplary embodiment, an opening for collecting gas discharged from the color filter 230 and an overcoat covering the corresponding opening with the same material as the pixel electrode 192 thereon may be disposed on the second passivation layer 185. The opening and the overcoat block the gas discharged from the color filter 230 from being transferred to another element. In an alternative exemplary embodiment, the opening may be omitted.

A light blocking member (black matrix; 220) is disposed in the region where the pixel electrode 192 is not disposed on the second passivation layer 185. The light blocking member 220 is disposed at a region (hereafter referred to as "a transistor formation region") where the gate line 121, the thin film transistor, and the data line 171 are disposed, and has a lattice structure having openings corresponding to a region where an image is displayed. The color filter 230 and the pixel electrode 192 may include the opening of the light blocking member 220. In such an embodiment, the light blocking member 220 may include a material through which light is not transmitted. In such an embodiment, the light blocking member 220 has a height greater than the height of the microcavity layer into which the liquid crystal layer 3 (shown in FIGS. 2 and 3) is injected.

In an exemplary embodiment, the side wall of the light blocking member 220 is disposed with the reversed taper structure, thereby having the reversed taper side wall, and the angle of the reversed taper side wall may be various in exemplary embodiments. By the reversed taper side wall, the upper surface of the light blocking member 220 has a structure of a wide area. As a result, the liquid crystal molecules 310 are misaligned by the upper surface of the light blocking member 220 through the light blocking member 220 in the region D.

The side wall of the light blocking member 220 corresponds to the side wall of the microcavity layer 305. In such an embodiment, the side wall of the microcavity layer 305 in which the liquid crystal layer 3 is positioned has the taper structure. The microcavity layer 305 is disposed by forming and removing the sacrificial layer 300, and in an exemplary embodiment of a manufacturing method of the exemplary embodiment of FIG. 42, the sacrificial layer 300 is firstly provided to have the tapered structure and then the light blocking member 220 is provided to be filled between the side wall of the sacrificial layer 300, thereby having the reversed taper side wall.

In an exemplary embodiment, a common electrode 270 is disposed on the liquid crystal layer 3 injected into the microcavity layer 305 on the second passivation layer 185 and the pixel electrode 192. The common electrode 270 has horizontal substantially planar structure substantially parallel to the insulation substrate 110 corresponding to the height of the light blocking member 220. In such an embodiment, the common electrode 270 is separated from the pixel electrode 192 by a predetermined distance such that a short circuit is effectively prevented, and the common electrode 270 may not be bent according to the side of the microcavity layer 305 such that the electric field is not distorted. The height or level of the common electrode 270 may be substantially maintained on the microcavity layer by the support of a roof layer 312 that will be described later. In such an embodiment, the common electrode 270 is not disposed at the portion of the liquid crystal injection hole 335, thereby having a structure that extends in the direction of the gate line (a left and right direction).

The common electrode 270 may include a transparent conductive material such as ITO or IZO, for example, and generates an electric field together with the pixel electrode 192 to control an alignment direction of liquid crystal molecules 310.

Although not shown in FIG. 42, a lower insulating layer 311 may be disposed on the common electrode 270 in an alternative exemplary embodiment. The lower insulating layer 311 may have the liquid crystal injection hole 335 disposed at one side to inject the liquid crystal into the microcavity layer 305. The lower insulating layer 311 may include the inorganic insulating material such as silicon nitride (SiNx). The liquid crystal injection hole 335 may be used even when a sacrificial layer provided to form the microcavity 305 is removed.

A roof layer 312 is disposed on the common electrode 270 or the lower insulating layer 311. The roof layer 312 may have a supporting function to define the microcavity layer between the pixel electrode 192 and the common electrode 270. The roof layer 312 has the function of supporting the microcavity layer 305 by the predetermined thickness on the common electrode 270, and may have the liquid crystal injection hole 335 at one side such that the liquid crystal is injected into the microcavity layer 305.

An upper insulating layer 313 is disposed on the roof layer 312. The upper insulating layer 313 may include the inorganic insulating material such as silicon nitride (SiNx). The roof layer 312 and the upper insulating layer 313 may be patterned along with the lower insulating layer 311 to form the liquid crystal injection hole.

In an alternative exemplary embodiment, the upper insulating layer 313 may also be omitted.

In an exemplary embodiment, an alignment layer (not shown) may be disposed below the common electrode 270 and above the pixel electrode 192 to arrange the liquid crystal molecules injected in the microcavity 305. The alignment layer may include at least one of materials such as polyamic acid, polysiloxane, or polyimide.

A liquid crystal layer 3 is disposed in the microcavity 305 (e.g., in the alignment layer disposed in the microcavity 305). The liquid crystal molecules 310 are initially aligned by the alignment layer, and the alignment direction is changed according to the electric field generated therein. The height of the liquid crystal layer 3 corresponds to the height of the microcavity layer 305, and the height of the microcavity layer 305 corresponds to the height of the light blocking member 220. In an exemplary embodiment, the height or thickness of the liquid crystal layer 3 may be in a range of about 2.0 µm to about 3.6 µm. In such an embodiment, where the thickness of the liquid crystal layer 3 is increased, the thickness of the light blocking member 220 is also increased.

The liquid crystal layer 3 disposed on the microcavity 305 may be injected into the microcavity 305 using a capillary force, and the alignment layer may be disposed by the capillary force.

In an alternative exemplary embodiment, the lower insulating layer 311 and the upper insulating layer 313 may be omitted. The polarizer includes a polarization element for generating polarization and a TAC layer for ensuring durability, and directions of transmissive axes in an upper polarizer and a lower polarizer may be substantially perpendicular or substantially parallel to each other.

In an exemplary embodiment, as shown in FIG. 42, the side wall of the microcavity layer 305 has the taper structure such that the liquid crystal molecules 310 may be misaligned near the side wall of the microcavity layer 305. In the exemplary embodiment of FIG. 42, the upper surface of the light blocking member 220 is substantially wide such that the region where the liquid crystal molecules 310 are misaligned may be covered by the light blocking member 220, thereby not being recognized by the user. Also, in the exemplary embodiment of FIG. 42, the common electrode 270 has the substantially planar structure substantially parallel to the insulation substrate 110 such that the electric field is not distorted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   an insulation substrate;
   a microcavity layer disposed on the insulation substrate and having a reversed taper side wall;
   a pixel electrode disposed in the microcavity layer on the insulation substrate;
   a liquid crystal layer disposed in the microcavity layer;
   a light blocking member comprising a first light blocking member disposed at a first side of the microcavity layer, and a second light blocking member disposed at a second side of the microcavity layer; and
   a common electrode which covers the liquid crystal layer and the first light blocking member,
   wherein a distance from an upper surface of the insulation substrate to an upper surface of the first light blocking member is longer than a distance from the upper surface of the insulation substrate to an upper surface of the second light blocking member.

2. The liquid crystal display of claim 1, wherein the first light blocking member has a tapered side wall corresponding to the reversed taper side wall of the microcavity layer.

3. The liquid crystal display of claim 2, wherein a height of the light blocking member corresponds to a height of the first microcavity layer.

4. The liquid crystal display of claim 3, wherein the common electrode has a substantially planar structure.

5. The liquid crystal display of claim 4, further comprising:
a second passivation layer disposed between the first light blocking member and the common electrode, and
a height of the second passivation layer disposed on the first light blocking member is substantially the same as the height of the microcavity layer.

6. The liquid crystal display of claim 5, wherein the common electrode is disposed substantially parallel to the insulation substrate corresponding to the height of the second passivation layer on the first light blocking member.

7. The liquid crystal display of claim 3, wherein the common electrode has a curved structure near the light blocking member.

8. The liquid crystal display of claim 7, wherein the common electrode has a curved upper structure near the light blocking member.

9. The liquid crystal display of claim 1, further comprising: a roof layer which covers the common electrode.

10. The liquid crystal display of claim 9, wherein a liquid crystal injection hole is defined in the roof layer.

11. The liquid crystal display of claim 10, wherein the liquid crystal injection hole is positioned at a thin film transistor formation region.

12. The liquid crystal display of claim 11, wherein the common electrode exposes the liquid crystal injection hole.

13. The liquid crystal display of claim 12, wherein the common electrode has a structure extending in one direction, and
the common electrode comprises a common electrode connection which connects portions of the common electrode in a direction substantially perpendicular to the one direction.

14. The liquid crystal display of claim 13, wherein the common electrode connection is disposed on the first light blocking member and is supported by the first light blocking member.

15. The liquid crystal display of claim 13, wherein the common electrode connection is supported by the roof layer.

16. The liquid crystal display of claim 1, wherein the pixel electrode comprises a stem, and a plurality of minute branches extending from the stem.

17. A liquid crystal display comprising:
an insulation substrate;
a microcavity layer disposed on the insulation substrate;
a pixel electrode disposed in the microcavity layer on the insulation substrate;
a liquid crystal layer disposed in the microcavity layer;
a light blocking member comprising a first light blocking member disposed at a first side of the microcavity layer, and a second light blocking member disposed at a second side of the microcavity layer; and
a common electrode which covers the liquid crystal layer and the first light blocking member,
wherein a height of the first light blocking member is substantially equal to or greater than a height of the microcavity layer, and
wherein a distance from an upper surface of the insulation substrate to an upper surface of the first light blocking member is longer than a distance from the upper surface of the insulation substrate to an upper surface of the second light blocking member.

18. The liquid crystal display of claim 17, wherein the microcavity layer has a reversed taper side wall.

19. The liquid crystal display of claim 18, wherein the first light blocking member has a taper side wall corresponding to the reversed taper side wall of the microcavity layer on the insulation substrate.

20. The liquid crystal display of claim 17, wherein the microcavity layer has a tapered side wall.

21. The liquid crystal display of claim 20, wherein the first light blocking member has a reversed tapered side wall corresponding to the tapered side wall of the microcavity layer on the insulation substrate.

22. The liquid crystal display of claim 17, wherein the height of the first light blocking member corresponds to the height of the microcavity layer.

23. The liquid crystal display of claim 22, wherein the common electrode has a substantially planar structure substantially horizontal to the insulation substrate.

24. The liquid crystal display of claim 23, further comprising:
a second passivation layer disposed between the first light blocking member and the common electrode, and
a height of the second passivation layer on the first light blocking member is substantially the same as the height of the microcavity layer.

25. The liquid crystal display of claim 24, wherein the common electrode is disposed substantially parallel to the insulation substrate corresponding to the height of the second passivation layer on the first light blocking member.

26. The liquid crystal display of claim 22, wherein the common electrode has a curved structure near the light blocking member.

27. The liquid crystal display of claim 26, wherein the common electrode has a curved upper structure near the light blocking member.

28. The liquid crystal display of claim 17, further comprising:
a roof layer which covers the common electrode.

29. The liquid crystal display of claim 28, wherein a liquid crystal injection hole is defined in the roof layer.

30. The liquid crystal display of claim 29, wherein the liquid crystal injection hole is positioned at a thin film transistor formation region.

31. The liquid crystal display of claim 30, wherein the common electrode exposes the liquid crystal injection hole.

32. The liquid crystal display of claim 31, wherein the common electrode has a structure extending in one direction, and
the common electrode comprises a common electrode connection which connects portions of the common electrode in a direction perpendicular to the one direction.

33. The liquid crystal display of claim 32, wherein the common electrode connection is disposed on the first light blocking member and is supported by the first light blocking member.

34. The liquid crystal display of claim 31, wherein the common electrode connection is supported by the roof layer.

* * * * *